(12) United States Patent
Iwasaki

(10) Patent No.: US 11,109,015 B2
(45) Date of Patent: Aug. 31, 2021

(54) DISPLAY APPARATUS, DISPLAY APPARATUS DRIVING METHOD, AND ELECTRONIC INSTRUMENT

(71) Applicant: SONY CORPORATION, Tokyo (JP)

(72) Inventor: Masanori Iwasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 330 days.

(21) Appl. No.: 15/506,116

(22) PCT Filed: Jul. 6, 2015

(86) PCT No.: PCT/JP2015/069406
§ 371 (c)(1),
(2) Date: Feb. 23, 2017

(87) PCT Pub. No.: WO2016/038997
PCT Pub. Date: Mar. 17, 2016

(65) Prior Publication Data
US 2017/0264891 A1    Sep. 14, 2017

(30) Foreign Application Priority Data
Sep. 8, 2014   (JP) ............................. JP2014-181975

(51) Int. Cl.
*H04N 13/398*   (2018.01)
*G03B 35/24*     (2021.01)
(Continued)

(52) U.S. Cl.
CPC .......... *H04N 13/398* (2018.05); *G02B 30/27* (2020.01); *G03B 35/24* (2013.01); *G09G 5/391* (2013.01);
(Continued)

(58) Field of Classification Search
CPC .. H04N 13/398; H04N 13/307; H04N 13/279; H04N 13/378; H04N 13/305;
(Continued)

(56) References Cited

U.S. PATENT DOCUMENTS 5,363,241 A * 11/1994 Hegg .................... G02B 25/008
                                              348/E13.032
6,045,229 A *  4/2000 Tachi .................. G02B 27/0093
                                                         345/7
(Continued)

FOREIGN PATENT DOCUMENTS

JP       09-113846 A      5/1997
JP     2003-344800 A    12/2003
(Continued)

*Primary Examiner* — Joseph G Ustaris
*Assistant Examiner* — Jill D Sechser
(74) *Attorney, Agent, or Firm* — Chip Law Group

(57) ABSTRACT

A display apparatus according to the present disclosure includes a display unit formed with a lens being arranged for a plurality of adjoining pixels including a left-eye pixel and a right-eye pixel, as a unit, a detection unit attached to the display unit and configured to detect positional information and orientation information of an eye of an observer with respect to a display surface of the display unit, a signal processing unit configured to generate virtual image information for each of the left-eye pixel and the right-eye pixel so as to present a virtual image in an aspect ratio different from the aspect ratio of the display surface of the display unit on the basis of a result of detection obtained by the detection unit, and a display control unit configured to drive the left-eye pixel and the right-eye pixel on the basis of the virtual image information generated by the signal processing unit.

19 Claims, 31 Drawing Sheets

(51) Int. Cl.
- *G09G 5/391* (2006.01)
- *H04N 13/378* (2018.01)
- *H04N 13/373* (2018.01)
- *H04N 13/279* (2018.01)
- *H04N 13/307* (2018.01)
- *G02B 30/27* (2020.01)
- *H04N 13/305* (2018.01)
- *H04N 13/322* (2018.01)
- *H04N 13/383* (2018.01)

(52) U.S. Cl.
CPC ......... *H04N 13/279* (2018.05); *H04N 13/305* (2018.05); *H04N 13/307* (2018.05); *H04N 13/322* (2018.05); *H04N 13/373* (2018.05); *H04N 13/378* (2018.05); *H04N 13/383* (2018.05); *G09G 2320/0261* (2013.01)

(58) Field of Classification Search
CPC .. H04N 13/322; H04N 13/373; H04N 13/383; G02B 27/2214; G03B 35/24; G09G 5/391; G09G 2320/0261
See application file for complete search history.

(56) References Cited

U.S. PATENT DOCUMENTS

| | | | |
|---|---|---|---|
| 2004/0184146 A1* | 9/2004 | Uehara | G02B 27/2214 359/462 |
| 2005/0264881 A1* | 12/2005 | Takagi | H04N 13/305 359/463 |
| 2011/0304711 A1* | 12/2011 | Ito | A63F 13/655 348/51 |
| 2012/0218258 A1* | 8/2012 | Mashitani | H04N 13/305 345/419 |
| 2016/0080729 A1* | 3/2016 | Watanabe | G03B 35/24 348/54 |
| 2017/0054963 A1* | 2/2017 | Kasazumi | B60K 35/00 |

FOREIGN PATENT DOCUMENTS

| | | |
|---|---|---|
| JP | 2007-133415 A | 5/2007 |
| JP | 2008-287190 A | 11/2008 |
| JP | 2010-178188 A | 8/2010 |
| JP | 2012-185231 A | 9/2012 |
| JP | 2013-192060 A | 9/2013 |
| WO | 2011/158911 A1 | 12/2011 |
| WO | 2011158911 A1 | 12/2011 |

* cited by examiner

FOUR PIXELS FORMED WITH W PIXELS

TWO VERTICALLY LONG PIXELS

RESOLUTION LIMIT=EYESIGHT RESOLUTION (VISUAL ANGLE OF HUMAN WITH EYESIGHT 1.0 CORRESPONDS TO ANGLE OF ONE MINUTE OF ARC)

| EYESIGHT RESOLUTION [μm] | EYESIGHT | | |
|---|---|---|---|
| VIEWING DISTANCE [cm] | 1.0 | 1.5 | 2.0 |
| 10 | 29.1 | 19.4 | 14.5 |
| 20 | 58.2 | 38.8 | 29.1 |
| 30 | 87.3 | 58.2 | 43.6 |
| 40 | 116.4 | 77.6 | 58.2 |
| 60 | 174.5 | 116.4 | 87.3 |
| 70 | 203.6 | 135.7 | 101.8 |

DISPLAY APPARATUS, DISPLAY APPARATUS DRIVING METHOD, AND ELECTRONIC INSTRUMENT

CROSS REFERENCE TO RELATED APPLICATIONS

This application is a U.S. National Phase of International Patent Application No PCT/JP2015/069406 filed on Jul. 6, 2015, which claims priority benefit of Japanese Patent Application No. JP 2014-181975 filed in the Japan Patent Office on Sep. 8, 2014. Each of the above-referenced applications is hereby incorporated herein by reference in its entirety.

TECHNICAL FIELD

The present disclosure relates to a display apparatus, a display apparatus driving method, and an electronic instrument.

BACKGROUND ART

There may be a case, on a display apparatus, for example, on a display apparatus equipped on a mobile electronic instrument, where it is desirable to change the size of a display image in order to achieve easier viewing of the display image. Exemplary technologies to change the size of the display image include a technology described in Patent Document 1.

Patent Document 1 describes a technology of an information communication terminal that contains, within its casing, a portion of a flexible display having substantially rectangular bendable and flexible sheet-like shape. According to this technology, the size of the display surface is changed, when necessary, by exposing the portion contained within the casing, to the outside of the casing.

CITATION LIST

Patent Document

Patent Document 1: JP 2010-178188 A

SUMMARY OF THE INVENTION

Problems to be Solved by the Invention

According to a mechanism applied in this known art described in Patent Document 1, a display unit is formed with a flexible display and the size of the display unit (display screen) itself is changed, and thus, would need a mechanism to change the size of the display surface, leading to a complicated structure.

To cope with this, the present disclosure is intended to provide a display apparatus capable of changing the size of the display image without changing the display surface itself in the mechanism, a display apparatus driving method, and an electronic instrument having the display apparatus.

Solutions to Problems

The display apparatus according to the present disclosure provided to achieve the above-described purpose includes a display unit formed with a lens being arranged for a plurality of adjoining pixels including a left-eye pixel and a right-eye pixel, as a unit, a detection unit configured to detect a left eye and a right eye of an observer, a signal processing unit configured to generate image information for each of the left-eye pixel and the right-eye pixel so as to present a virtual image in an aspect ratio different from the aspect ratio of a display surface of the display unit on the basis of a result of detection obtained by the detection unit, and a display control unit configured to drive the left-eye pixel and the right-eye pixel on the basis of the image information generated by the signal processing unit.

A display apparatus driving method provided to achieve the above-described purpose according to the present disclosure includes, in driving a display apparatus including a display unit formed with a lens being arranged for a plurality of adjoining pixels including a left-eye pixel and a right-eye pixel, as a unit, detecting a left eye and a right eye of an observer, generating image information for each of the left-eye pixel and the right-eye pixel so as to present a virtual image in an aspect ratio different from the aspect ratio of a display surface of the display unit on the basis of a result of detection, and driving the left-eye pixel and the right-eye pixel on the basis of the generated image information.

Moreover, an electronic instrument provided for achieving the above-described purpose according to the present disclosure includes a display apparatus with the above-described configuration.

Effects of the Invention

According to the present disclosure, it is possible to change the size of the display image with a simpler configuration compared with a case where the size of the display surface itself is changed by a mechanism.

Note that effects described herein are non-limiting. The effects may be any effects described in the present description. Note that effects described herein are provided for purposes of exemplary illustration and are not intended to be limiting. Still other additional effects may also be contemplated.

BRIEF DESCRIPTION OF DRAWINGS

FIG. 2A displays a configuration of major portions of the display unit. FIG. 2B illustrates a specific example of pixel configuration for one virtual image lens.

FIG. 4A illustrates a flow of operation in a case where the virtual image lens is formed with a fixed focus lens. FIG. 4B illustrates a flow of operation in a case where the virtual image lens is formed with a variable focus lens.

FIG. 6A illustrates pixel arrangement of a left-eye pixel and a right-eye pixel of the display unit. FIG. 6B illustrates pixel arrangement of a left-eye screen and a right-eye screen.

FIG. 7A illustrates an exemplary numerical value for each of a viewing distance from the observer to the display unit, eyesight, and a pixel dimension. FIG. 7B illustrates a relationship between resolution (resolution limit) of the human eyes and the pixel dimension.

FIG. 11A illustrates a case of changing the virtual image distance. FIG. 11B illustrates a case where the viewing distance is 40 [cm].

FIG. 14A illustrates a case where the viewing distance is 20 [cm]. FIG. 14B illustrates a case where the viewing distance is 10 [cm].

FIG. 15A illustrates a case where the viewing distance is 20 [cm]. FIG. 15B illustrates a case where the viewing distance is 10 [cm].

FIG. 16A illustrates a case where the viewing distance is 20 [cm]. FIG. 16B illustrates a case where the viewing distance is 10 [cm].

FIG. 17A illustrates a case where the viewing distance is 20 [cm]. FIG. 17B illustrates a case where the viewing distance is 10 [cm].

FIG. 18A illustrates a case where the viewing distance is 20 [cm]. FIG. 18B illustrates a case where the viewing distance is 10 [cm].

FIG. 19A illustrates a case where the viewing distance is 20 [cm]. FIG. 19B illustrates a case where the viewing distance is 10 [cm].

FIG. 20A illustrates a case where the viewing distance is 20 [cm]. FIG. 20B illustrates a case where the viewing distance is 16 [cm]. FIG. 20C illustrates a case where the viewing distance is 24 [cm].

FIG. 21A illustrates a case where the virtual image distance is 10 [cm]. FIG. 21B illustrates a case where the virtual image distance is 8 [cm]. FIG. 21C illustrates a case where the virtual image distance is 12 [cm].

FIG. 25A illustrates a configuration of a display element array unit. FIG. 25B illustrates a configuration of a lens array unit.

MODE FOR CARRYING OUT THE INVENTION

Figure 1:
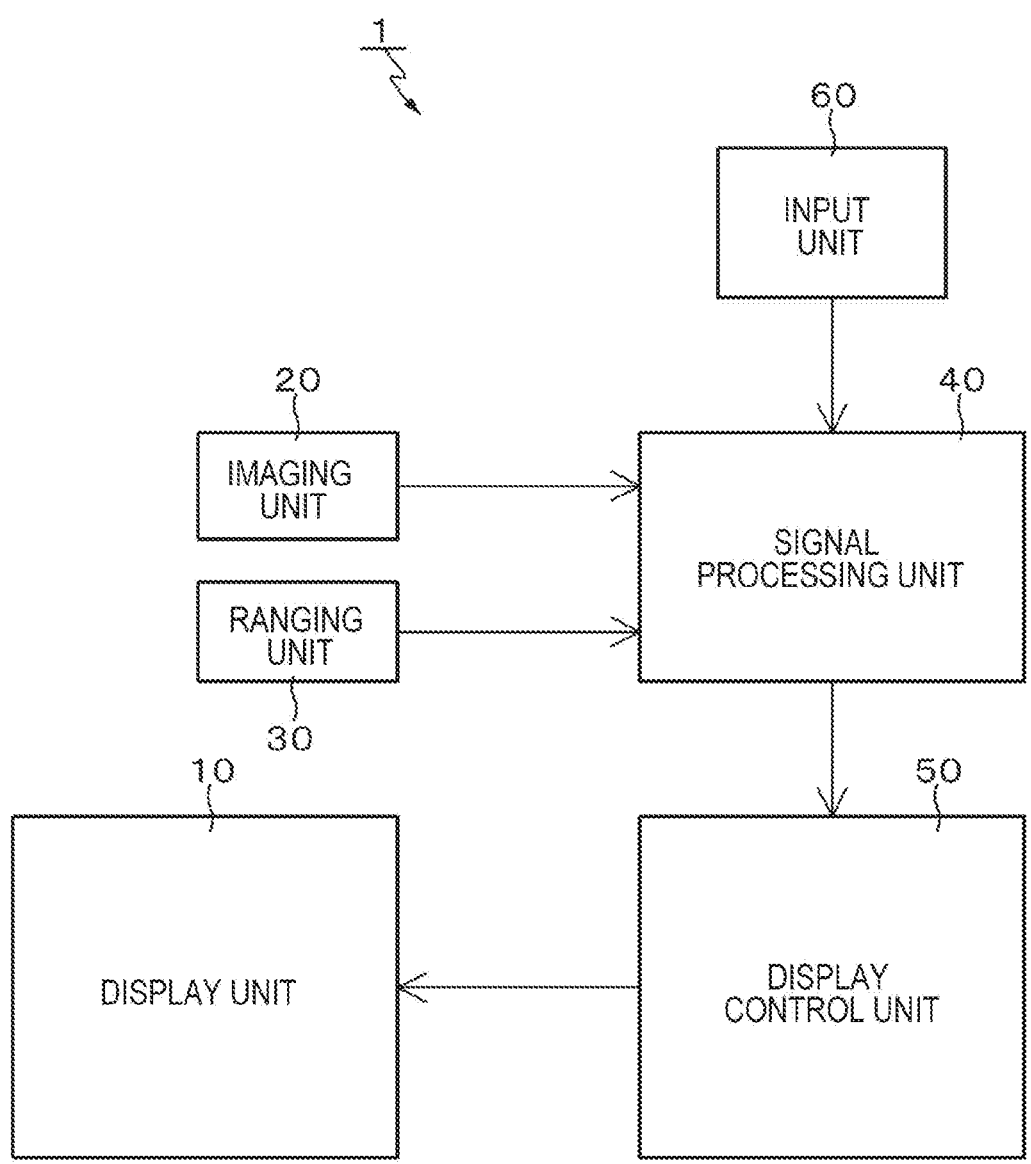
FIG. 1 is a block diagram illustrating an exemplary system configuration of a display apparatus according to the present disclosure.

Hereinafter, embodiments of the technology of the present disclosure (hereinafter, embodiment(s)) will be described in detail with reference to the drawings. The technology of the present disclosure is not limited to the embodiments, and various numerical values, or the like, of the embodiment are examples. In the following description, the same elements or elements having the same function will be denoted by the same reference symbols, and duplicated description will be omitted. Note that description will be presented in the following order.

1. General description of a display apparatus, a display apparatus driving method, and an electronic instrument, according to the present disclosure 2. First embodiment [exemplary case where a virtual image presentation position for an observer is more distant than a display unit]

2-1. Example 1 (exemplary display apparatus on a wristwatch-type terminal)

2-2. Example 2 (modification example of Example 1)

2-3. Example 3 (exemplary display apparatus on a mobile terminal)

2-4. Example 4 (exemplary display apparatus on a camera apparatus)

2-5. Example 5 (exemplary case where virtual image lens is formed with fixed focus lens)

2-6. Example 6 (modification example of Example 5)

2-7. Example 7 (exemplary case where virtual image lens is formed with variable focus lens)

2-8. Example 8 (modification example of Example 7)

3. Second embodiment [exemplary case where a virtual image presentation position for observer is at more frontward position than display unit]

3-1. Example 9 (exemplary case where virtual image lens is formed with fixed focus lens)

3-2. Example 10 (exemplary case where virtual image lens is formed with variable focus lens)

4. Third embodiment [exemplary electronic mirror]

4-1. Example 11 (exemplary case using virtual image optical system in first and second embodiments)

4-2. Example 12 (exemplary case using virtual image optical system based on principle of light reproduction method)

5. Aspect ratio of virtual image

6. Modification example

7. Configuration available in present disclosure

<General Description of a Display Apparatus, a Display Apparatus Driving Method, and an Electronic Instrument, According to the Present Disclosure>

On a display apparatus, a display apparatus driving method, and an electronic instrument, according to the present disclosure, it is allowable to include a detection unit that is attached on a display unit and configured to detect positional information and orientation information of an eye of an observer, with respect to a display surface of the display unit. Furthermore, it is allowable to configure such that the detection unit includes an imaging unit configured to photograph the observer and that a signal processing unit is configured to form the detection unit together with the imaging unit and configured to calculate positional information and orientation information of the eye of the observer with respect to the display surface of the display unit on the basis of an image of the observer captured by the imaging unit.

On a display apparatus, a display apparatus driving method, and an electronic instrument, according to the present disclosure, including the above-described preferable configuration, it is allowable to configure such that the detection unit includes a ranging unit configured to measure a distance between the display surface of the display unit and the eye of the observer. At this time, it is allowable to configure such that the signal processing unit uses the distance measured by the ranging unit, in calculation of the positional information of the eye of the observer with respect to the display surface of the display unit.

Furthermore, on the display apparatus, the display apparatus driving method, and the electronic instrument, according to the present disclosure, including the above-described preferable configuration, it is allowable to configure such that a lens arranged for a plurality of pixels as a unit is a fixed focus lens or a variable focus lens. When the lens arranged for the plurality of pixels as a unit is a variable focus lens, it is allowable to configure such that a display control unit controls a focal length of the variable focus lens.

Furthermore, on the display apparatus, the display apparatus driving method, and the electronic instrument, according to the present disclosure, including the above-described preferable configuration, it is allowable to configure such that the variable focus lens is formed with a microlens arranged in array. At this time, it is allowable to configure such that the display control unit switches between virtual image display and real image display by uniformly controlling the focal length of the microlenses within the display unit, or that the display control unit presents a virtual image with a distance different for each of locations within a display screen by individually controlling the focal length of each of the microlenses within the display unit.

Furthermore, on the display apparatus, the display apparatus driving method, and the electronic instrument, according to the present disclosure, including the above-described preferable configuration, it is allowable to configure such that the signal processing unit generates virtual image information such that a left side of a left-eye image and a right side of a right-eye image adjoin or overlap with each other in a case where a presentation position of the virtual image with respect to an observer is at a position more distant than the display unit. At this time, the change amount of the aspect ratio of the virtual image with respect to the display surface of the display unit may be the value more than one.

Furthermore, on the display apparatus, the display apparatus driving method, and the electronic instrument, according to the present disclosure, including the above-described preferable configuration, it is allowable to configure such that the signal processing unit generates virtual image information such that a right side of a left-eye image and a left side of a right-eye image adjoin or overlap with each other in a case where a presentation position of a virtual image with respect to an observer is less distant than the display unit. At this time, the change amount of the aspect ratio of the virtual image with respect to the display surface of the display unit may be the value smaller than one.

Furthermore, on the display apparatus, the display apparatus driving method, and the electronic instrument, according to the present disclosure, including the above-described preferable configuration, it is allowable to configure such that a left-eye pixel and a right-eye pixel are arranged left-right alternately in pixel arrangement of the display unit, and the signal processing unit generates virtual image information such that independent images different from each other are presented as a left-eye image and a right-eye image at a presentation position of the virtual image. Furthermore, it is configured such that the signal processing unit generates virtual image information such that the number of pixels of the virtual image in the horizontal direction is half the number of pixels of the display unit and that the number of pixels in the vertical direction is equal to the number of pixels of the display unit, for each of left and right eyes.

Furthermore, on the display apparatus, the display apparatus driving method, and the electronic instrument, according to the present disclosure, including the above-described preferable configuration, it is allowable to configure such that a pixel pitch of the display unit is set to smaller than eyesight resolution, preferably half of the eyesight resolution, or less, more specifically, 101.8 [um] or less.

<Display Apparatus of Present Disclosure>

FIG. 1 is a block diagram illustrating an exemplary system configuration of a display apparatus according to the present disclosure. A display apparatus 1 according to the present disclosure includes a display unit 10, an imaging unit 20, a ranging unit 30, a signal processing unit 40, a display control unit 50, and an input unit 60. The signal processing unit 40 and the display control unit 50 may be formed with a microcomputer, for example.

The display apparatus 1 according to the present disclosure is a virtual image display apparatus whereby an observer can view a virtual image with both eyes on a screen of the display unit 10. Note that the display apparatus 1 according to the present disclosure does not exclude virtual image viewing with a single eye, and thus, it is possible to view the virtual image with a single eye. Subsequently, the display apparatus 1 according to the present disclosure presents a virtual image with an aspect ratio different from the aspect ratio of the display surface of the display unit 10. The virtual image having the aspect ratio different from the aspect ratio of the display surface of the display unit 10 is an image different from a stereoscopic image (three-dimensional image) having the aspect ratio equal to the aspect ratio of the display surface of the display unit 10.

Herein, a case where "aspect ratio is equal" includes a case where the aspect ratio is substantially equal in addition to the case where the aspect ratio is exactly equal. Therefore, a case where the aspect ratio of the stereoscopic image differs from aspect ratio of the display surface of the display unit 10 due to presence of various types of variations generated in design or in production would be included in the concept of the case where "aspect ratio is equal". In addition, when the observer views the stereoscopic image, the position on which an eye lens of the observer is focused would be the display surface of the display unit 10. In contrast, when the observer views the virtual image, the position on which the eye lens of the observer is focused would be a position difference from the position on the display surface of the display unit 10, that is, a position more distant than or less distant than the display surface.

Figure 2A:
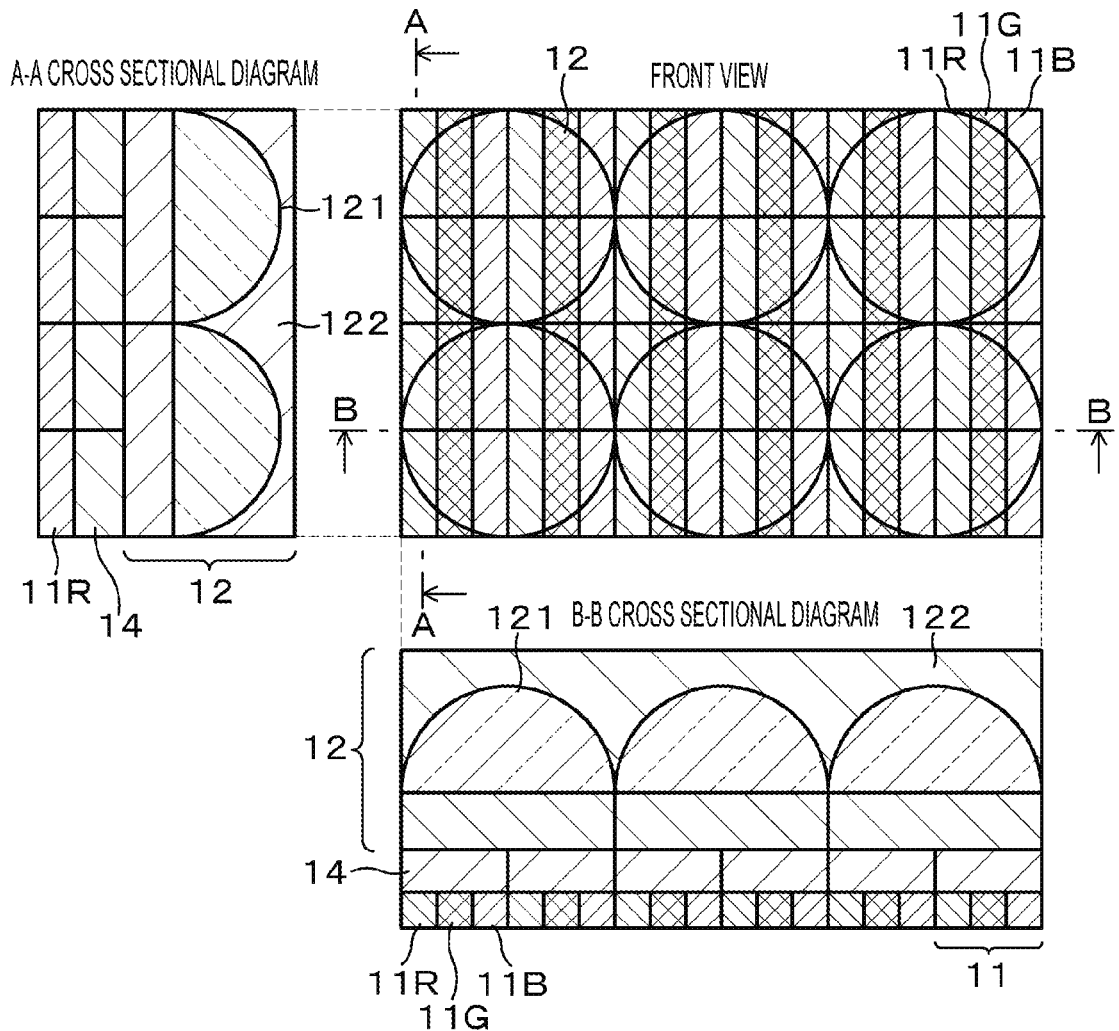
FIGS. 2A and 2B are schematic diagrams illustrating an exemplary configuration of a display unit.
Figure 2B:
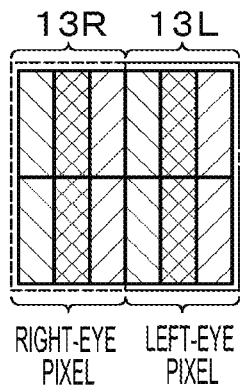

FIGS. 2A and 2B illustrate an exemplary configuration of the display unit 10. The display unit 10 according to the present Example includes an organic EL display apparatus using an organic electro luminescence (EL) element, as a light emitting section. Note that the display unit 10 is not limited to the organic EL display apparatus. Alternatively, it is possible to use, as the display unit 10, other flat surface type (flat panel type) display apparatuses such as a liquid display apparatus, a field emission display (FED) display apparatus.

On the display unit 10, a single pixel (pixel) 11 as a unit of forming a color image is formed with three sub pixels (subpixels), for example. For example, the single pixel 11 is formed with sub pixels with three primary colors, namely, a red pixel 11R including an organic EL element that emits red (R) light, a green pixel 11G including an organic EL element that emits green (G) light, a blue pixel 11B including an organic EL element that emits blue (B) light.

Note that formation of the single pixel 11 is not limited to a combination of the sub pixels of the three primary colors of RGB, and it is possible to form one pixel by adding another sub pixel of another color or a plurality of colors, to the sub pixel formed with the three primary colors. More specifically, it is possible, for example, to form one pixel by adding a sub pixel that emits while (W) light in order to enhance luminance, or form one pixel by adding at least one sub pixel that emits complementary color light in order to expand color reproduction range.

As illustrated in FIG. 2A, the display unit 10 is configured to include, for example, the virtual image lens 12 formed with a microlens arranged in an array for a plurality of adjoining pixels including the left-eye pixel and the right-eye pixel, as a unit, or preferably, even-number pixels as a unit. FIG. 2A illustrates a front view of a microlens array of 2×3, for example, a cross-sectional view taken along a A-A line in the front view (A-A line cross-sectional view), and a cross-sectional view taken along a B-B line in the front view (B-B line cross-sectional view), The virtual image lens 12 acts so as to adjust a presentation position of a virtual image by the focal length, such that a focus position of the eye lens of the observer, that is, the presentation position of the virtual image is at a position different from the position on the display surface of the display unit 10 (that is, a position either more distant or less distant than the display surface). In other words, the virtual image lens 12 acts so as to focus light of the image from a plurality of corresponding pixels, onto the retina of the eye of the observer and to allow the observer to visually recognize the focused image as a virtual image.

Two specific examples of even-number pixels to be a unit of arrangement of the virtual image lens 12 will be illustrated in FIG. 2B. In one of the examples, four pixels are arranged in a square pattern with two rows and two columns. In this, each of two left-side pixels adjoining in the up/down direction are defined as a right-eye pixel 13R, and each of two right-side pixels adjoining in the up/down direction are defined as a left-eye pixel 13L. In another example, two vertically long pixels are arranged in a pattern. In this, a left-side pixel is defined as the right-eye pixel 13R, and a right-side pixel is defined as the left-eye pixel 13L.

Pixel configuration according to the former example has an advantage of being applicable when the display unit 10 is rotated within a plane including the display surface. Specifically, in a case where the display unit 10 is rotated 90 degree, two left-right pixels as a pair in FIG. 2B (up-down pixels in a rotated state) can be used for each of the right-eye pixel 13R and the left-eye pixel 13L. In another case where the display unit is rotated in an oblique direction of 45 degrees, it is possible to use two pixels arranged in right and left positions as the right-eye pixel 13R and the left-eye pixel 13L while invalidating two up-down positioned pixels in a state after 45 degree rotation. Also at other rotation angles, it is possible to perform weighting toward pixels corresponding to right and left eyes, thereby using them as the right-eye pixel 13R and the left-eye pixel 13L, respectively. Pixel configuration in the latter example has an advantage of being able to reduce the number of pixels compared with the pixel configuration in the former example, although the latter configuration cannot be compatible with rotation of the display unit 10.

The virtual image lens 12 includes a lens unit 121 formed of a high refractive index material, and low refractive index resin 122 covering the lens unit 121, and is formed with adjoining even-number pixels including the left-eye pixel 13L and the right-eye pixel 13R, as a unit, on the sub pixels 11R, 11G, and 11B, via a diffusion layer 14. It is possible to use a fixed focus lens with a fixed focal length or a variable focus lens with a variable focal length, as the virtual image lens 12. Furthermore, it is possible to combine the fixed focus lens and the variable focus lens. An exemplary applicable fixed focus lens would be a gradient index lens (refer to Japanese Patent Application No. 2014-110383). Moreover, known variable focus lenses include a liquid crystal lens and a liquid lens.

The virtual image lens 12 acts so as to determine the presentation position of a virtual image by the focal length of the lens. Accordingly, in a case where the virtual image lens 12 is formed with a fixed focus lens, the presentation position of the virtual image is fixed. In a case where the virtual image lens 12 is formed with a variable focus lens, the presentation position of the virtual image can be adjusted by changing the focal length of the variable focus lens under the drive control by the display control unit 50 to be described below.

The imaging unit 20 and the ranging unit 30 are attached integrally with the display unit 10 and constitute a portion of a detection unit configured to detect positional information and orientation information on the eye of the observer with respect to the display surface of the display unit 10. The imaging unit 20 is formed with a camera that can photograph the face of the observer who observes the display image of the display unit 10, and supplies the captured image information to the signal processing unit 40.

The ranging unit 30 measures a distance between the display surface of the display unit 10 and the eye of the observer and outputs a result as distance information on the distance from the display surface of the display unit 10 to the eye of the observer. An exemplary applicable ranging unit 30 would be a unit configured to measure the distance between the display surface of the display unit 10 and the eye of the observer using a time-of-flight (TOF) method. Alternatively, it is possible use a configuration having another camera in addition to the camera constituting the imaging unit 20 and measuring the distance between the display surface of the display unit 10 and the eye of the observer using a triangulation method by the images captured by the two cameras.

The signal processing unit 40 inputs the image information captured by the imaging unit 20 and the distance information measured by the ranging unit 30. Subsequently, the signal processing unit 40 detects positional information and orientation information of the eye of the observer with respect to the display surface of the display unit 10 on the basis of the image information captured by the imaging unit 20 and the distance information measured by the ranging unit 30. The positional information on the eye of the observer includes the distance between the display surface of the display unit 10 and the eye of the observer, and the interval between the left eye and the right eye (interocular). The orientation information on the eye of the observer includes inclination of the eye with respect to the display unit 10, that is, inclination of the line connecting the left eye and the right eye, with respect to the display unit 10.

The signal processing unit 40 performs face detection on the observer on the basis of the image information supplied from the imaging unit 20, and then, identifies the position of the left eye and the right eye (hereinafter, also referred to as "the left and right eyes") on the basis of face detection, and obtains coordinate information of the left and right eyes (left-eye position (XL, YL), right-eye position (XR, YR)). After acquisition of the coordinate information of the left and right eyes, the signal processing unit 40 determines the positional relationship of the left and right eyes of the observer with respect to the display unit 10 using the coordinate information on the left and right eyes and the distance information supplied from the ranging unit 30.

Figure 3A:
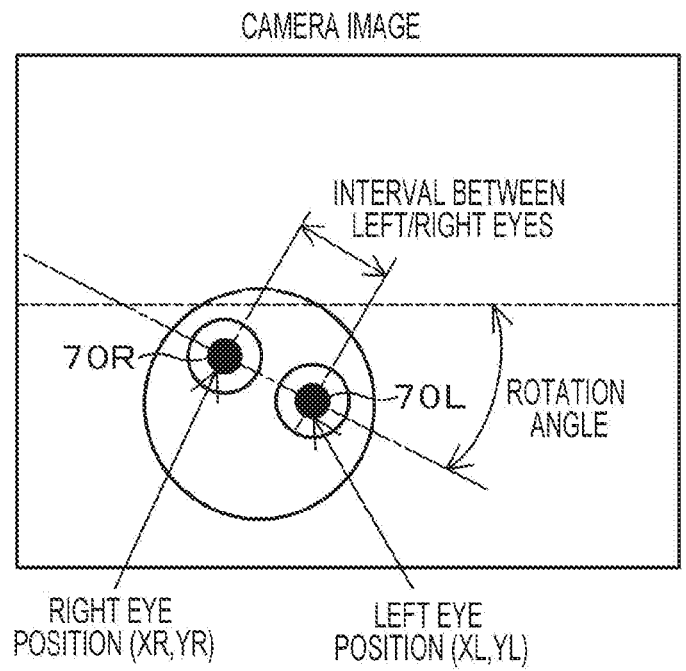
FIGS. 3A and 3B are diagrams each illustrating a calculation example of positional information and orientation information for left and right eyes of an observer, with respect to the display unit.

For example, with respect to an axis connecting the display unit 10 with the face of the observer, a relative positional relationship between the display unit 10 and the face of the observer is assumed to be inclined within a plane orthogonal to the axis. In this case, as illustrated in FIG. 3A, it would be possible to obtain the inclination (positional relationship) of the left and right eyes 70L and 70R of the observer on the basis of the rotation angle (rotation amount) of the image (camera image), as the orientation information on the eye of the observer with respect to the display surface of the display unit 10. Moreover, it would be possible to obtain the interval between the left and right eyes 70L and 70R of the observer on the basis of the distance information measured by the ranging unit 30 and the interval between the left and right eyes 70L and 70R with respect to the whole image, obtained by the imaging unit 20, as positional information on the eye of the observer with respect to the display surface of the display unit 10. The interval between the left and right eyes 70L and 70R with respect to the whole image can be obtained from, for example, the number of pixels and the pixel pitch of the camera, for example.

Figure 3B:
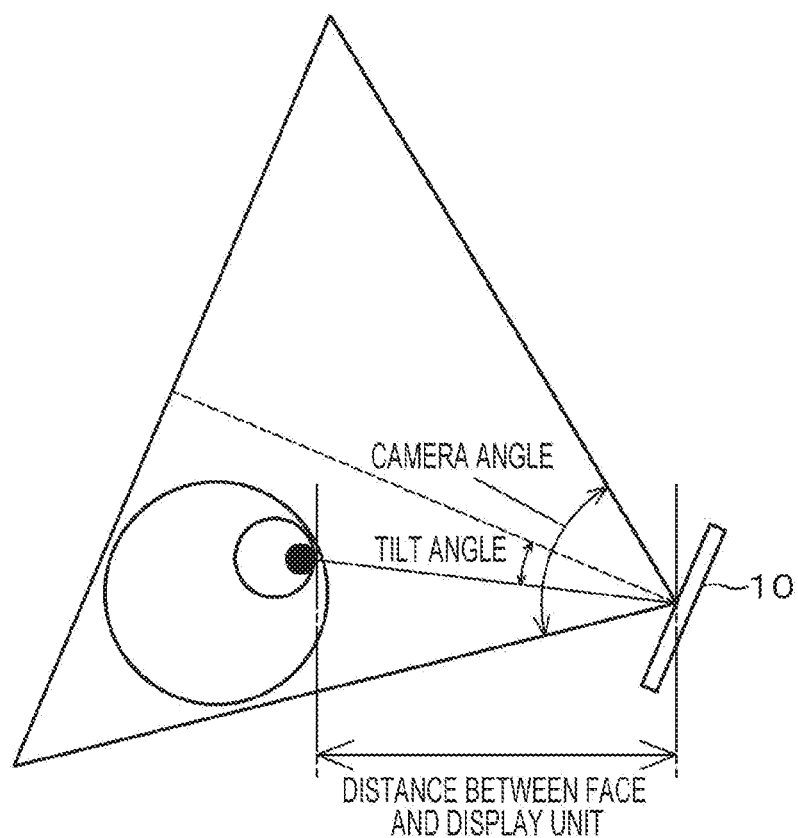

Moreover, as illustrated in FIG. 3B, in a case where the relative positional relationship between the display unit 10 and the face of the observer is inclined in a front-back direction (tilt direction) with respect to the axis connecting the display unit 10 and the face of the observer, it would be possible to obtain the positional relationship between the left and right eyes 70L and 70R of the observer on the basis of the positional information on the left and right eyes 70L and 70R within the camera image, obtained by the imaging unit 20. Subsequently, it is possible to obtain the spatial relative coordinate of the display unit 10 and the face of the observer on the basis of the positional information and the orientation information of the left and right eyes 70L and 70R within the camera image obtained by the imaging unit 20 and on the basis of the distance information (positional information) measured by the ranging unit 30.

The above-described functions of the signal processing unit 40, such as detection of the face of the observer, detection of the left and right eyes, determination of the positional relationship between the left and right eyes, together with the imaging unit 20 and the ranging unit 30, constitute the detection unit that detects the positional information and the orientation information of the eye of the observer with respect to the display surface of the display unit 10. Note that, even without using the ranging unit 30, it would be possible to detect the distance between the display surface of the display unit 10 and the eye of the observer on the basis of the interval of the left and right eyes, or the like, obtained from the image information of the imaging unit 20. Accordingly, the ranging unit 30 is not an indispensable component. Note that, however, the interval between the left and right eyes differs depending on the observer, and thus, it is difficult to detect the distance with high accuracy on the basis of the interval between the left and right eyes. Therefore, it would be possible to achieve higher distance detection accuracy with the ranging unit 30.

The signal processing unit 40 not only performs calculation processing of detecting the positional information and orientation information of the eye of the observer with respect to the display surface of the display unit 10 but also performs processing of calculating a distance (hereinafter, referred to as "virtual image distance") from the position of the eye of the observer to the virtual image presentation position where the virtual image is presented (displayed). In a case where the virtual image lens 12 is formed with a fixed focus lens, the virtual image distance would be fixed. Therefore, the signal processing unit 40 calculates the virtual image distance on the basis of a registered focal length of the virtual image lens 12, that is, a focal length of the fixed focus lens. In a case where the virtual image lens 12 is formed with a variable focus lens, the focal length of the variable focus lens is determined by the designation by the observer from the input unit 60. At this time, the signal processing unit 40 calculates the virtual image distance on the basis of a focal length of the variable focus lens, designated by the observer from the input unit 60. Moreover, the display control unit 50 adjusts the focal length of the variable focus lens so as to achieve the focal length designated by the observer.

The signal processing unit 40 further calculates virtual image information (image information) toward each of the left-eye pixel 13L and the right-eye pixel 13R such that a virtual image may be presented at a position of the virtual distance with the aspect ratio different from the aspect ratio of the display surface of the display unit 10 on the basis of the positional information and orientation information of the eye of the observer, the virtual image distance information, and the image information to be displayed, and supplies the calculated information to the display control unit 50. The display control unit 50 drives the left-eye pixel 13L and the right-eye pixel 13R on the basis of the virtual image information supplied from the signal processing unit 40. In a case where the virtual image lens 12 is formed with the variable focus lens, the display control unit 50 controls the focal length of the variable focus lens in response to the designation by the user from the input unit 60.

Presentation (display) of the virtual image is performed at a position of the virtual image distance, that is, the virtual image presentation position with the drive control by the display control unit 50. That is, the light of the image from the left-eye pixel 13L and the right-eye pixel 13R is focused on the retina of the observer by the virtual image lens 12, and whereby the observer can recognize the image as a virtual image displayed at a presentation position (virtual image distance position) determined by the focal length of the virtual image lens 12.

Figure 4A:
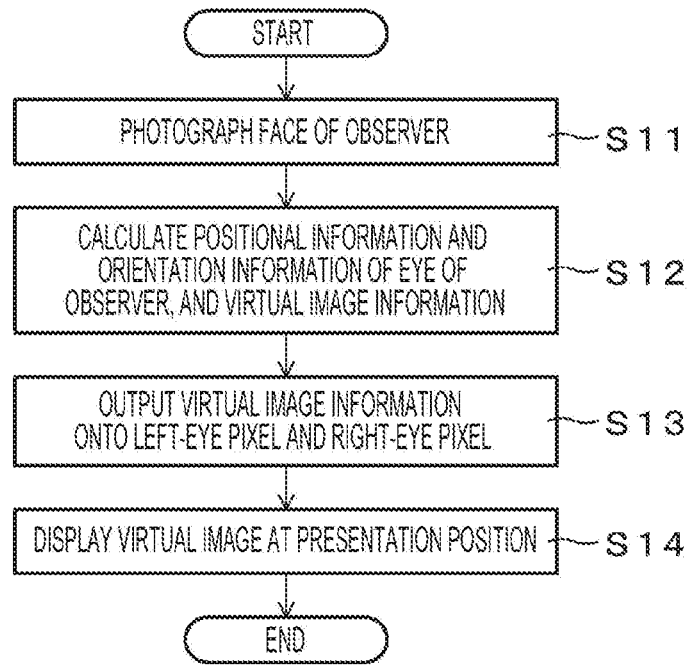
FIGS. 4A and 4B are flowcharts each illustrating a flow of operation of the display apparatus according to the present disclosure.
Figure 4B:
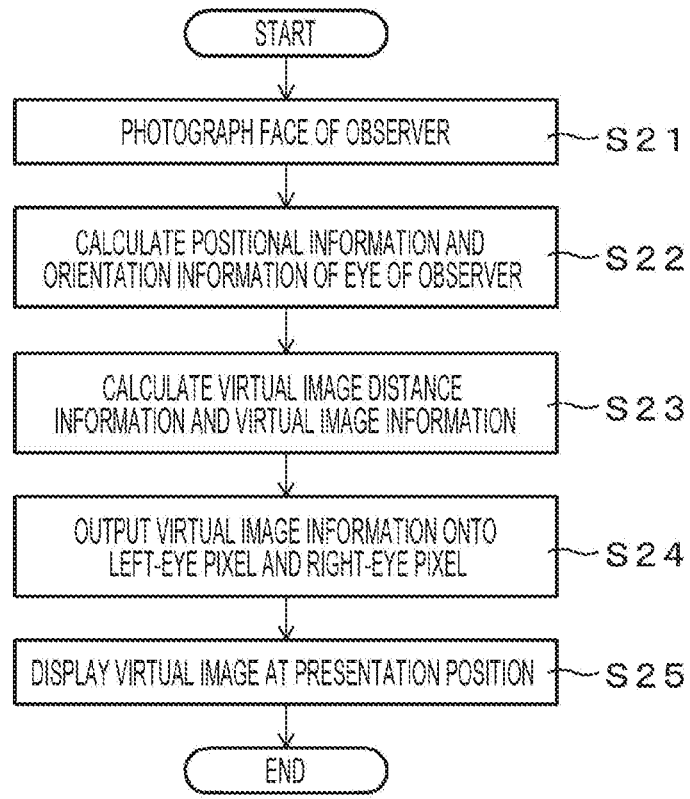

Now, a flow of operation of the display apparatus 1 according to the present disclosure will be described regarding the case where the virtual image lens 12 is formed with a fixed focus lens and a case where it is formed with a variable focus lens. FIG. 4A illustrates a flow of operation in a case where the virtual image lens 12 is formed with a fixed focus lens. FIG. 4B illustrates a flow of operation in a case where the virtual image lens 12 is formed with a variable focus lens. In any of the cases, it is assumed that viewing of the display unit 10 by the observer would be detected by the imaging unit 20 and along with this, the display apparatus 1 would start operation for presenting a virtual image.

As illustrated in the flowchart in FIG. 4A, in a case where the virtual image lens 12 is formed with a fixed focus lens, viewing of the display unit 10 by the observer is detected by the imaging unit 20 and the imaging unit 20 photographs the face of the observer (step S11). At this time, the distance between the display surface of the display unit 10 and the eye of the observer is measured directly or indirectly by the ranging unit 30.

Next, the signal processing unit 40 calculates the positional information and orientation information of the eye of the observer on the basis of the image information captured by the imaging unit 20 and the distance information measured by the ranging unit 30 (step S12). At this time, using the virtual image distance determined by the focal length of a known fixed focus lens, the signal processing unit 40 calculates virtual image information (image information) for each of the left-eye pixel 13L and the right-eye pixel 13R on the basis of the positional information and the orientation information of the eye of the observer, and on the basis of the image information to be displayed. Next, the display control unit 50 outputs the virtual image information obtained by the signal processing unit 40 onto the left-eye pixel 13L and the right-eye pixel 13R (step S13) and presents a virtual image at the presentation position of the virtual image distance by driving the left-eye pixel 13L and the right-eye pixel 13R (step S14).

As illustrated in the flowchart in FIG. 4B, in a case where the virtual image lens 12 is formed with a variable focus lens, viewing of the display unit 10 by the observer is detected by the imaging unit 20 and the imaging unit 20 photographs the face of the observer (step S21). At this time, measurement of the distance between the display surface of the display unit 10 and the eye of the observer is also performed directly or indirectly by the ranging unit 30.

Next, the signal processing unit 40 calculates the positional information and orientation information of the eye of the observer on the basis of the image information captured by the imaging unit 20 and the distance information measured by the ranging unit 30 (step S22). Then, the signal processing unit 40 calculates virtual image distance information on the basis of focal length information of the variable focus lens, designated by the observer from the input unit 60, and using the virtual image distance information, calculates virtual image information for each of the left-eye pixel 13L and the right-eye pixel 13R on the basis of the positional information and the orientation information of the eye of the observer and on the basis of the image information to be displayed (step S23). Next, the display control unit 50 outputs the virtual image information obtained by the signal processing unit 40 onto the left-eye pixel 13L and the right-eye pixel 13R (step S24) and drives the left-eye pixel 13L and the right-eye pixel 13R, thereby presenting the virtual image onto the presentation position at the virtual image distance (step S25).

As described above, the display apparatus 1 according to the present disclosure is a virtual image display apparatus that allows the observer to view a virtual image by one screen of the display unit 10 and presents the virtual image with an aspect ratio different from the aspect ratio of the display surface of the display unit 10. Note that presenting the virtual image with the aspect ratio different from the aspect ratio of the display surface of the display unit 10 means presenting (displaying) the virtual image not on the display surface of the display unit 10 but at a presentation position different from the display surface of the display unit 10 in an observation direction (front-back direction of the display unit 10) for the observer.

Specifically, on the display apparatus 1 according to the present disclosure, there may be a case where the presentation position of the virtual image with respect to the observer is a position more distant from the observer than the display surface of the display unit 10 and a case where the presentation position of the virtual image with respect to the observer is a position closer to the observer than the display surface of the display unit 10. The distance of the virtual image from the observer to the virtual image presentation position, that is, the virtual image distance, is determined by the focal length of the virtual image lens 12 and the distance from the observer to the display unit 10 (hereinafter, referred to as "viewing distance").

Moreover, the display apparatus 1 according to the present disclosure can switch between virtual image display and real image display in a case where the virtual image lens 12 is formed with a variable focus lens. That is, by providing the variable focus lens with a lens function in a case where the virtual image lens 12 is formed with a variable focus lens, it is possible, as described above, to present a virtual image at a presentation position different from the position on the display surface of the display unit 10. Moreover, by not providing the variable focus lens with a lens function, it is possible to display a real image (two-dimensional image) on the display surface of the display unit 10. Providing/not providing the variable focus lens with the lens function can be switched by uniformly controlling the focal length of the variable focus lens formed with a microlens under the control of the display control unit 50 on the basis of instruction by the user from the input unit 60.

Moreover, on the display apparatus 1 according to the present disclosure, in a case where the virtual image lens 12 is formed with a variable focus lens, it is also possible to individually control the focal length of the variable focus lens formed with a microlens under the control of the display control unit 50, for each of the microlenses. This enables presentation of the virtual image with different distances for individual locations within the display screen and enables partially producing depth perception toward the virtual image, making it possible to present the virtual image not as a two-dimensional image but as a three-dimensional image.

This differs from the case where the pupil of the observer is focused on the display unit 10 and a stereoscopic vision is produced by the left-right parallax, that is, focusing in this case is achieved not on the display unit 10 but on a three-dimensional position of a visible image.

Subsequently, specific embodiments of the display apparatus 1 according to the present disclosure will be described. Hereinafter, the display apparatus 1 according to the present disclosure presenting a virtual image at a position more distant than the display surface of the display unit 10 will be described as a display apparatus according to a first embodiment. The display apparatus 1 according to the present disclosure presenting a virtual image at a position less distant than the display surface of the display unit 10 will be described as a display apparatus according to a second embodiment.

<Display Apparatus According to First Embodiment>

Figure 5:
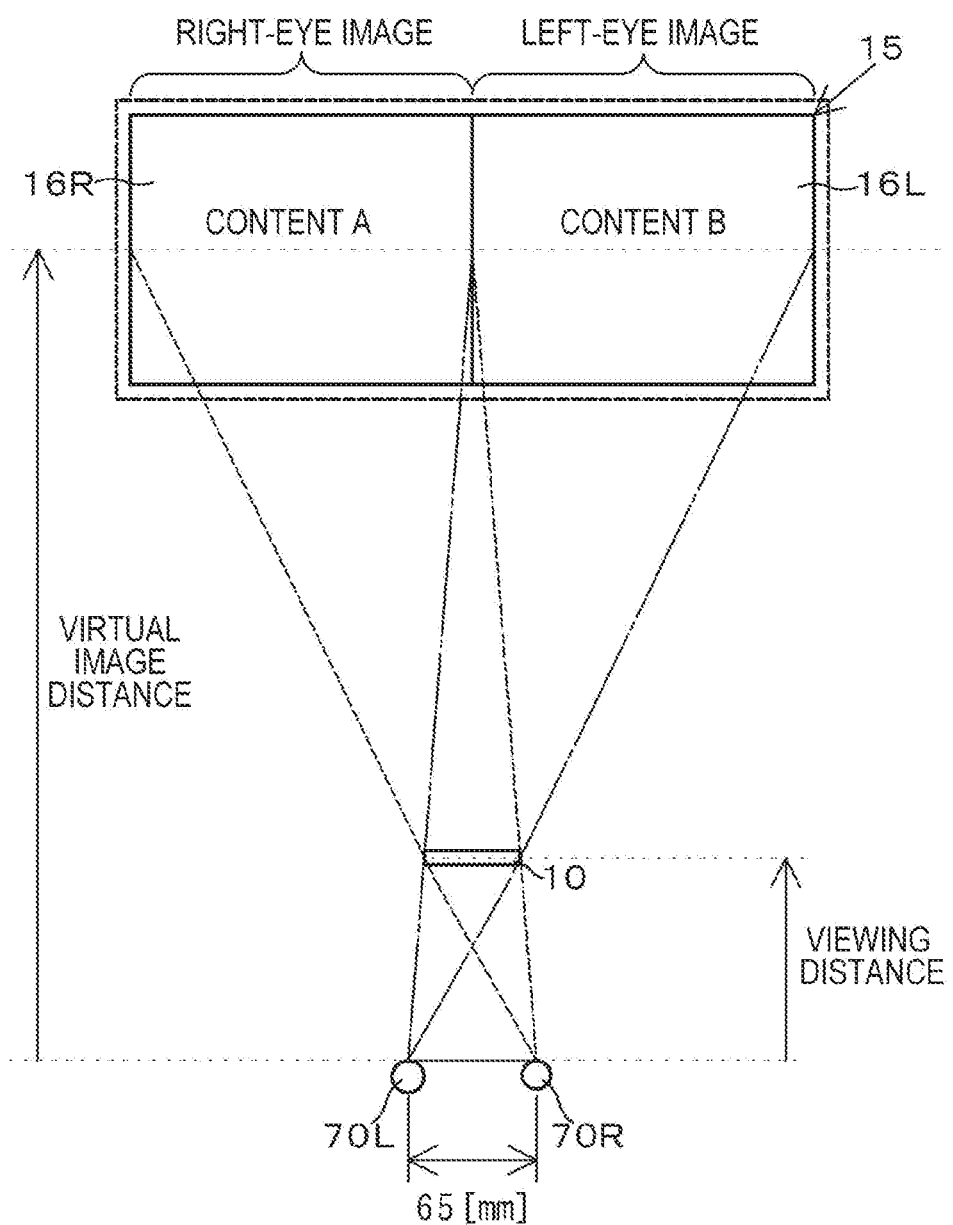
FIG. 5 is a diagram illustrating a virtual image presented by a display apparatus according to a first embodiment.

The display apparatus according to the first embodiment is a virtual image display apparatus that presents a virtual image at a position more distant (remote position) than the display surface of the display unit 10. FIG. 5 is a diagram illustrating a virtual image presented by a display apparatus according to the first embodiment. In FIG. 5, the light beam related to the left eye 70L of the observer is illustrated with a one-dot chain line and the light beam related to the right eye 70R of the observer is illustrated with a broken line. Moreover, the interval between the left eye 70L and the right eye 70R of the observer (interocular) is assumed to be 65 [mm], for example. These points will also apply to each of Examples to be described below.

On the display apparatus according to the first embodiment, presentation of the virtual image is executed by signal processing by the signal processing unit 40 and under the display control by the display control unit 50. That is, the display control unit 50 drives the left-eye pixel 13L and the right-eye pixel 13R of the display unit 10 on the basis of the image information generated by the signal processing unit 40 and thereby presenting a virtual image 15 at a presentation position set at a position more distant than the display surface of the display unit 10 depending on the focal length and the viewing distance of the virtual image lens 12.

More specifically, the signal processing unit 40 generates image information in which a left side of the left-eye image and a right side of the right-eye image adjoin with each other. The display control unit 50 drives the left-eye pixel 13L and the right-eye pixel 13R on the basis of the image information generated by the signal processing unit 40 and thereby presenting a virtual image 15 at a presentation position set at a position more distant than the display surface of the display unit 10. That is, on the display apparatus according to the present embodiment, display of the virtual image 15 is performed by defining a left-eye screen 16L and a right-eye screen 16R as two screens adjoining with each other in a left-right direction.

It is possible to display an image of same content onto the two screens of the left-eye screen 16L and the right-eye screen 16R. Alternatively, it is possible to display images of different content, for example, as illustrated in FIG. 5, display an image of content A on the right-eye screen 16R and display an image of content B on the left-eye screen 16L. As a display example of the latter case, the left-eye screen 16L can display image information such as map information including a designated point with highlighting, whereas the right-eye screen 16R can display image information such as weather forecast for each of time zones for the designated point, or image information such as dining/restaurant information of the designated point.

Figure 6A:
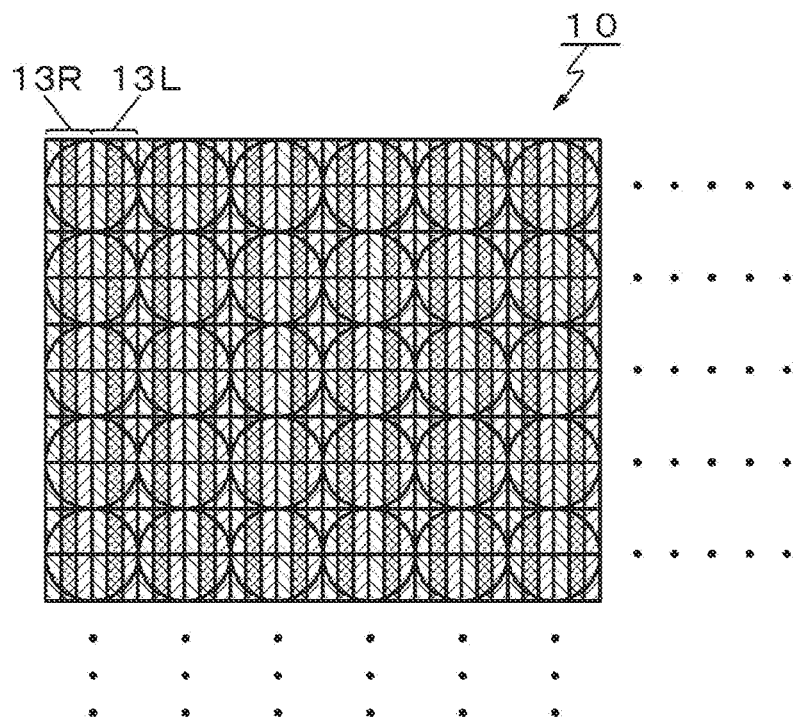
FIGS. 6A and 6B are diagrams each illustrating a display pixel of a virtual image toward the left and right eyes of an observer.
Figure 6B:
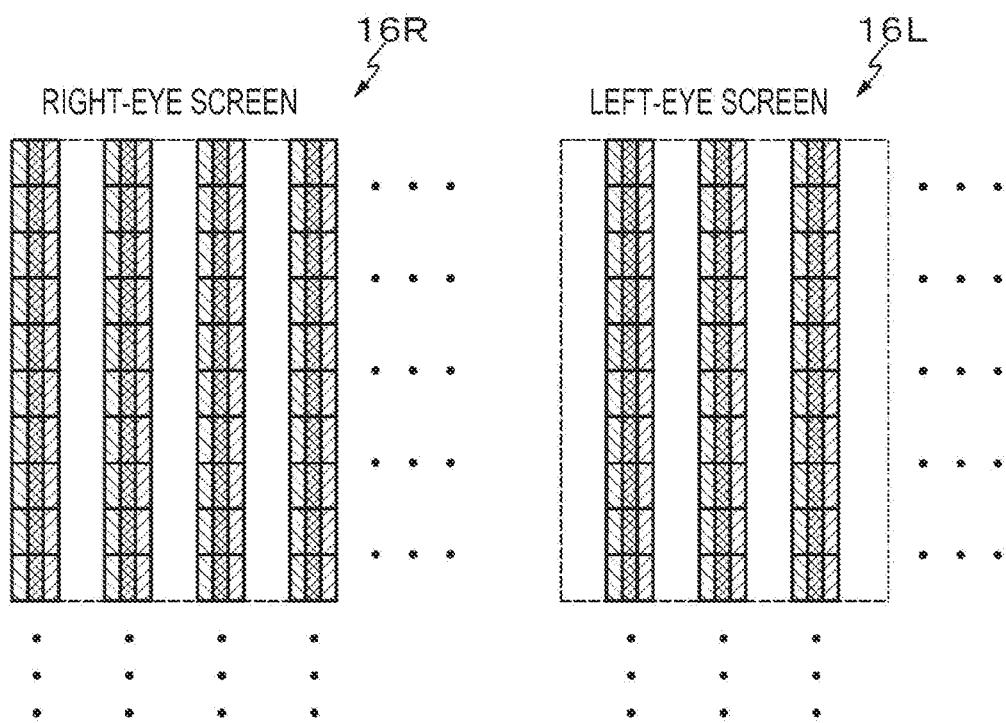

Now, the display pixel of the virtual image 15 toward the left eye 70L and the right eye 70R of the observer will be described with reference to FIGS. 6A and 6B. FIG. 6A illustrates pixel arrangement of the left-eye pixel 13L and the right-eye pixel 13R of the display unit 10. FIG. 6B illustrates pixel arrangement of the left-eye screen 16L and the right-eye screen 16R.

As exemplary device specification of the display unit 10, the number of pixels is assumed to be 2160×3840, and the virtual image lens (microlens) 12 is arranged such that one lens for four pixels, with the number of lenses being 1080×1920. The four pixels as a unit for arrangement of the virtual image lens 12 are formed with two vertically arranged pixels, namely, the right-eye pixel 13R, and two vertically arranged pixels, namely, the left-eye pixel 13L. That is, pixel arrangement of the display unit 10 is performed such that the right-eye pixel 13R and the left-eye pixel 13L are arranged alternately for each of the pixels in the horizontal direction.

In contrast, as for the left-eye screen 16L and the right-eye screen 16R, the virtual image 15 is formed as illustrated in FIG. 6B, such that each of pixel columns of the left-eye screen 16L and the right-eye screen 16R is arranged in the form of every other pixel column, that is, pixels are arranged in the form of every other pixel in the horizontal direction. That is, the signal processing unit 40 generates virtual image information such that the number of pixels in the horizontal direction of the virtual image becomes half the number of pixels of the display unit 10, for each of the left and right eyes. This uses a phenomenon that human eyesight cannot visually recognize the thing that has a certain level of smallness, or below. That is, even when pixels are arranged at every other pixel on the left-eye screen 16L and the right-eye screen 16R, with a gap corresponding to one pixel, the gap corresponding to one pixel would not be visually recognized when the gap is smaller than a resolution limit of the human eye. Note that the signal processing unit 40 generates the virtual image information such that the number of pixels in the vertical direction becomes equal to the number of pixels of the display unit 10

Accordingly, by setting the dimension of the pixel of the left-eye screen 16L and the right-eye screen 16R, that is, the dimension of the pixel forming the virtual image 15 to the dimension smaller than the resolution limit of the human eye, preferably, half (one-half or less), the gap corresponding to one pixel between each of the pixel columns would not be visually recognized. Note that the resolution limit of the human eye is eyesight resolution. The visual angle of the human with eyesight 1.0 corresponds to the angle of one minute of arc. This means the ability to confirm the visual angle of one minute of arc corresponds to the eyesight 1.0.

By forming the left-eye screen 16L and the right-eye screen 16R for displaying the virtual image 15 using every other pixel arrangement in the direction corresponding to the direction of arrangement of the left and right eyes (horizontal direction), the number of pixels in the horizontal direction would be half the number of pixels of the display unit 10 for each of left and right eyes. The number of pixels in the vertical direction is equal to the number of pixels of the display unit 10. Note that the left-eye screen 16L and the right-eye screen 16R for displaying the virtual image 15 is formed with every other pixel arrangement in the horizontal direction as an exemplary case, the configuration is not limited to every other pixel arrangement. For example, it is possible to employ pixel arrangement using interval of two pixels.

Figures 7A, 7B:
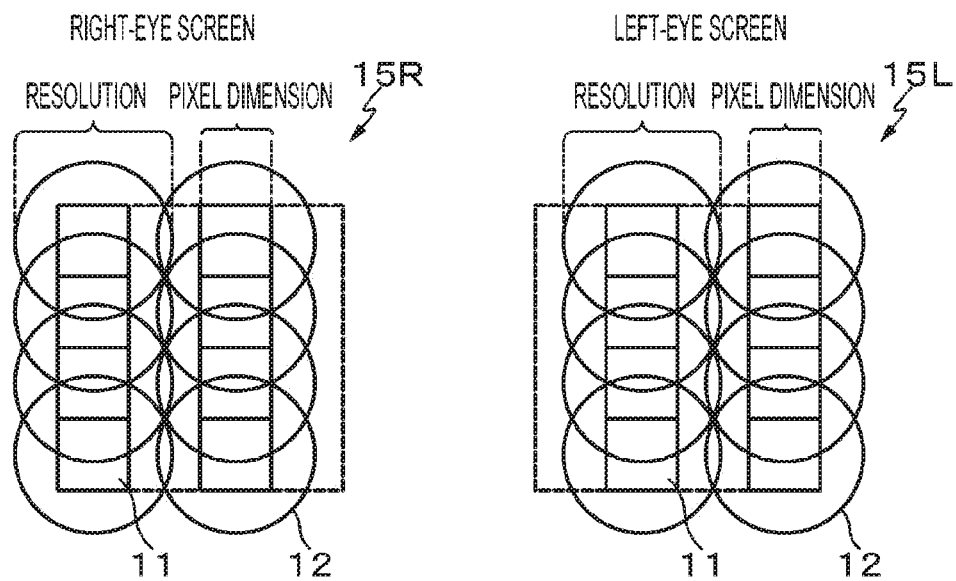
FIGS. 7A and 7B are diagrams each illustrating a resolution limit of the human eye toward a space for one pixel between individual pixel columns of the left-eye screen and the right-eye screen, and pixel dimensions.

The resolution limit of the human eye toward a gap corresponding to one pixel between individual pixel columns of the left-eye screen 16L and the right-eye screen 16R and pixel dimensions for each of the pixels of the left-eye screen 16L and the right-eye screen 16R will be described in more detail with reference to FIGS. 7A and 7B. FIG. 7A illustrates exemplary numerical values of the viewing distance from the observer to the display unit 10, eyesight, and pixel dimension. FIG. 7B illustrates the relationship between human eye resolution (resolution limit) and pixel dimension.

In an exemplary case where the eyesight is 1.0 and the viewing distance is 20 [cm], when the pixel dimension (dimension in horizontal direction) is 29.1 [um] or below, that is, half the eyesight resolution 58.2 [um] or less, that gap corresponding to one pixel dimension between each of the pixel columns would not be noticeable. On a mobile electronic instrument such as a mobile phone, the user (observer) typically performs visual recognition (observation) of the display screen at a viewing distance of approximately 70 [cm] or less distant than this. Accordingly, in a case where the eyesight is 1.0 and the viewing distance is 70 [cm], when the pixel dimension is 101.8 [um] or below, that is, half the eyesight resolution 203.6 [um] or less, the gap corresponding to one pixel dimension between each of the pixel columns would not be noticeable.

As described above, the display apparatus according to the first embodiment is a virtual image display apparatus that includes a distant-display optical system that presents the virtual image 15 at a position more distant from the observer than the display surface of the display unit 10, in which the virtual image lenses 12 are arranged, in an array, for adjoining even-number pixels including the left-eye pixel and the right-eye pixel, as a unit. Subsequently, the observer can view the virtual image 15 with both eyes at a position more distant than the display surface of the display unit 10, for the screen of the display unit 10. This would omit the need for wearing an eyeglass-type display on one's head such as a head-mounted display, making it possible to reduce burden and labor on the user.

Furthermore, in a case where the observer is far-sighted, or weak-sighted from aging, viewing a screen on hand would be difficult. Even in this case, the display apparatus according to the first embodiment enables the observer being far-sighted or weak-sighted from aging to focus on the display screen of the virtual image by shifting the focus position formed by the lens of the eyeball to a more distant position from the display surface of the display unit 10 using virtual image viewing.

Furthermore, the display apparatus according to the first embodiment enables presenting the virtual image separately for each of the left and right eyes, that is, presenting the virtual image side by side in the left-right direction, making it possible to obtain a laterally wide display area. For example, it is possible to present different images that are independent and not overlapping with each other with respect to the whole display image toward the left and right eyes as a virtual image. In addition, as seen from the illustrations in FIGS. 6A and 6B, the total number of pixels for displaying the virtual image 15 on the left-eye screen 16L and the right-eye screen 16R is the same as the number of pixels of the display unit 10, making it possible to present a virtual image having the laterally twice area of display. That is, for each of the left and right eyes 70L and 70R, the number of pixels in the horizontal direction becomes half the number of pixels of the display unit 10, and the number of pixels in the vertical direction becomes equal to the number of pixels of the display unit 10. This would achieve the vertical density twice the horizontal density in the virtual image displayed on the left-eye screen 16L and the right-eye screen 16R, making it possible to smoothly display the image in the vertical direction and to double the luminance.

Meanwhile, on a display apparatus, even when the pixel dimension (pixel pitch) is miniaturized to the level of human eyesight resolution or above, this level of miniaturization would not produce an effect of miniaturization due to human eyesight resolution, and thus, it would not be possible to obtain high-precision information. In contrast, the display apparatus according to the first embodiment alternately uses pixels of the display unit 10, presented on the left and right eyes 70L and 70R, in the horizontal direction of pixel arrangement, for each of the right eye and the left eye. In addition, the pixels of the display unit 10, observed exclusively with the right eye, include no pixels for the left eye when being displayed. When the spacing of the pixel that is not displayed is in the neighborhood of the level of eyesight resolution, however, it is not easy to discern the gap between adjoining display pixels. Accordingly, it would be possible to reduce the pixel dimension to the neighborhood of the level of half the eyesight resolution. As a result, it is possible to increase the number of pixels that can be displayed as a virtual image even when the screen size of the display unit 10 is the same.

Hereinafter, specific examples when the display apparatus according to the first embodiment is used as a display apparatus of the mobile electronic instrument will be described. On the display apparatus according to the first embodiment, in a case where the presentation position of a virtual image with respect to the observer is more distant than the display unit 10, presentation of the virtual image is performed at the presentation position of the virtual image such that a left side of a left-eye image and a right side of a right-eye image adjoin or overlap with each other. Information on the virtual image is generated by the signal processing unit 40. Note that, herein, adjoining includes a case where there is spacing between the left side of the left-eye image and the right side of the right-eye image.

Example 1

Figure 8:
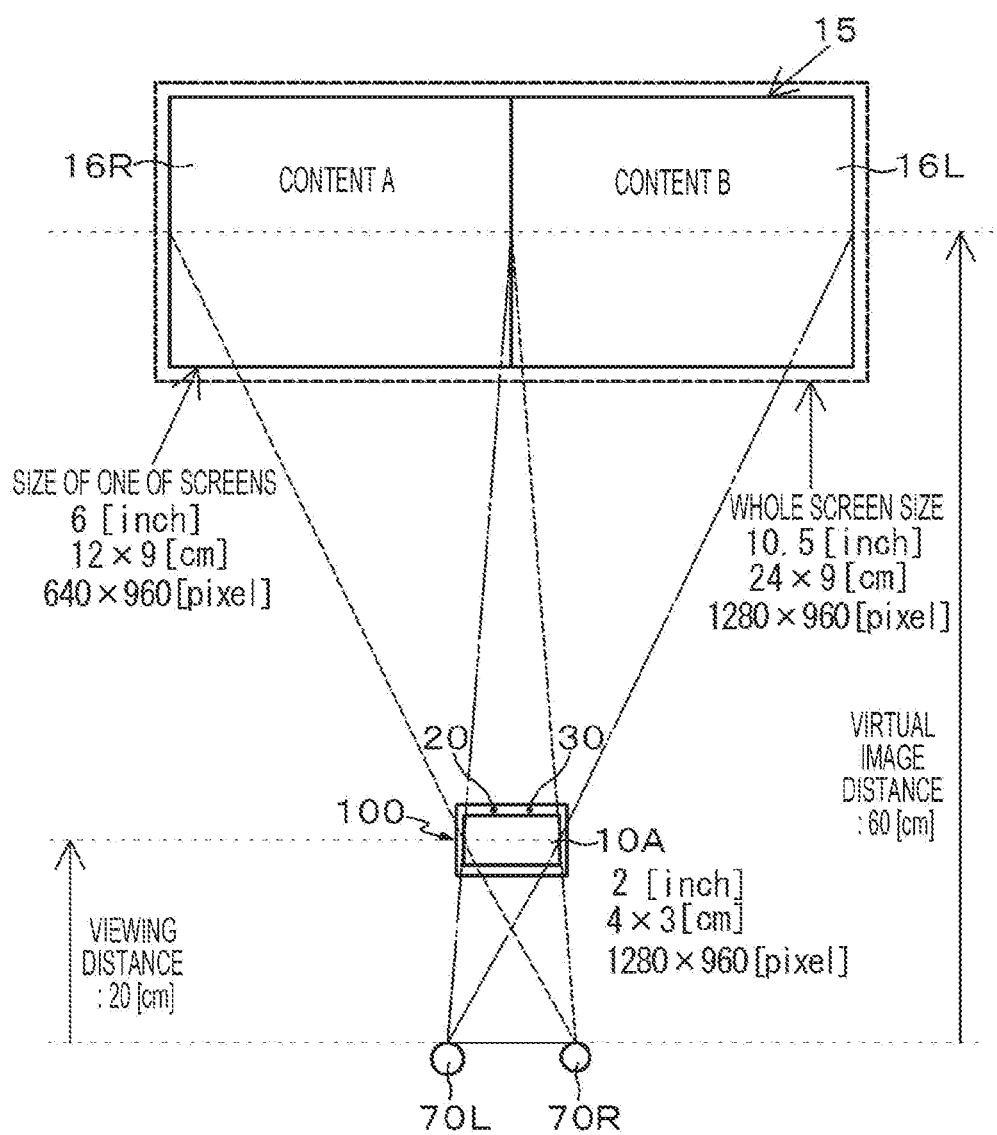
FIG. 8 is a diagram illustrating a virtual image presented by a display apparatus according to Example 1.

FIG. 8 is a diagram illustrating a virtual image presented by a display apparatus according to Example 1. Example 1 illustrates an exemplary case where the display apparatus according to the first embodiment is used as a display apparatus of a wristwatch-type terminal.

In FIG. 8, a display unit 10A of a wristwatch-type terminal 100 corresponds to the display unit 10 in FIG. 1. As illustrated in FIG. 8, the imaging unit 20 and the ranging unit 30 in FIG. 1 are arranged at a peripheral portion of the display unit 10A of the wristwatch-type terminal 100. The signal processing unit 40 and the display control unit 50 in FIG. 1 are incorporated, in a form of an IC, for example, into the wristwatch-type terminal 100.

By driving the left-eye pixel 13L and the right-eye pixel 13R of the display unit 10A of the wristwatch-type terminal 100 under signal processing by the signal processing unit 40 and under the display control by the display control unit 50, the virtual image 15 is presented at a presentation position of the virtual image, determined by the focal length and the viewing distance of the virtual image lens 12. More specifically, on the display apparatus according to Example 1, presentation of the virtual image 15 is performed for two screens of the left-eye screen 16L and the right-eye screen 16R. At this time, the left-eye screen 16L and the right-eye screen 16R are configured such that the two screens come in contact with each other, being connected in the left-right direction.

It is possible to present a virtual image of same content onto the two screens of the left-eye screen 16L and the right-eye screen 16R. Alternatively, it is possible to present virtual images of different content, for example, as illustrated in FIG. 8, present a virtual image of the content A on the right-eye screen 16R and present a virtual image of the content B on the left-eye screen 16L. As a display example of the latter case, the left-eye screen 16L can present a virtual image of a map including a designated point with highlighting, whereas the right-eye screen 16R can present a virtual image such as weather forecast for each of time zones for the designated point, or a virtual image of dining/ restaurant information of the designated point, or the like.

Now, exemplary device specification of the display unit 10A of the wristwatch-type terminal 100 will be described. The display unit 10A of the wristwatch-type terminal 100 is assumed to have the screen size of 2 [inch], with 4 [cm] in width and 3 [cm] in height, with the number of pixels being 1280 [pixel] in width and 960 [pixel] in height. Moreover, the pixel pitch (pixel dimension) is assumed to be 31 [um], with the pitch of the virtual image lens 12 being 61 [um].

Under the above-described device specification, it is assumed that, in a case where the viewing distance, that is, the distance from the observer to the display unit 10A, is 20 [cm], for example, the distance from the observer to the presentation position of the virtual image 15, namely, the virtual image distance, is set to 60 [cm], for example. In this case, display of the virtual image 15 is performed as two screens of the left-eye screen 16L and the right-eye screen 16R, each having the screen size of 6 [inch], with 12 [cm] in width and 9 [cm] in height, with the number of pixels being 640 [pixel] in width and 960 [pixel] in height, at the presentation position with the virtual image distance 60 [cm].

That is, each of the two screens for displaying the virtual image 15 has the number of pixels in the horizontal direction being half the number of pixels of the display unit 10A and the number of pixels in the vertical direction being equal to the number of pixels of the display unit 10A, for each of the left and right eyes 70L and 70R. Further, as a whole screen of two screens, the screen size would be 10.5 [inch], with 24 [cm] in width and 9 [cm] in height, with the number of pixels being 1280 [pixel] in width and 960 [pixel] in height. That is, the whole screen of two screens uses all the pixels of the display unit 10A. Display resolution of the virtual image is the resolution corresponding to four times the resolution of the video graphics array (VGA).

As described above, with the display apparatus according to Example 1, the virtual image 15 can be displayed at a presentation position more distant than the display unit 10A of the wristwatch-type terminal 100. Accordingly, it is possible to reduce eye strain produced by observing a screen on hand in a short distance. The wristwatch-type terminal 100 is configured such that the screen size of the display unit 10A is physically restricted to the size up to approximately two inches in consideration of wearability and along with this, content to be displayed is also restricted. Even under this restriction, with the display apparatus according to Example 1, it is possible to display the image (virtual image) in an enlarged screen size, more distant from the display unit 10A using virtual image display, and thus, to present a large amount of information.

Figure 9:
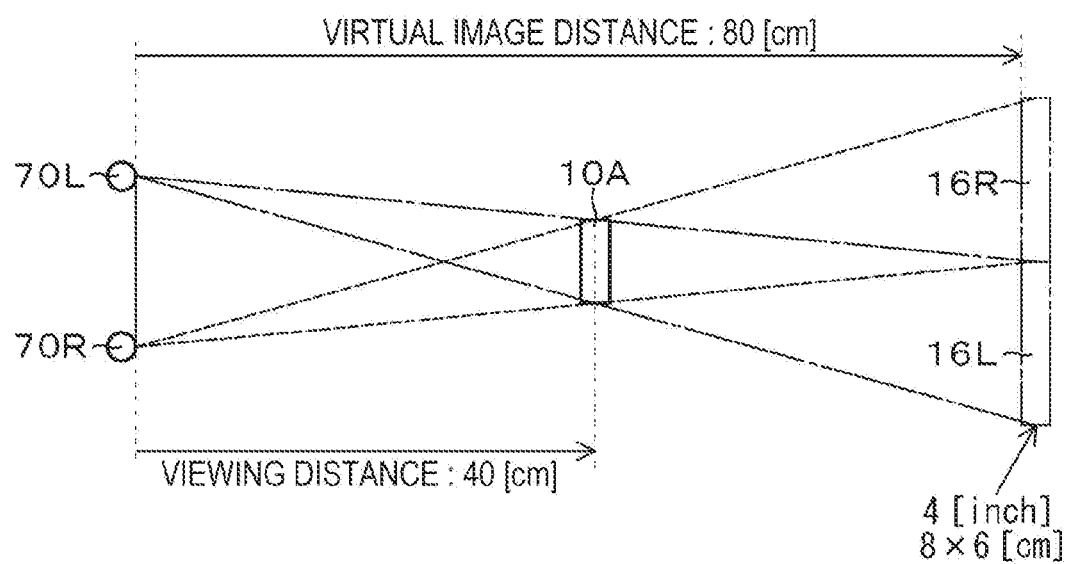
FIG. 9 is a diagram illustrating a case where the viewing distance is changed on the display apparatus according to Example 1.

With the display apparatus according to Example 1, by changing the viewing distance from the observer to the display unit 10A, it is possible to change the virtual image distance up to the presentation position at which the virtual image 15 is displayed, and change the screen size of two screen of the left-eye screen 16L and the right-eye screen 16R. As illustrated in FIG. 9, by setting the viewing distance to 40 [cm], it is possible to display the virtual image 15 on the left-eye screen 16L and the right-eye screen 16R, each having the screen size 4 [inch], with 8 [cm] in width and 6 [cm] in height, at a presentation position with the virtual image distance of 80 [cm]. In any of the cases, the display unit 10A has the screen size 2 [inch] with 4 [cm] in width and 3 [cm] in height.

Example 2

Figure 10:
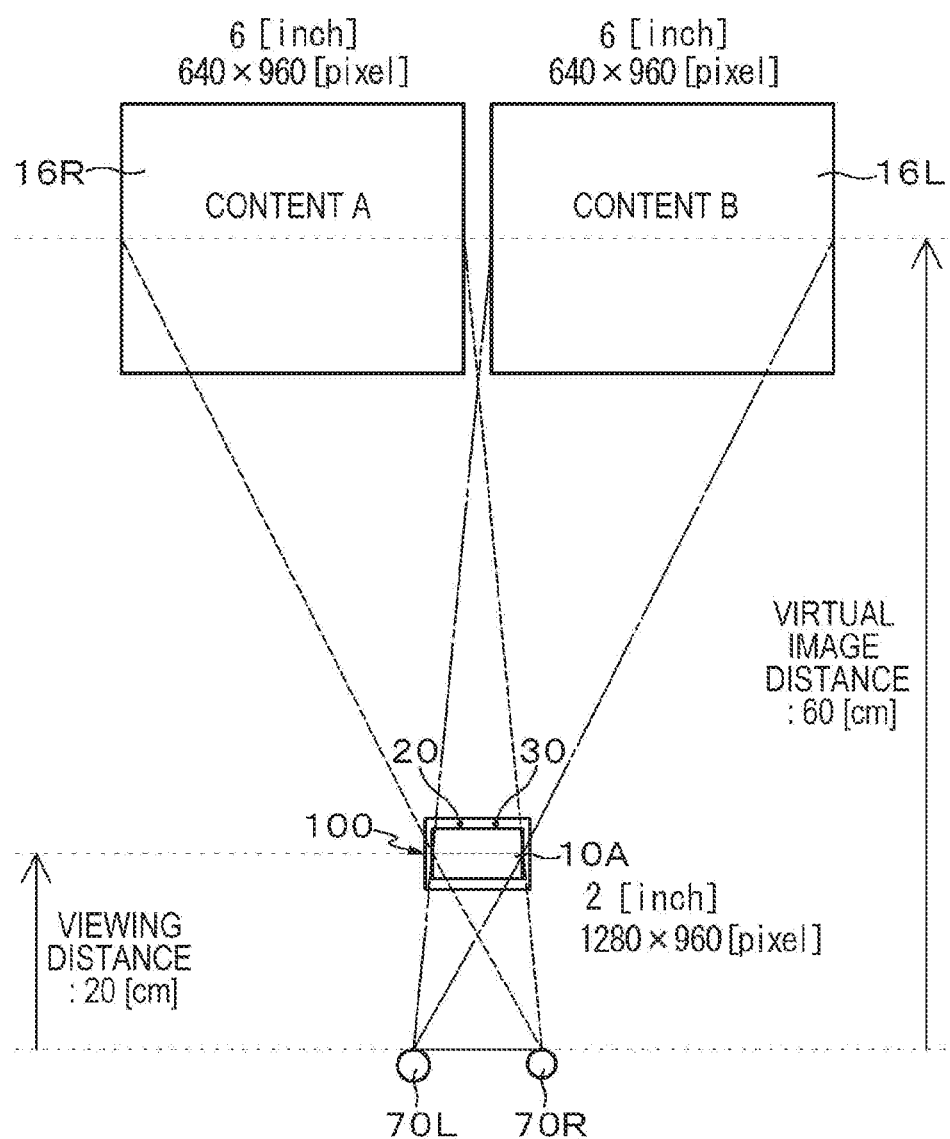
FIG. 10 is a diagram illustrating a virtual image presented by a display apparatus according to Example 2.

A display apparatus according to Example 2 is a modification example of the display apparatus according to Example 1. FIG. 10 is a diagram illustrating a virtual image presented by the display apparatus according to Example 2.

With the display apparatus according to Example 1, the left-eye screen 16L and the right-eye screen 16R are configured such that the two screens come in contact with each other, being connected in the left-right direction. In contrast, as illustrated in FIG. 10, with the display apparatus according to Example 2, the left-eye screen 16L and the right-eye screen 16R are configured such that the two screens have a space inbetween, divided in the left-right direction.

Now, exemplary device specification of the display unit 10A of the wristwatch-type terminal 100 will be described. The display unit 10A of the wristwatch-type terminal 100 is assumed to have the screen size of 2 [inch], with 4 [cm] in width and 3 [cm] in height, with the number of pixels being 1280 [pixel] in width and 960 [pixel] in height. Moreover, the pixel pitch (pixel dimension) is assumed to be 31 [um], with the pitch of the virtual image lens 12 being 61 [um]. Under this device specification, exemplary setting would be such that the virtual image distance is 60 [cm] in a case where the viewing distance is 20 [cm]. In this case, the virtual image 15 is displayed as two screens, each having a screen size of 6 [inch], with the number of pixels being 640 [pixel] in width and 960 [pixel] in height, at a presentation position of the virtual image distance 60 [cm]

As described above, with the display apparatus according to Example 2, the virtual image can be presented on the two screens obtained by dividing the left-eye screen 16L and the right-eye screen 16R in the left-right direction. This enables simultaneous display of information of different (two types of) content A and B on the two screens of the left-eye screen 16L and the right-eye screen 16R, even though display of same content would not be expected. Even in this case, all pixels of the display unit 10A are used by the two screens.

Figure 11A:
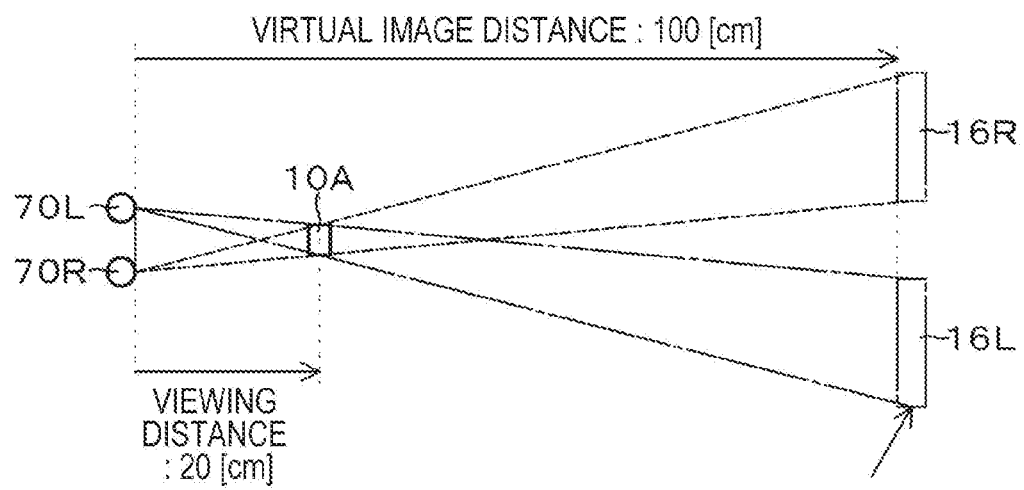
FIGS. 11A and 11B are diagrams each illustrating a case where a virtual image distance or a viewing distance is changed on a display apparatus according to a modification example of Example 1.

On the display apparatus according to the modification example of Example 1, it is possible to change the sizes of the two screens divided in the left-right direction by changing the virtual image distance by changing the focal length of the virtual image lens 12 even when the viewing distance is the same. For example, as illustrated in FIG. 11A, by setting the virtual image distance to 100 [cm] in a case where the viewing distance is 20 [cm], it is possible to display the virtual image 15 as the left-eye screen 16L and the right-eye screen 16R with the screen size of 10 [inch], with 20 [cm] in width and 15 [cm] in height.

Figure 11B:
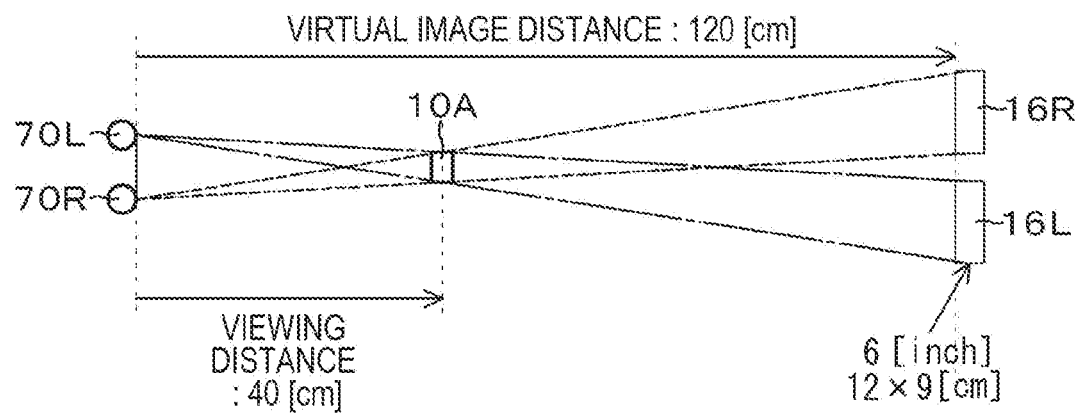

Moreover, by changing the viewing distance, it is possible to change the virtual image distance and the screen size of the left-eye screen 16L and the right-eye screen 16R. For example, as illustrated in FIG. 11B, by setting the viewing distance to 40 [cm], it is possible to display the virtual image 15 on the left-eye screen 16L and the right-eye screen 16R, each having the screen size 6 [inch], with 12 [cm] in width and 9 [cm] in height, at a presentation position with the virtual image distance of 120 [cm]. In any of the cases, the display unit 10A has the screen size 2 [inch] with 4 [cm] in width and 3 [cm] in height.

Example 3

Figure 12:
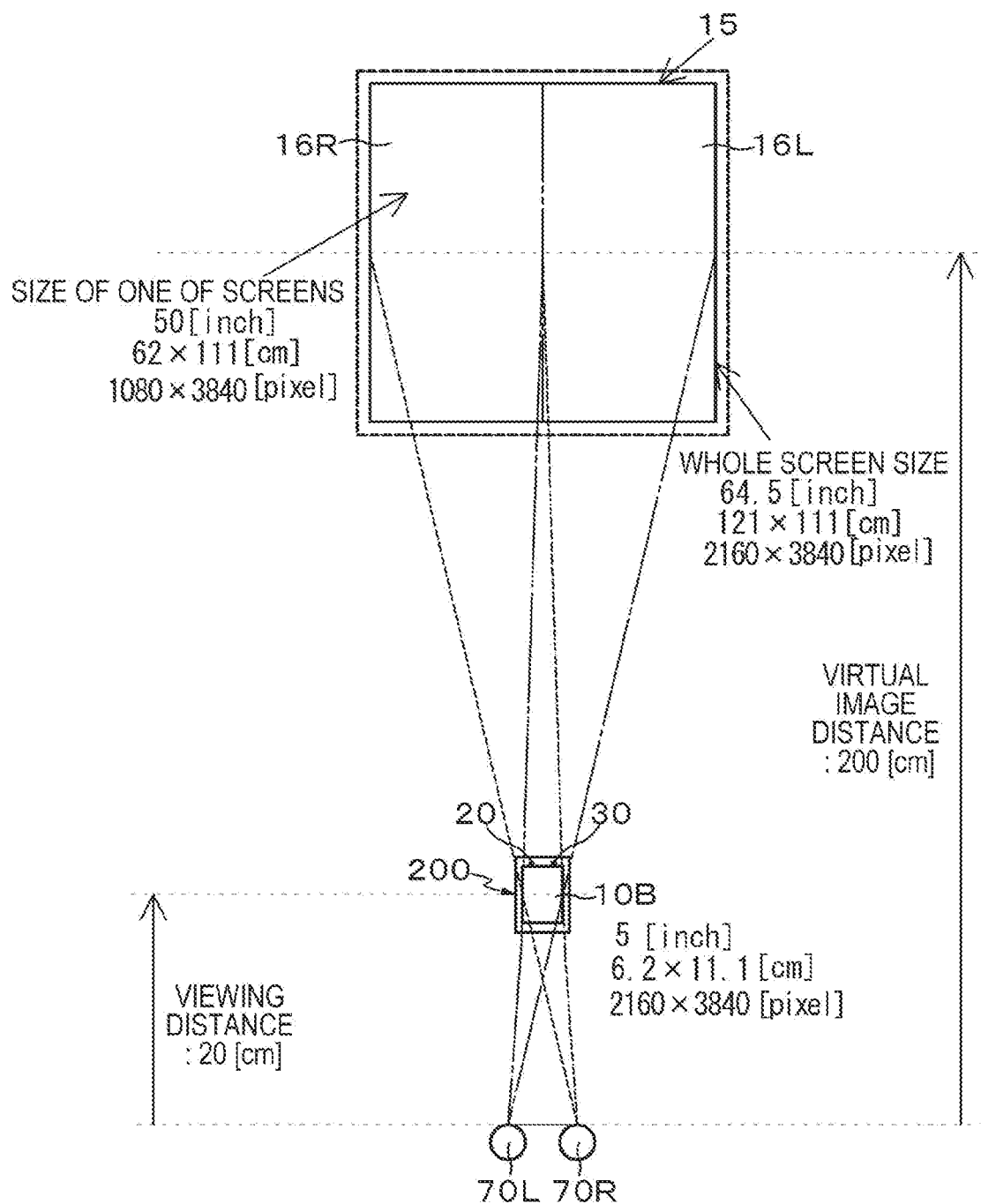
FIG. 12 is a diagram illustrating a virtual image presented by a display apparatus according to Example 3.

FIG. 12 is a diagram illustrating a virtual image presented by a display apparatus according to Example 3. Example 3 illustrates an exemplary case where the display apparatus according to the first embodiment is used as a display apparatus of a mobile terminal such as a mobile phone and a smartphone.

In FIG. 12, a display unit 10B of a mobile terminal 200 corresponds to the display unit 10 in FIG. 1. As illustrated in FIG. 12, the imaging unit 20 and the ranging unit 30 in FIG. 1 are arranged at a peripheral portion of the display unit 10B of the mobile terminal 200. The signal processing unit 40 and the display control unit 50 in FIG. 1 are incorporated, in a form of an IC, for example, into the mobile terminal 200.

Now, exemplary device specification of the display unit 10B of the mobile terminal 200 will be described. It is assumed that the display unit 10B of the mobile terminal 200 is a vertically long screen, having the screen size 5 [inch], with 6.2 [cm] in width and 11.1 [cm] in height, with the number of pixels being 2160 [pixel] in width and 3840 [pixel] in height. Moreover, the pixel pitch (pixel dimension) is assumed to be 29 [um], with the pitch of the virtual image lens 12 being 59 [um].

Under the above-described device specification, it is assumed that, in a case where the viewing distance, that is, the distance from the observer to the display unit 10B, is 20 [cm], for example, the distance from the observer to the presentation position of the virtual image, namely, the virtual image distance, is set to 200 [cm], for example. In this case, display of the virtual image 15 is performed as two screens of the left-eye screen 16L and the right-eye screen 16R, having the screen size of 50 [inch], with 62 [cm] in width and 111 [cm] in height, and the number of pixels being such that 1080 [pixel] in width, 3840 [pixel] in height, at the presentation position with the virtual image distance 200 [cm].

That is, each of the two screens for displaying the virtual image 15 has the number of pixels in the horizontal direction being half the number of pixels of the display unit 10B and the number of pixels in the vertical direction being equal to the number of pixels of the display unit 10B, for each of the left and right eyes 70L and 70R. Further, as a whole screen of two screens, the screen size would be 64.5 [inch], with 121 [cm] in width and 111 [cm] in height, with the number of pixels being 2160 [pixel] in width and 3840 [pixel] in height. That is, the whole screen of two screens uses all the pixels of the display unit 10B. Display resolution of the virtual image would be the resolution corresponding to 4K resolution.

Moreover, when the screen of the display unit 10B of the mobile terminal 200 comes closer to the observer with the viewing distance 20 [cm] as a reference, the virtual image (two screens) is enlarged. In contrast, when the screen is away from the observer, the virtual image is reduced. When the viewing distance comes closer to 15 [cm], under the above-described device specification, for example, the virtual image 15 is displayed as two screens, each having the screen size 65 [inch], with 81 [cm] in width and 144 [cm] in height, at a presentation position of the virtual image distance 195 [cm]. As a whole screen of two screens, the screen size would be 84 [inch], with 159 [cm] in width and 144 [cm] in height. In contrast, when the viewing distance goes away to 30 [cm], for example, the virtual image 15 is displayed as two screens, each having screen size of 35 [inch], with 44 [cm] in width and 78 [cm] in height, at a presentation position of the virtual image distance 210 [cm]. As a whole screen of two screens, the screen size would be 45 [inch], being 83 [cm] in width, 78 [cm] in height.

As described above, with the display apparatus according to Example 3, the virtual image 15 can be displayed at a presentation position less distant than the display unit 10B of the mobile terminal 200. Accordingly, it is possible to reduce eye strain on the observer. That is, by shifting the focus position formed by the lens of the eyeball to a more distant position over the display surface of the display unit 10B using virtual image viewing, it is possible to reduce eye strain on the observer caused by observation of a screen on hand, existing in a short distance, such as the display unit 10B of the mobile terminal 200.

In particular, in the case of the mobile terminal 200 such as a mobile phone and a smartphone, viewing the screen of the display unit 10B during the movement would shift the viewer's focus on one's hand, and thus, would make it difficult to grasp a surrounding status. In contrast, with the display apparatus according to Example 3, the viewer's focus would be on a distant position even in viewing the screen of the display unit 10B, and thus, it would be easy to grasp the surrounding status.

Furthermore, the mobile terminal 200 is configured such that the screen size of the display unit 10B is physically restricted to the size up to approximately five inches in consideration of portability and along with this, content to be displayed is also restricted. Even under this restriction, with the display apparatus according to Example 3, it is possible to display the image (virtual image) in an enlarged screen size, more distant from the display unit 10B using virtual image display. In particular, it is possible to display the virtual image with a large number of pixels that exceeds the eyesight limitation (1920×1080), and thus, to greatly increase the amount of information to be presented.

On the mobile terminal 200, the display unit 10B is typically used as a vertically long screen. Accordingly, information extending in the horizontal direction is wrapped to the next line, and a horizontally long photo is displayed with unavailable black portions in the upper and lower portions of the photo because its horizontal width is restricted, resulting in viewing the photo on a small screen. In contrast, with the display apparatus according to Example 3, virtual image display enables display of the image (virtual image) with a horizontally wide screen size, more distant from the display unit 10B. Accordingly, it is possible to significantly enhance flexibility for the content to be displayed.

Example 4

Figure 13:
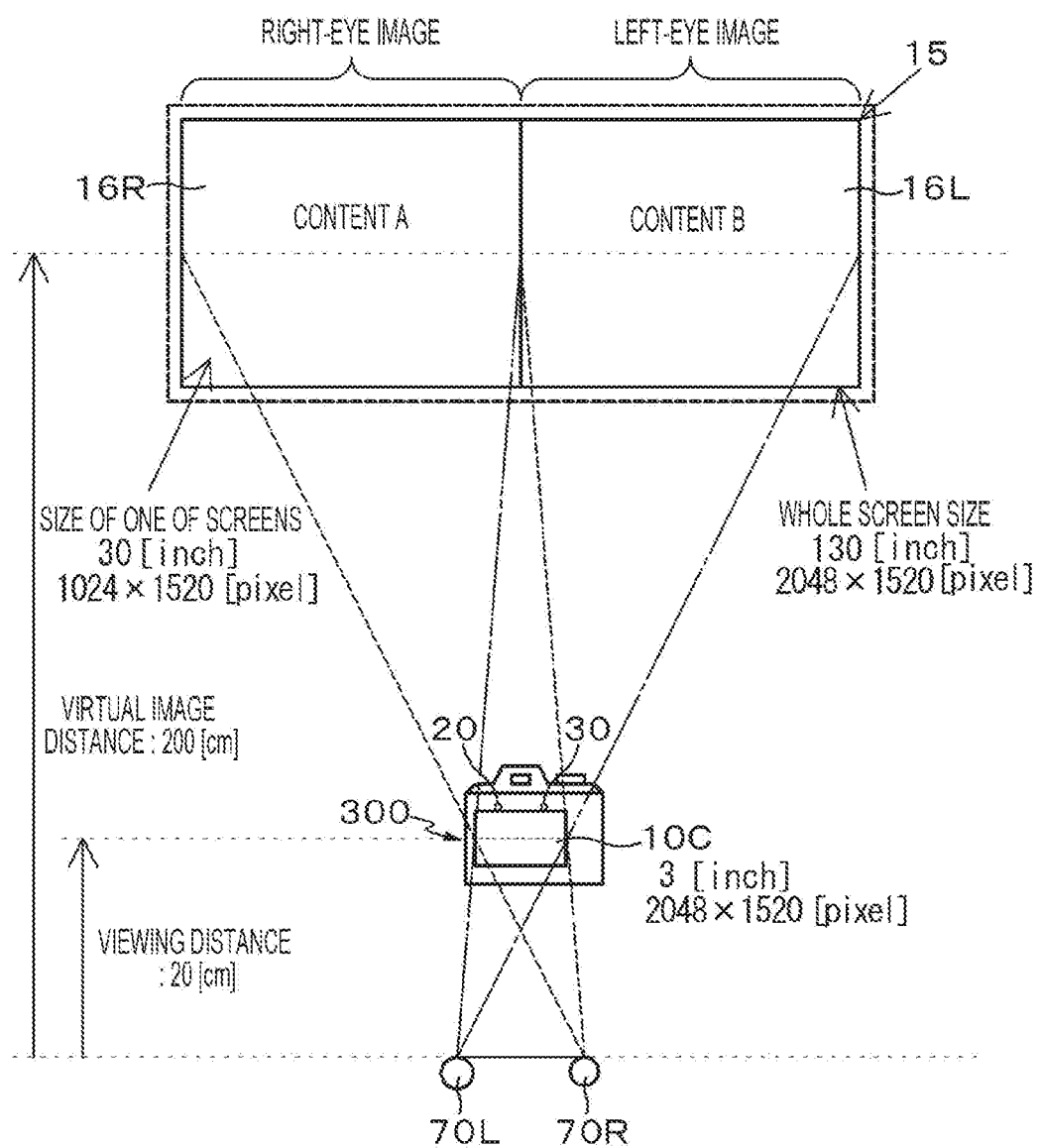
FIG. 13 is a diagram illustrating a virtual image presented by a display apparatus according to Example 4.

FIG. 13 is a diagram illustrating a virtual image presented by a display apparatus according to Example 4. Example 4 illustrates an exemplary case where the display apparatus according to the first embodiment is used as a display apparatus of a camera apparatus such as a still camera and a video camera.

In FIG. 13, a display unit 10C of a camera apparatus 300 corresponds to the display unit 10 in FIG. 1. As illustrated in FIG. 13, the imaging unit 20 and the ranging unit 30 in FIG. 1 are arranged at a peripheral portion of the display unit 10C of the camera apparatus 300. The signal processing unit 40 and the display control unit 50 in FIG. 1 are incorporated, in a form of an IC, for example, into the camera apparatus 300.

Now, exemplary device specification of the display unit 10C of the camera apparatus 300 will be described. The display unit 10C of the camera apparatus 300 is assumed to have the screen size of 3 [inch], with 6.1 [cm] in width and 4.6 [cm] in height, with the number of pixels being 2048 [pixel] in width and 1520 [pixel] in height. Moreover, the pixel pitch (pixel dimension) is assumed to be 30 [um], with the pitch of the virtual image lens 12 being 60 [um].

Under the above-described device specification, it is assumed that, in a case where the viewing distance, that is, the distance from the observer to the display unit 10C, is 20 [cm], for example, the distance from the observer to the presentation position of the virtual image, namely, the virtual image distance, is set to 200 [cm], for example. In this case, display of the virtual image 15 is performed as two screens of the left-eye screen 16L and the right-eye screen 16R, having the screen size of 6 [inch], with 12 [cm] in width and 9 [cm] in height, and the number of pixels being such that 1024 [pixel] in width, 1520 [pixel] in height, at the presentation position with the virtual image distance 200 [cm].

That is, each of the two screens for displaying the virtual image 15 has the number of pixels in the horizontal direction being half the number of pixels of the display unit 10C and the number of pixels in the vertical direction being equal to the number of pixels of the display unit 10C, for each of the left and right eyes 70L and 70R. Further, as a whole screen of two screen, the screen size would be 130 [inch], having the number of pixels being 2480 [pixel] in width and 1520 [pixel] in height. That is, the whole screen of two screens uses all the pixels of the display unit 10C.

As described above, with the display apparatus according to Example 4, the virtual image can be presented on the two screens adjoining the left-eye screen 16L and the right-eye screen 16R in the left-right direction. This enables simultaneous display of information of different (two types of) content A and B on the two screens of the left-eye screen 16L and the right-eye screen 16R. The camera apparatus 300 such as a still camera and a video camera is preferably configured to display an image of a subject, for example, on the right-eye screen 16R, and to display photographing conditions such as the shutter speed and histogram on the left-eye screen 16L. In this manner, by displaying photographing conditions such as shutter speed and histogram in the vicinity of the image of the subject by utilizing two horizontally expanding two-screen display, the photographer can perform photographing under optimum conditions while confirming photographing conditions.

The camera apparatus 300 such as a still camera and a video camera performs operation to determine composition of the subject in photographing. At this time, since the eye focuses on a distant point when viewing the subject, the screen of the display unit 10C on the camera apparatus 300 in front would blur. In contrast, when the composition is determined while viewing the screen on the display unit 10C, the focus is on the display unit 10C, leading to blur of the subject. With the display apparatus according to Example 4, it is possible to focus both on the subject and the display unit 10C, and thus, to easily determine the composition of the subject in photographing.

Moreover, with the display apparatus according to Example 4, the virtual image 15 can be displayed at a presentation position less distant than the display unit 10C of the camera apparatus 300. Accordingly, it is possible to reduce eye strain on the observer. That is, by shifting the focus position formed by the lens of the eyeball to a more distant position from the display surface of the display unit 10C using virtual image viewing, it is possible to reduce eye strain on the observer caused by observation of a screen on hand, existing in a short distance, such as the display unit 10C of the camera apparatus 300.

The above-described Examples 1 to 4 are exemplary cases where the left-eye screen 16L for presenting the left-eye image (virtual image) and the right-eye screen 16R for presenting the right-eye image (virtual image) are arranged as two adjoining (continuous) screens in the left-right direction, or two divided screen in the left-right direction. That is, in Examples 1 to 4, the left-eye image and the right-eye image would not overlap with each other in the left-right direction. The display apparatus according to the first embodiment, however, is not limited to this configuration but may be configured to cause the left-eye image and the right-eye image to overlap with each other in the left-right direction. Hereinafter, an example in which the left-eye image and the right-eye image overlap with each other in the left-right direction will be described.

Example 5

Figure 14A:
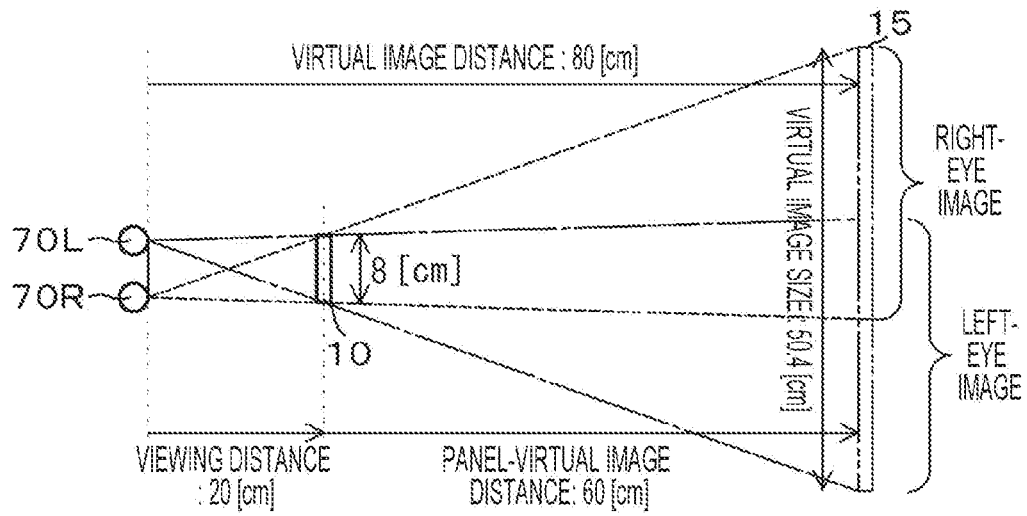
FIGS. 14A and 14B are diagrams each illustrating a virtual image presented by a display apparatus according to Example 5.
Figure 14B:
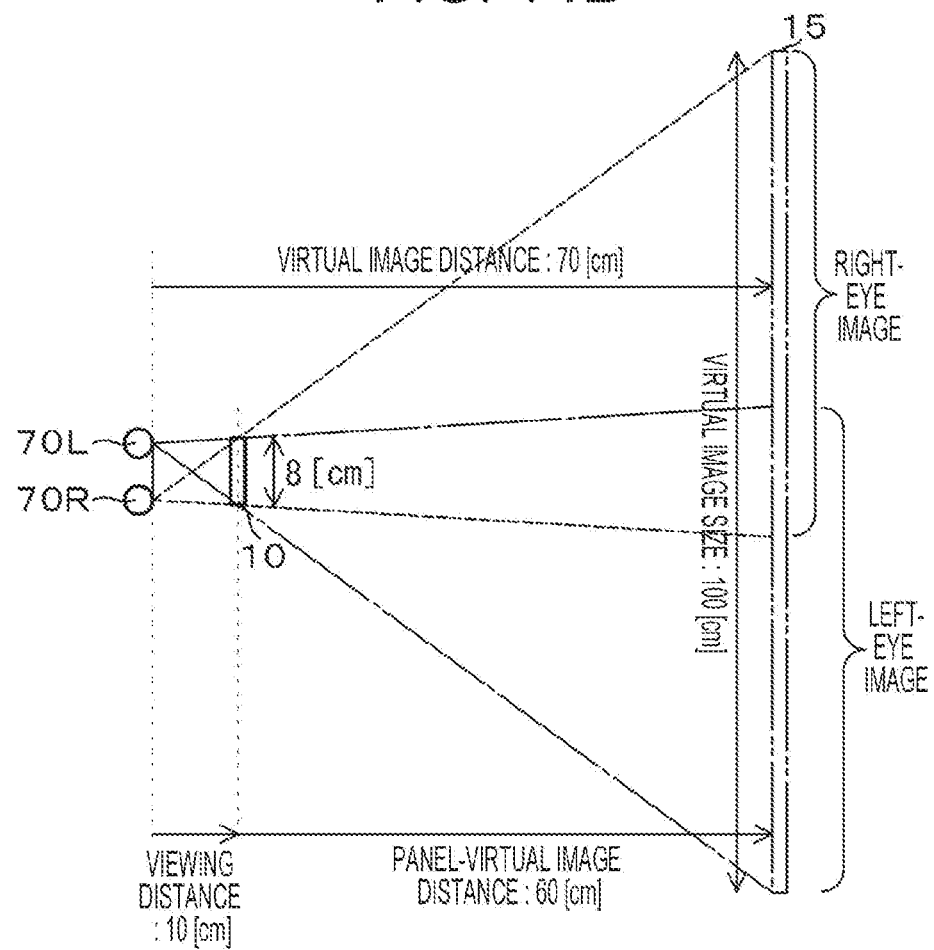

FIGS. 14A and 14B is a diagram illustrating a virtual image presented by a display apparatus according to Example 5. Example 5 is an exemplary case where a distant-display optical system in which the virtual image is presented at a position more distant than the display surface of the display unit 10 (refer to FIG. 5) has a fixed focus, that is, where the virtual image lens 12 is formed with a fixed focus lens. FIG. 14A illustrates a case where the viewing distance is 20 [cm]. FIG. 14B illustrates a case where the viewing distance is 10 [cm]. As an exemplary dimension, the size (hereinafter, referred to as "panel size") of the screen of the display unit 10 in the horizontal direction (lateral direction) is 8 [cm]. Moreover, the virtual image 15 is illustrated in a two-dot chain line. These points will also apply to each of Examples to be described below.

First, an exemplary case where the virtual image distance is set to 80 [cm] in a case where the viewing distance in FIG. 14A is 20 [cm] will be described. This virtual image distance is determined by the focal length of virtual image lens 12, that is, the focal length of the fixed focus lens. In this case, presentation of the virtual image 15 is performed at a presentation position where the virtual image distance is 80 [cm] under the signal processing by the signal processing unit 40 and under the display control by the display control unit 50, illustrated in FIG. 1. More specifically, the signal processing unit 40 and the display control unit 50 generates image information to allow a portion of the left side of the left-eye image and a portion of the right side of the right-eye image to overlap with each other, and the virtual image 15 is presented at a presentation position where the virtual image distance is 80 [cm] by driving the left-eye pixel 13L and the right-eye pixel 13R on the basis of the image information.

Under the setting conditions that the viewing distance is 20 [cm] and the virtual image distance is 80 [cm] when the panel size is 8 [cm], virtual image distance, presentation of a virtual image with virtual image size of 50.4 [cm] is performed at a presentation position with the virtual image distance with the state in which a portion of the left side of the left-eye image and a portion of the right side of the right-eye image are overlapping with each other. Herein, the virtual image size refers to the size of the virtual image 15 in the left-right direction (horizontal direction/lateral direction). At this time, the distance from the display unit 10 to the presentation position of the virtual image (hereinafter, referred to as "panel-virtual image distance") would be 60 [cm] (=virtual image distance 80 [cm]−viewing distance 20 [cm]).

Note that a region in which a portion of the left side of the left-eye image and a portion of the right side of the right-eye image overlap with each other would preferably display any one of the images of the left-eye images and right-eye images, or display the left-eye image and right-eye image after performing interpolation processing on these images. With this configuration, it is possible to suppress the occurrence of phenomenon that the region where a portion of the left side of the left-eye image and a portion of the right side of the right-eye image overlap with each other becomes double images or that luminance becomes higher than other regions. This also applies to each of Examples to be described below.

Next, in contrast to the state of FIG. 14A in which the viewing distance is 20 [cm], FIG. 14B illustrates a state in which the viewing distance has been changed from 20 [cm] to 10 [cm]. By changing the viewing distance from 20 [cm] to 10 [cm], presentation of the virtual image 15 (virtual image size is 100 [cm]) is performed at a presentation position where the virtual image distance 70 [cm]. At this time, the panel-virtual image distance would be 60 [cm] (=virtual image distance 70 [cm]−viewing distance 10 [cm]) unchanged from the case where the viewing distance is 20 [cm].

With the above-described display apparatus according to Example 5, it is possible to change the virtual image size from a state of FIG. 14A to a state of FIG. 14B (or vice versa) by merely changing the viewing distance, without adjusting image information (display image information) for driving the display unit 10. Accordingly, in a case where the display apparatus is used as a display apparatus of a wristwatch-type terminal, a mobile terminal such as a mobile phone and a smartphone, or as a camera apparatus such as a still camera and a video camera, it is possible to change the virtual image size merely by changing the distance at which the observer holds these terminals (apparatuses) with hand, namely, a hand-holding distance. As a result, it is possible to display the virtual image in an easy-to-view size.

Example 6

Figure 15A:
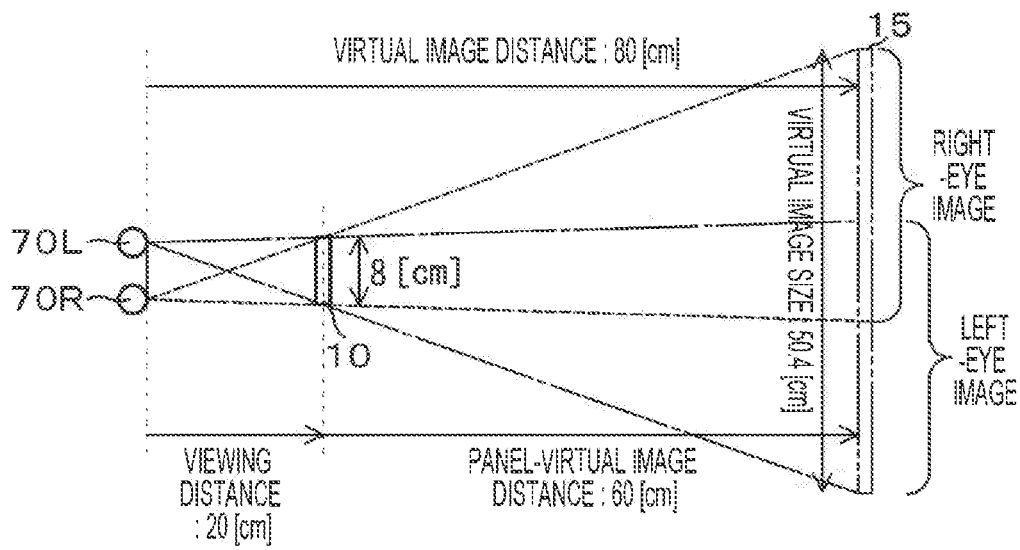
FIGS. 15A and 15B are diagrams each illustrating a virtual image presented by a display apparatus according to Example 6.
Figure 15B:
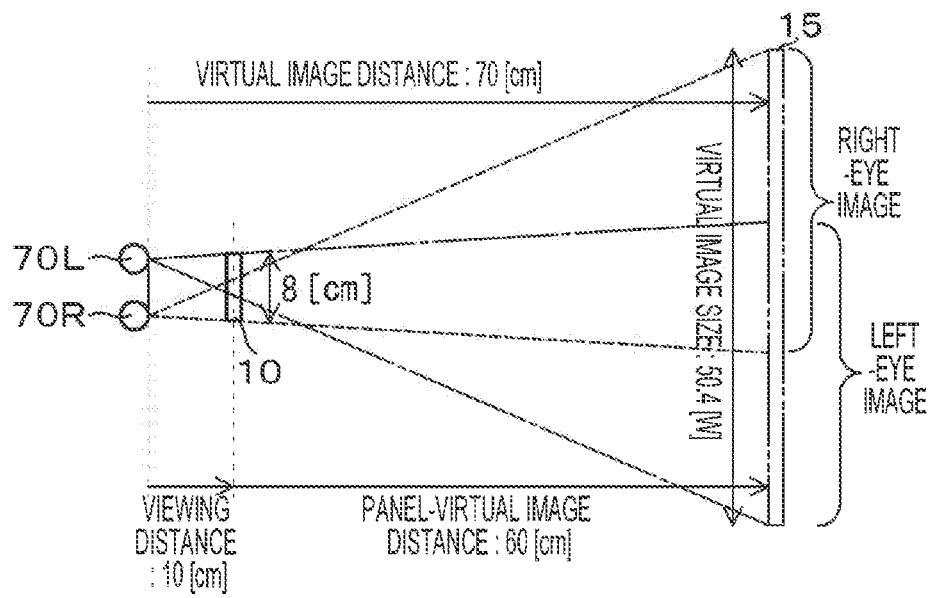

Example 6 is a modification example of Example 5. FIGS. 15A and 15B are diagrams each illustrating a virtual image presented by a display apparatus according to Example 6. Example 6 is an exemplary case where the distant-display optical system has a fixed focus and the virtual image size is fixed. FIG. 15A illustrates a case where the viewing distance is 20 [cm]. FIG. 15B illustrates a case where the viewing distance is 10 [cm].

The state of FIG. 15A is the same as the state of FIG. 14A. That is, in the state of FIG. 15A, under the setting conditions that the viewing distance is 20 [cm] and the virtual image distance is 80 [cm], presentation of the virtual image 15 with virtual image size of 50.4 [cm] is performed at a presentation position with the virtual image distance in the state in where a portion of the left side of the left-eye image and a portion of the right side of the right-eye image are overlapping with each other.

In contrast, in the state of FIG. 15B, presentation of the virtual image 15 with a same virtual image size 50.4 [cm] is performed at a presentation position where virtual image distance is 70 [cm], even when the viewing distance is changed from 20 [cm] to 10 [cm]. In order to fix the virtual image size regardless of the viewing distance in this manner, it would be necessary to adjust an image display range for an effective pixel region on the display unit 10 in the left-right direction, in accordance with the viewing distance. Herein, the "effective pixel region" represents a region of pixels that contribute to presentation (display) of the virtual image 15.

Figure 16A:
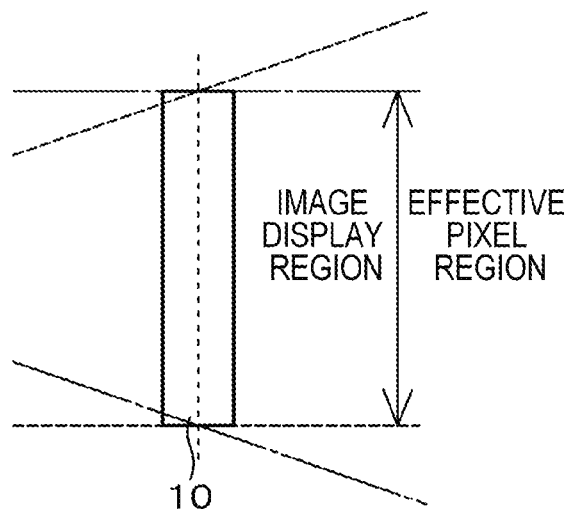
FIGS. 16A and 16B are diagrams each illustrating an image display range when the virtual image size is fixed regardless of the viewing distance in Example 6.
Figure 16B:
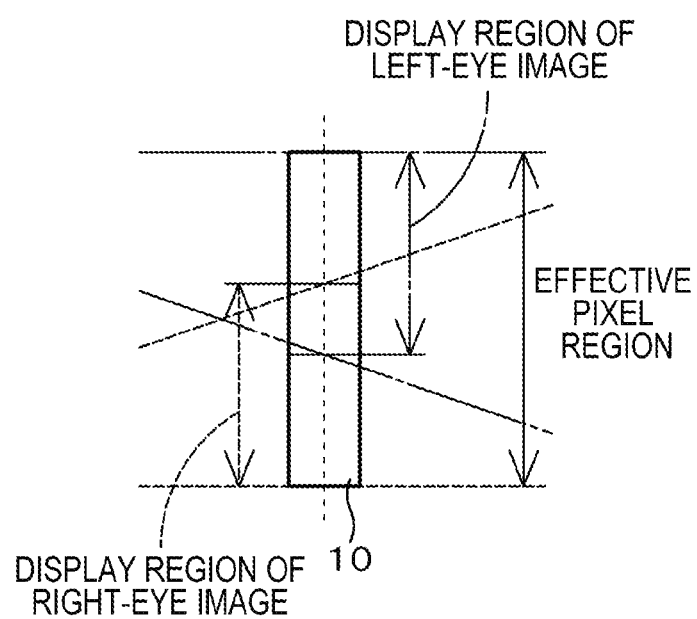

Specifically, in a state illustrated in FIG. 15A, the whole effective pixel region on the display unit 10 in the left-right direction would be used as an image display range in both the left-eye image and the right-eye image, as illustrated in FIG. 16A. In a state illustrated in FIG. 15B, a predetermined range from the left end of the effective pixel region on the display unit 10 would be used as an image display range for the left-eye image, and a predetermined range from the right end of the effective pixel region on the display unit 10 would be used for an image display range for the right-eye image, as illustrated in FIG. 16B. In other words, anon-image display region is provided at a portion on the right end side of the effective pixel region of the display unit 10 for the left-eye image, and a non-image display region is provided at a portion on the left end side of the effective pixel region of the display unit 10 for the right-eye image. Subsequently, by arranging the image display range in accordance with the viewing distance, the virtual image distance changes from 80 [cm] to 70 [cm] even when the distant-display optical system has a fixed focus, making it possible to fix the virtual image size.

With the above-described display apparatus according to Example 6, it is possible to present the virtual image 15 in a state where the virtual image size is fixed, even when the viewing distance is changed from a state of FIG. 15A to a state of FIG. 15B (or vice versa). Accordingly, in a case where the display apparatus is used as a display apparatus of a wristwatch-type terminal, a mobile terminal such as a mobile phone and a smartphone, or as a camera apparatus such as a still camera and a video camera, a hand-holding distance for these terminals (apparatuses) changes but the virtual image size would not be changed. As a result, it is possible to avoid troubles including a case of becoming sick from hand-holding distance blur.

Example 7

Figure 17A:
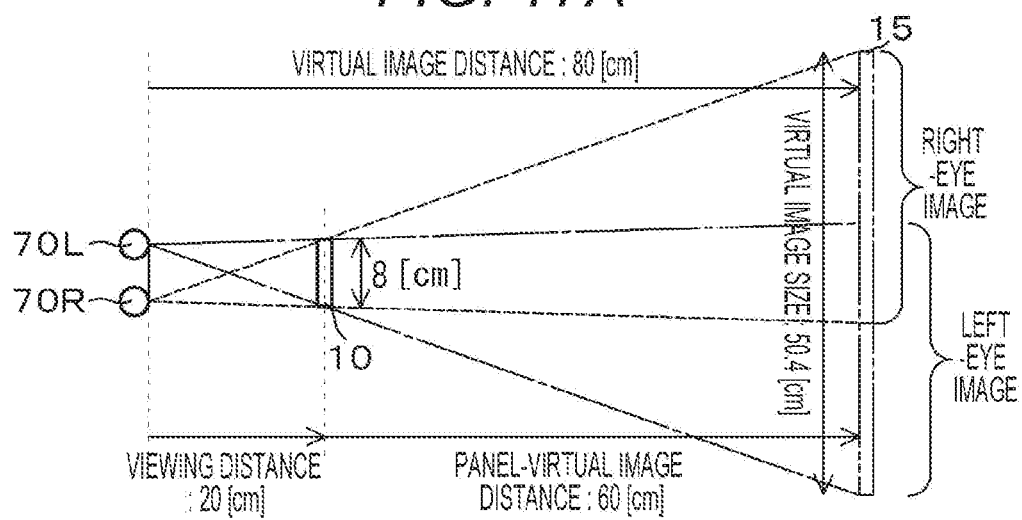
FIGS. 17A and 17B are diagrams each illustrating a virtual image presented by a display apparatus according to Example 7.
Figure 17B:
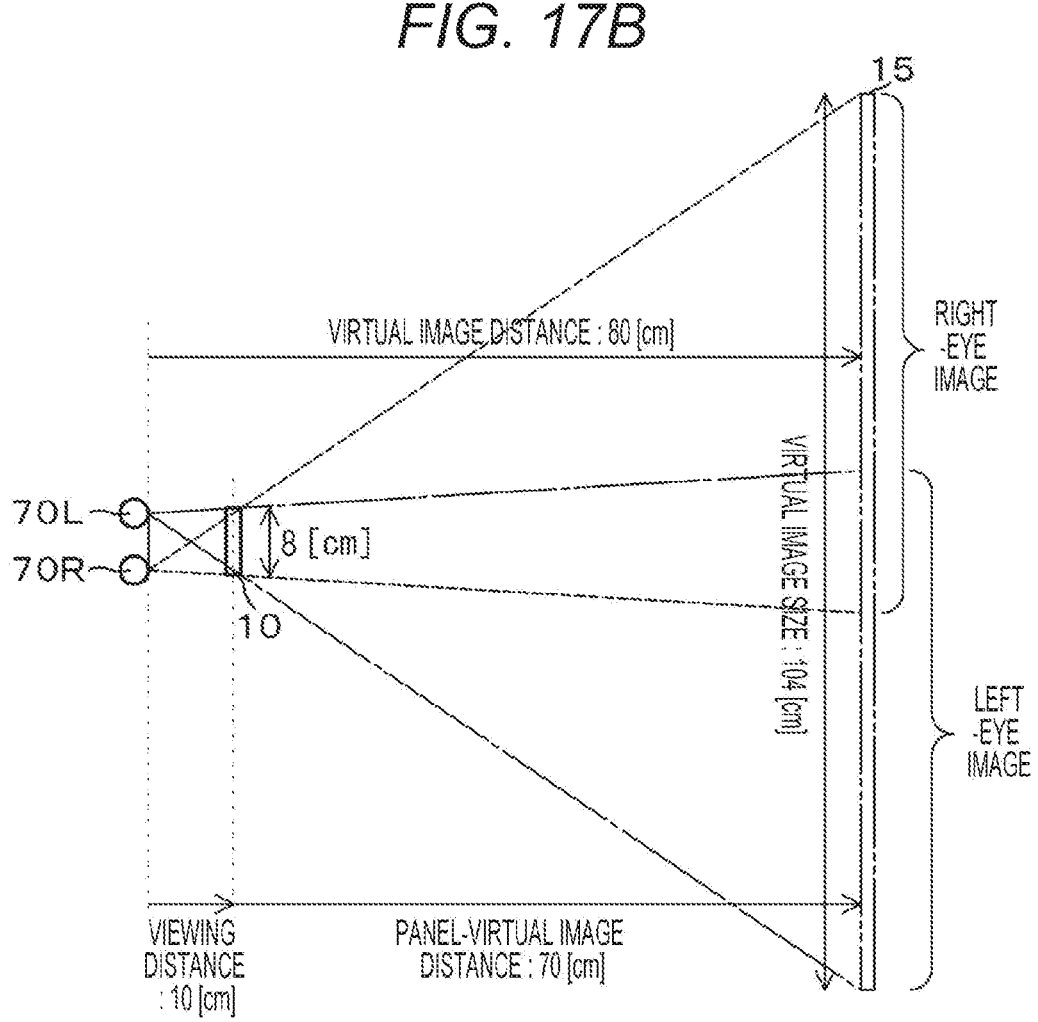

FIGS. 17A and 17B are diagrams each illustrating a virtual image presented by a display apparatus according to Example 7. Example 7 is an exemplary case where a distant-display optical system in which the virtual image is presented at a position more distant than the display surface of the display unit 10 (refer to FIG. 5) has a variable focus, that is, where the virtual image lens 12 is formed with a variable focus lens. FIG. 17A illustrates a case where the viewing distance is 20 [cm]. FIG. 17B illustrates a case where the viewing distance is 10 [cm].

The state of FIG. 17A is the same as the state of FIG. 14A. That is, in the state of FIG. 17A, under the setting conditions that the viewing distance is 20 [cm] and the virtual image distance is 80 [cm], presentation (display) of the virtual image 15 with virtual image size of 50.4 [cm] is performed at a presentation position with the virtual image distance with the state in which a portion of the left side of the left-eye image and a portion of the right side of the right-eye image are overlapping with each other. The presentation position of the virtual image distance 80 [cm] is determined by the focal length of the virtual image lens 12, that is, the focal length of the variable focus lens.

FIG. 17B is in a state where the viewing distance is 10 [cm]. Arrangement of the focal length of the virtual image lens 12, that is, the focal length of the variable focus lens is performed such that the virtual image distance becomes 80 [cm], same as the state in FIG. 17A. This adjustment is executed under the control by the display control unit 50 on the basis of designation of the user from the input unit 60, as illustrated in FIG. 1. With this arrangement, the virtual image 15 with the virtual image size of 104 [cm] is presented at the presentation position where the virtual image distance is 80 [cm]. The panel-virtual image distance at this time would be 70 [cm] (=virtual image distance 80 [cm]−viewing distance 10 [cm]).

With the above-described display apparatus according to Example 7, it is possible to change the virtual image size from a state of FIG. 17A to a state of FIG. 17B (or vice versa) by merely changing the viewing distance, without adjusting image information for driving the display unit 10. Accordingly, in a case where the display apparatus is used as a display apparatus of a wristwatch-type terminal, a mobile terminal such as a mobile phone and a smartphone, or as a camera apparatus such as a still camera and a video camera, it is possible to change the virtual image size merely by changing the hand-holding distance for these terminals (apparatuses).

Furthermore, with the display apparatus according to Example 7, the distant-display optical system uses a variable focus, that is, the virtual image lens 12 is a variable focus lens, and its focal length is adjustable. Accordingly, the virtual image distance determined by the focal length can be adjusted to be constant in accordance with the viewing distance. This enables display of the virtual image with easy-to-view dimensions (size) while maintaining (or after maintaining) the virtual image distance to a constant distance.

Example 8

Figure 18A:
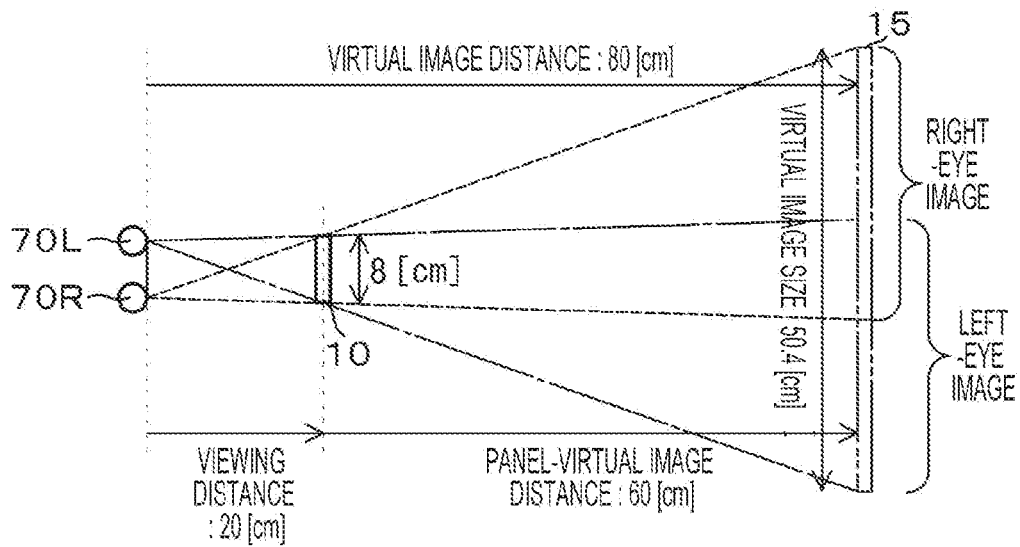
FIGS. 18A and 18B are diagrams each illustrating a virtual image presented by a display apparatus according to Example 8.
Figure 18B:
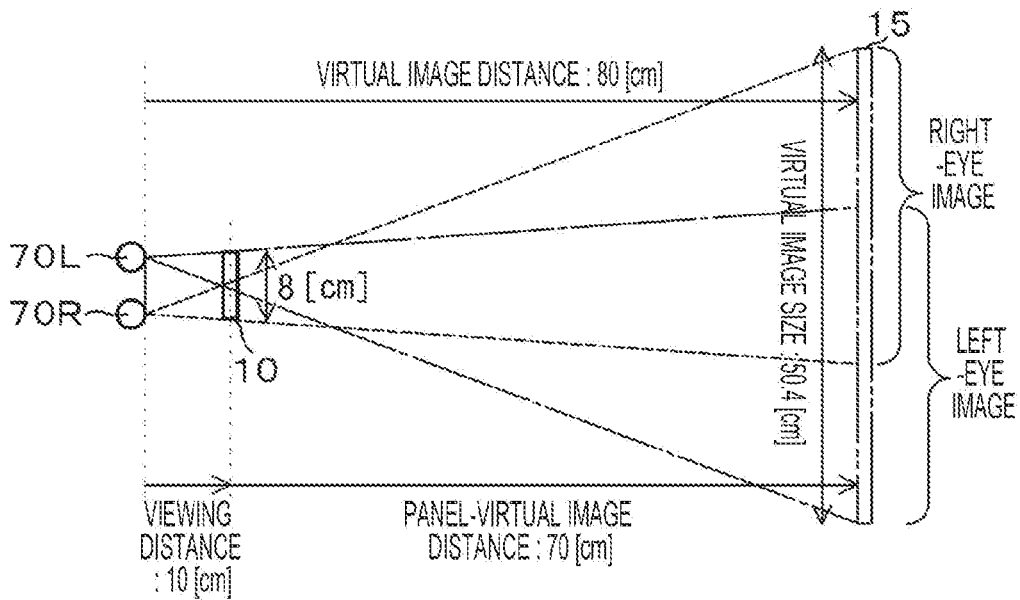

Example 8 is a modification example of Example 7. FIGS. 18A and 18B are diagrams each illustrating a virtual image presented by a display apparatus according to Example 7. Example 7 is an exemplary case where the distant-display optical system uses a variable focus and the virtual image size is fixed. FIG. 18A illustrates a case where the viewing distance is 20 [cm]. FIG. 18B illustrates a case where the viewing distance is 10 [cm].

The state of FIG. 18A is the same as the state of FIG. 14A. That is, in the state of FIG. 18A, under the setting conditions that the viewing distance is 20 [cm] and the virtual image distance is 80 [cm], presentation of the virtual image 15 with the virtual image size of 50.4 [cm] is performed at a presentation position with the virtual image distance in a state in where a portion of the left side of the left-eye image and a portion of the right side of the right-eye image are overlapping with each other.

In contrast, in a state of FIG. 18B, even in a state where the viewing distance has been changed from 20 [cm] to 10 [cm], the virtual image 15 with the same size, that is, with the virtual image size of 50.4 [cm], is presented at a presentation position where the virtual image distance is 80 [cm]. In this manner, in order to fix the virtual image size regardless of the viewing distance, it would be necessary to adjust an image display range for an effective pixel region on the display unit 10 in the left-right direction, in accordance with the viewing distance.

Figure 19A:
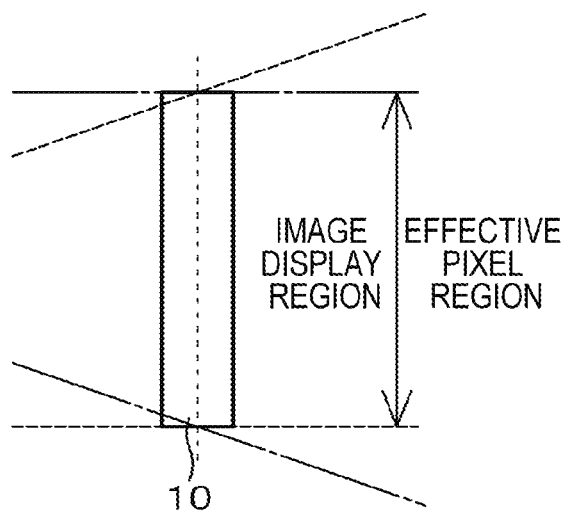
FIGS. 19A and 19B are diagrams each illustrating an image display range when the virtual image size is fixed regardless of the viewing distance in Example 8.
Figure 19B:
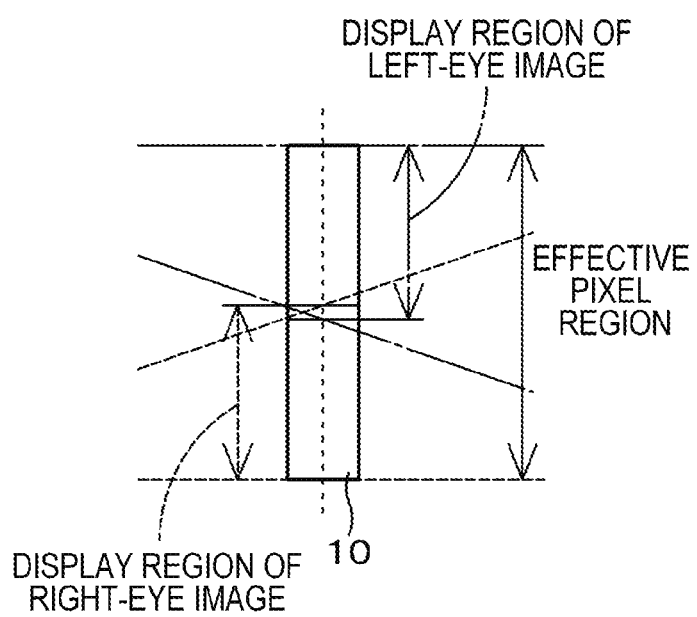

Specifically, in a state illustrated in FIG. 18A, the whole effective pixel region on the display unit 10 in the left-right direction would be used for an image display range in both the left-eye image and the right-eye image, as illustrated in FIG. 19A. In a state illustrated in FIG. 18B, a predetermined range from the left end of the effective pixel region on the display unit 10 would be used as an image display range for the left-eye image, and a predetermined range from the right end of the effective pixel region on the display unit 10 would be used for an image display range for the right-eye image, as illustrated in FIG. 19B. In other words, anon-image display region is provided at a portion on the right end side of the effective pixel region of the display unit 10 for the left-eye image, and a non-image display region is provided at a portion on the left end side of the effective pixel region of the display unit 10 for the right-eye image. Subsequently, by arranging the image display range in accordance with the viewing distance, it is possible to fix the virtual image size while maintaining (or after maintaining to a constant distance) the virtual image distance at 80 [cm] because the distant-display optical system has a fixed focus.

With the above-described display apparatus according to Example 8, it is possible to present the virtual image 15 in a state where the virtual image size is fixed while maintaining the virtual image distance at a constant distance, even when the viewing distance is changed from a state of FIG. 18A to a state of FIG. 18B (or vice versa). Accordingly, in a case where the display apparatus is used as a display apparatus of a wristwatch-type terminal, a mobile terminal such as a mobile phone and a smartphone, or as a camera apparatus such as a still camera and a video camera, a hand-holding distance for these terminals (apparatuses) changes but the virtual image size would not be changed. As a result, it is possible to avoid troubles including a case of becoming sick from hand-holding distance blur.

<Display Apparatus According to Second Embodiment>

Figure 20A:
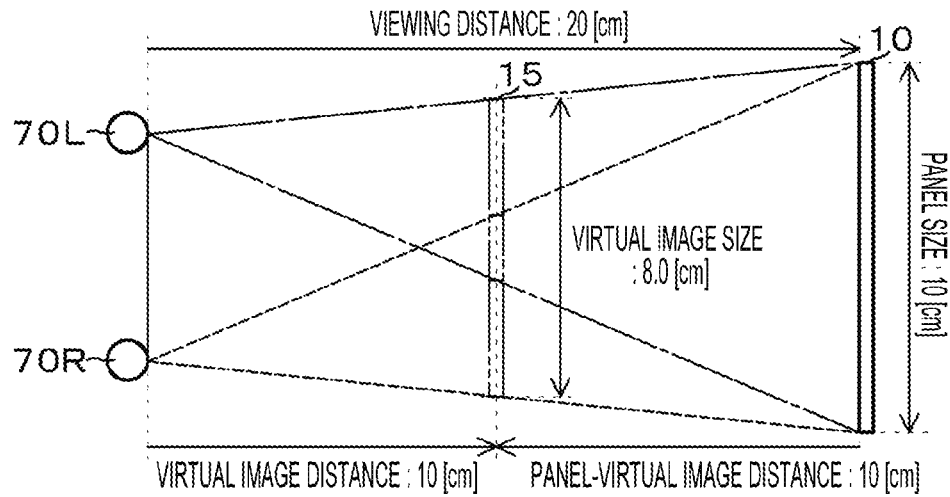
FIGS. 20A, 20B, and 20C are diagrams each illustrating a virtual image presented by a display apparatus according to Example 9.
Figure 20B:
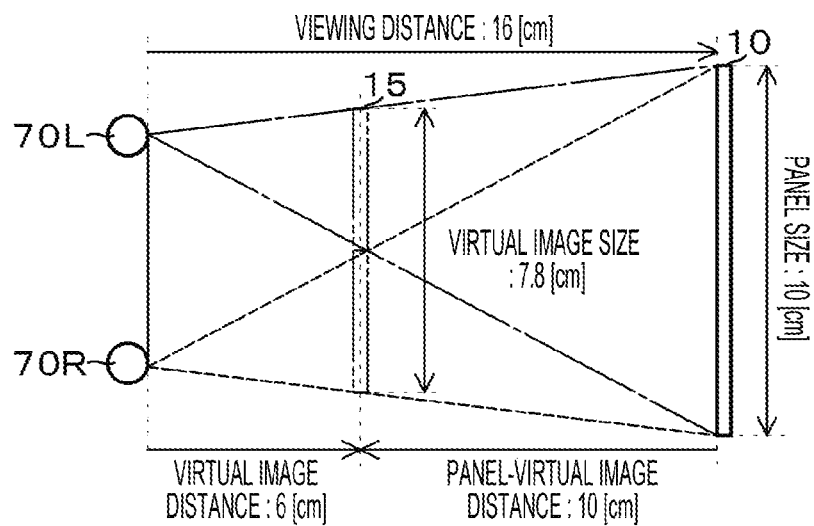
Figure 20C:
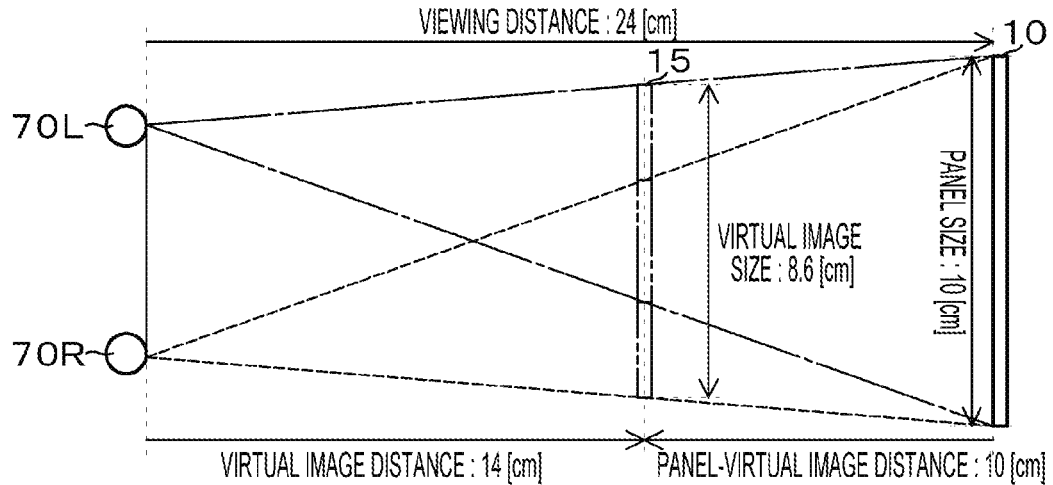

A display apparatus according to a second embodiment is a virtual image display apparatus configured to present a virtual image at a position less distant than (in front of) the display surface of the display unit 10 and to perform presentation of the virtual image such that a right side of a left-eye image and a left-side of a right-eye image adjoin or overlap with each other at the presentation position of the virtual image. FIGS. 20A, 20B, and 20C are diagrams each illustrating a virtual image presented by a display apparatus according to second embodiment. FIGS. 20A, 20B, and 20C, a light beam related to the left eye 70L of the observer is illustrated with a one-dot chain line and a light beam related to the right eye 70R is illustrated with a broken line. Moreover, the interval between the left eye 70L and the right eye 70R of the observer (interocular) is assumed to be 65 [mm], for example. These points will also apply to each of Examples to be described below.

On the display apparatus according to the second embodiment, presentation (display) of the virtual image is executed under signal processing by the signal processing unit 40 and under the display control by the display control unit 50, illustrated in FIG. 1. That is, the display control unit 50 drives the left-eye pixel 13L and the right-eye pixel 13R of the display unit 10 on the basis of the image information generated by the signal processing unit 40 and thereby presenting a virtual image at a presentation position set at a position less distant than the display surface of the display unit 10 in accordance with the focal length and viewing distance of the virtual image lens 12. More specifically, the signal processing unit 40 generates image information that causes the left side of the left-eye image and the right side of the right-eye image to overlap with each other. The display control unit 50 drives the left-eye pixel 13L and the right-eye pixel 13R on the basis of the image information generated by the signal processing unit 40 and thereby presenting a virtual image 15 at a presentation position set at a position less distant than the display surface of the display unit 10.

The display apparatus according to the second embodiment is a virtual image display apparatus that includes a vicinity-display optical system that presents the virtual image 15 at a position less distant from the observer than the display surface of the display unit 10, in which the virtual image lenses 12 are arranged, in an array, for adjoining even-number pixels including the left-eye pixel and the right-eye pixel, as a unit. Subsequently, the observer can view the virtual image 15, with both eyes, at a position less distant than (on front side) the display surface of the display unit 10, by one screen of the display unit 10. Accordingly, the display apparatus according to the second embodiment is useful as a virtual image display apparatus for a near-sighted observer in a state of naked eyes. That is, by shifting to a position to a more frontward position than the display surface of the display unit 10 in accordance with a focus position determined by eyeball lens using virtual image viewing, it is possible to view the display screen of the virtual image even with naked eyes of a near-sighted person who needs eyesight correction using eye glasses or contact lenses because of nearsightedness.

On the display apparatus according to the second embodiment, there is a case where the virtual image lens 12 is formed with a fixed focus lens and a case where the virtual image lens 12 is formed with a variable focus lens. Hereinafter, the case where the virtual image lens 12 is formed with a fixed focus lens will be described in details as Example 9, and the case where the virtual image lens 12 is formed with a variable focus lens will be described in detail as Example 10.

Example 9

FIGS. 20A, 20B, and 20C are diagrams each illustrating a virtual image presented by a display apparatus according to Example 9. Example 9 is an exemplary case where a vicinity-display optical system in which the virtual image is presented at a position less distant than the display surface of the display unit 10 (refer to FIG. 5) has a fixed focus, that is, where the virtual image lens 12 is formed with a fixed focus lens. FIG. 20A illustrates a case where the viewing distance is 20 [cm], FIG. 20B illustrates a case where the viewing distance is 16 [cm], and FIG. 20C illustrates a case where the viewing distance is 24 [cm].

An exemplary size of the display surface of the display unit 10 in the horizontal direction (lateral direction), namely, the panel size, is assumed to be 10 [cm], and an exemplary interval between the left eye 70L and the right eye 70R of the observer (interocular) is assumed to be 65 [mm]. Moreover, a light beam related to the left eye 70L of the observer is illustrated with a one-dot chain line, alight beam related to the right eye 70R is illustrated with a broken line, and the virtual image 15 is illustrated with a two-dot chain line. These points will also apply to Example 10 to be described below.

In a case where the viewing distance is 20 [cm] illustrated in FIG. 20A, the virtual image 15 having the virtual image size 8.0 [cm] is presented at a presentation position where the virtual image distance 10 [cm]. In a case where the viewing distance is 16 [cm] illustrated in FIG. 20B, the virtual image 15 having the virtual image size 7.8 [cm] is presented at a presentation position where the virtual image distance 6 [cm]. In a case where the viewing distance is 24 [cm] illustrated in FIG. 20C, the virtual image 15 having the virtual image size 8.6 [cm] is presented at a presentation position where the virtual image distance 14 [cm]. In any case, the image information (display image information) for driving the display unit 10 is not adjusted.

With the above-described display apparatus according to Example 9, it is possible to perform short-distance presentation of the virtual image 15 toward a near-sighted observer in a state of naked eyes by changing the presentation position (virtual image distance) of the virtual image 15 by changing the viewing distance without adjusting image information for driving the display unit 10. In this case, the observer manages to perform viewing by changing the virtual image distance in accordance with one's own eyesight.

Note that, in cases where the viewing distance is 20 [cm] as illustrated in FIG. 20A and where the viewing distance is 24 [cm] as illustrated in FIG. 20C, presentation of the virtual image 15 is performed with a portion of the left side of the left-eye image and a portion of the right side of the right-eye image overlapping with each other. Note that, similarly to the case of Example 5, the overlapping region would preferably display any one of the images of the left-eye images and right-eye images, or display the left-eye image and right-eye image after performing interpolation processing on these images. With this configuration, it is possible to suppress the occurrence of phenomenon that the region where a portion of the left side of the left-eye image and a portion of the right side of the right-eye image overlap with each other becomes double images or that luminance becomes higher than other regions. This also applies to Example 10 to be described below.

In contrast, in a case where the viewing distance is 16 [cm] as illustrated in FIG. 20B, there is no overlapping region of the left-eye image and the right-eye image. That is, presentation of the virtual image 15 is performed with the left-eye image and the right-eye image are completely separated from each other.

Example 10

Figure 21A:
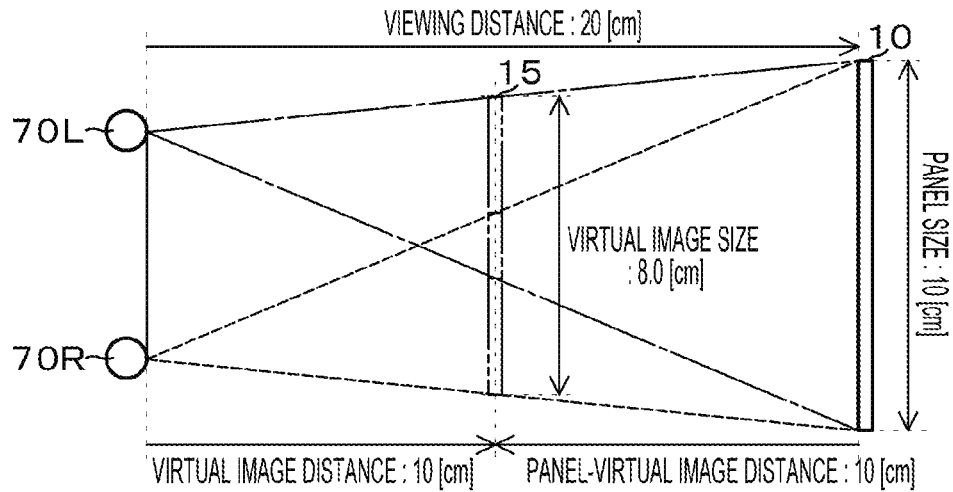
FIGS. 21A, 21B, and 21C are diagrams each illustrating a virtual image presented by a display apparatus according to Example 10.
Figure 21B:
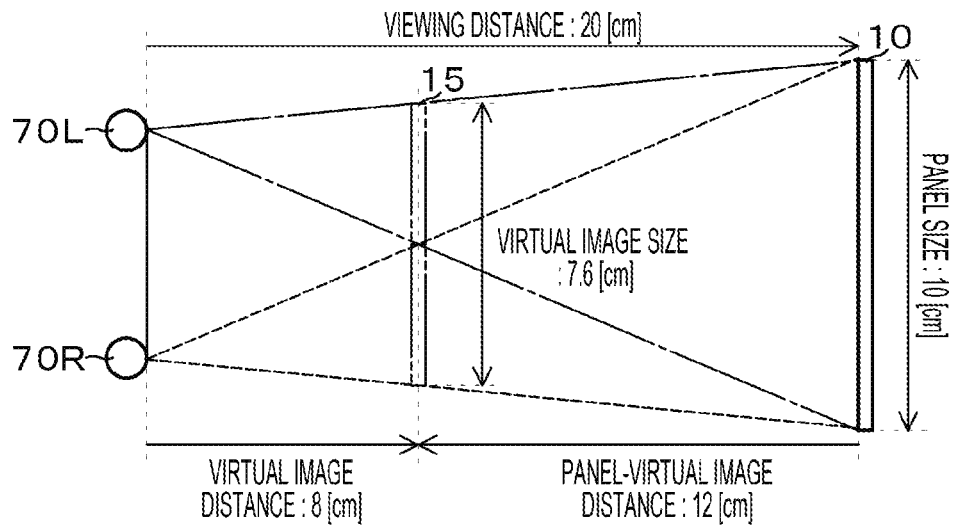
Figure 21C:
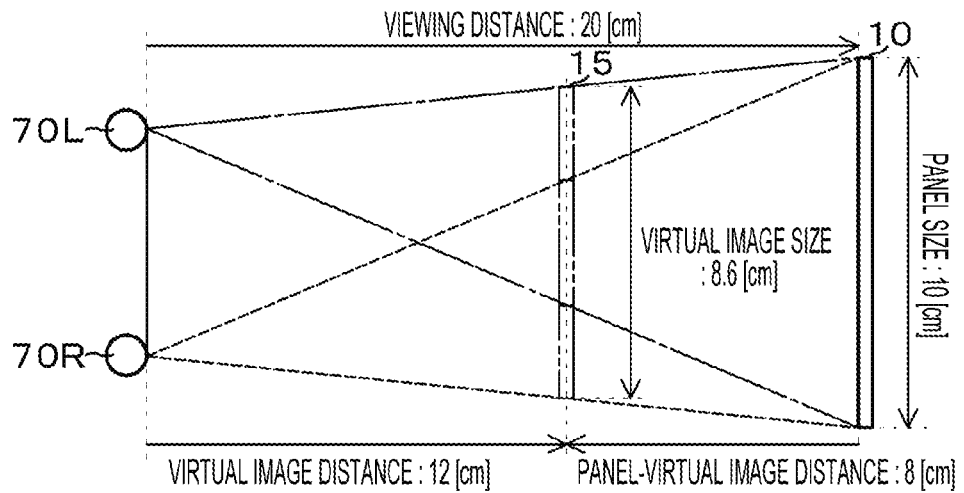

FIGS. 21A, 21B, and 21C are diagrams each illustrating a virtual image presented by a display apparatus according to Example 10. Example 10 is an exemplary case where a vicinity-display optical system in which the virtual image is presented at a position less distant from the display surface of the display unit 10 (refer to FIG. 5) has a variable focus, that is, where the virtual image lens 12 is formed with a variable focus lens. FIG. 21A illustrates a case where the virtual image distance is 10 [cm], FIG. 21B illustrates a case where the virtual image distance is 8 [cm], and FIG. 21C illustrates a case where the virtual image distance is 12 [cm].

On the display apparatus according to Example 10, the distance from the observer to the display surface of the display unit 10, namely, the viewing distance, is fixed. Herein, an exemplary viewing distance is fixed to 20 [cm]. In addition, in FIG. 21A, by setting the virtual image distance determined by the focal length of the variable focus lens to 10 [cm], the virtual image 15 with the virtual image size of 8.0 [cm] is presented at a presentation position with the virtual image distance. In FIG. 21B, by setting the virtual image distance to 8 [cm], the virtual image 15 with the virtual image size of 7.6 [cm] is presented at a presentation position with the virtual image distance. In FIG. 21C, by setting the virtual image distance to 12 [cm], the virtual image 15 with the virtual image size of 8.6 [cm] is presented at a presentation position with the virtual image distance.

With the above-described display apparatus according to Example 10, it is possible to perform short-distance presentation of the virtual image 15 toward a near-sighted observer in a state of naked eyes by changing the virtual image distance by changing the focal length of the variable focus lens in accordance with the eyesight of the observer in a state where the viewing distance is fixed.

<Display Apparatus According to Third Embodiment>

The technology according to the present disclosure can be applied to a function to use a display and provide a display with a function as a mirror, namely, an electronic mirror. The electronic mirror is an electronically formed mirror configured to provide a display as a function of a mirror by photographing the face of an observer (user) with a camera arranged in the vicinity of the display and displaying the photographed image on the display as a real image obtained by performing left-right inversion (mirror image inversion) on the image. In application to this electronic mirror, the display corresponds to the display unit 10, and the camera corresponds to the imaging unit 20, in association with the system configuration of the display apparatus according to the present disclosure illustrated in FIG. 1. Hereinafter, the display apparatus 1 according to the present disclosure applied to the electronic mirror will be described as a display apparatus according to a third embodiment.

The display apparatus according to the third embodiment not only presents a left-right inversion image of the image photographed by the imaging unit 20 on the display surface of the display unit 10 as a real image but also presents the image at a presentation position less distant from the observer than the display unit 10, as a virtual image. That is, the display apparatus according to the third embodiment is similar to the display apparatus according to the second embodiment in that it presents a virtual image at a presentation position less distant from the observer than the display unit 10.

Since the display apparatus according to the third embodiment can present a virtual image at a position less distant from the observer than the display unit 10, it is possible to provide an electronic mirror that enables a near-sighted observer in a state of naked eyes to check one's own face without coming closer to the display surface of the display unit 10. The electronic mirror achieved by the display apparatus according to the third embodiment turns into a naked-eye viewable mirror that enables a person with weak eyesight to view one's own face by display of the virtual image at the presentation position more frontward than the display unit 10 in a manner similar to the case of viewing into a mirror even without wearing eye glasses or contact lenses.

Moreover, the display apparatus according to the third embodiment enables a person who has eyesight too weak to check one's own face reflected on a mirror with naked eyes to apply treatment, makeup, or contact lens without wearing eye glasses or contact lenses. That is, by shifting to a position to a more frontward position than the display surface of the display unit 10 in accordance with a focus position determined by eyeball lens using virtual image viewing, it is possible to view the display screen of the virtual image even with naked eyes of a near-sighted person who needs eyesight correction using eye glasses or contact lenses because of nearsightedness.

The display apparatus according to the third embodiment can use any of the fixed focus lens and variable focus lens as the virtual image lens 12. Note that, when the variable focus lens is used as the virtual image lens 12, it would be possible to switch between virtual image display and real image display. That is, by equipping the variable focus lens with a lens function in a case where the virtual image lens 12 is formed with a variable focus lens, it would be possible to present a left-right inversion image of the image photographed by the imaging unit 20 as a virtual image at a position less distant than the display unit 10. Moreover, by not equipping the variable focus lens with a lens function, it is possible to display a left-right inversion image of the image photographed by the imaging unit 20 as a real image (two-dimensional image) on the display surface of the display unit 10. With this, the display surface of the display unit 10 functions as an ordinary mirror.

Figure 22:
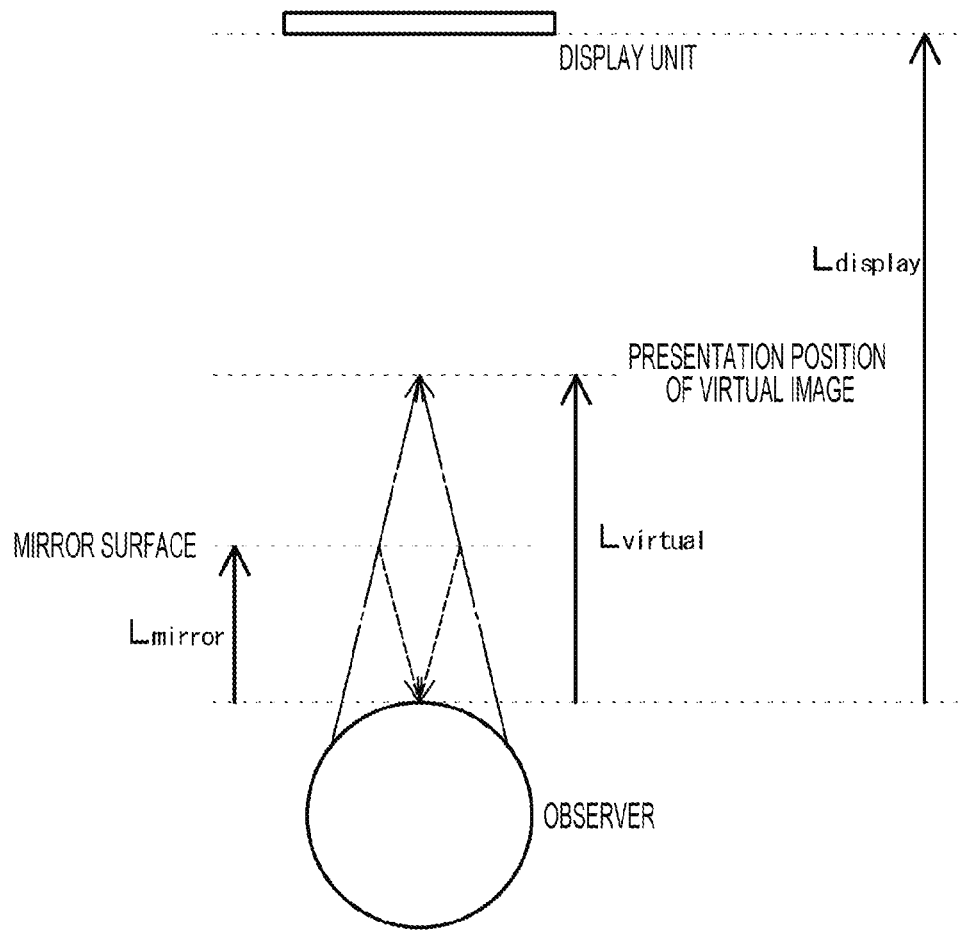
FIG. 22 is a diagram illustrating a focus distance at the time of viewing the mirror.

Now, a focus distance in viewing the mirror will be described with reference to FIG. 22. In FIG. 22, a distance from an observer to the mirror is defined as $L_{mirror}$, a distance from the observer to a presentation position of the virtual image (virtual image distance) is defined as $L_{virtual}$, and a distance from the observer to the display surface of the display unit 10 is defined as $L_{display}$. The focus distance in a case where one's own face is viewed through a mirror would be the distance twice the distance from the face to the mirror. This is because the distance from the mirror reflected to the face is needed in addition to the distance to the mirror.

In an exemplary case where a near-sighted observer cannot check (cannot view) one's own face without coming to a position of the viewing distance 10 [cm], this observer needs to come closer to the mirror at 5 [cm] from the display surface having a mirror function, of the display unit 10, namely, a mirror surface, in order to check one's own face. This is because when coming close to the position at 5 [cm] from the mirror surface, a light beam moving back and force at the mirror surface would make 10 [cm], that is, the viewing distance of 10 [cm].

In contrast, by presenting the virtual image at a presentation position of 10 [cm] from the observer at a more frontward position than the display unit 10, the observer can check (view) one's own face at a distance of 10 [cm] from the face at a more frontward position than the display unit 10 without coming close to the display surface of the display unit 10. That is, by presenting the virtual image at a point having distance of 10 [cm] from the observer, the near-sighted person who cannot check one's own face without coming close at the viewing distance 10 [cm] can check one's own face with naked eyes.

As described above, in a case of an ordinary mirror, there is a need to make the distance between the face and the mirror close to one half of the focus distance at naked eye viewing. For example, in a case where the person cannot view a thing until coming close to 10 [cm] on hand, there is a need to approach a mirror at a position 5 [cm], leading to interference of makeup tools such as mascara with the mirror. At the same time, the mirror positioned too close would narrow the field. With the display apparatus according to the third embodiment, it is possible to present a virtual image at any position more frontward than the display surface of the display unit 10, and to set the presentation position of the virtual image at 10 [cm] from the eye. With this configuration, the display surface of the display unit 10, having a function of real mirror comes at a position sufficiently distant from the face. Accordingly, it is possible to avoid a problem such as interference of makeup tools with the mirror.

Similarly to the second embodiment, the present embodiment is configured to present a virtual image at a position less distant to the observer than the display unit 10 for a near-sighted eye. Alternatively, it is possible to configure to present the virtual image at a position farther (more distant) from the observer than the display unit 10 for far-sighted eye (or weak-sighted eye from aging) (modification example of the third embodiment). Moreover, it is also possible to configure to be able to switch between near-sighted use and far-sighted use depending on the observer and present the virtual image at a position less distance than the display unit 10 in the case of near-sighted use, and present the virtual image at a position more distant than the display unit 10 in the case of far-sighted use. In this case, a variable focus lens is used as the virtual image lens 12 and presentation position of the virtual image is appropriately set by changing the focal length of the variable focus lens in accordance with switching between the near-sighted use and the far-sighted use.

Moreover, in the third embodiment or its modification example, it is preferable to calculate the viewing distance on the basis of the interval between the left and right eyes 70L and 70R of the camera image photographed by the imaging unit 20 in FIG. 1 and to calculate the virtual image distance to the presentation position of the virtual image appropriate to the eyesight of the observer on the basis of the calculated viewing distance. This calculation processing is to be performed by the signal processing unit 40 in FIG. 1. At this time, the display control unit 50 adjusts the presentation position of the virtual image by controlling the focal length of the virtual image lens 12 in accordance with the virtual image distance calculated by the signal processing unit 40. Alternatively, it is also possible to configure such that the virtual image distance calculated by the signal processing unit 40 is presented by the observer and that the observer adjusts the presentation position of the virtual image from the input unit 60 via the display control unit 50 in accordance with the presented virtual image distance.

Hereinafter, a specific example of the display apparatus according to the third embodiment configured to present a virtual image at a position less distant to the observer side than the display unit 10 will be described.

Example 11

Figure 2B:
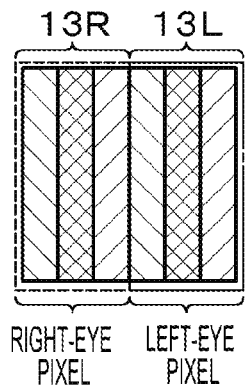
Figure 23:
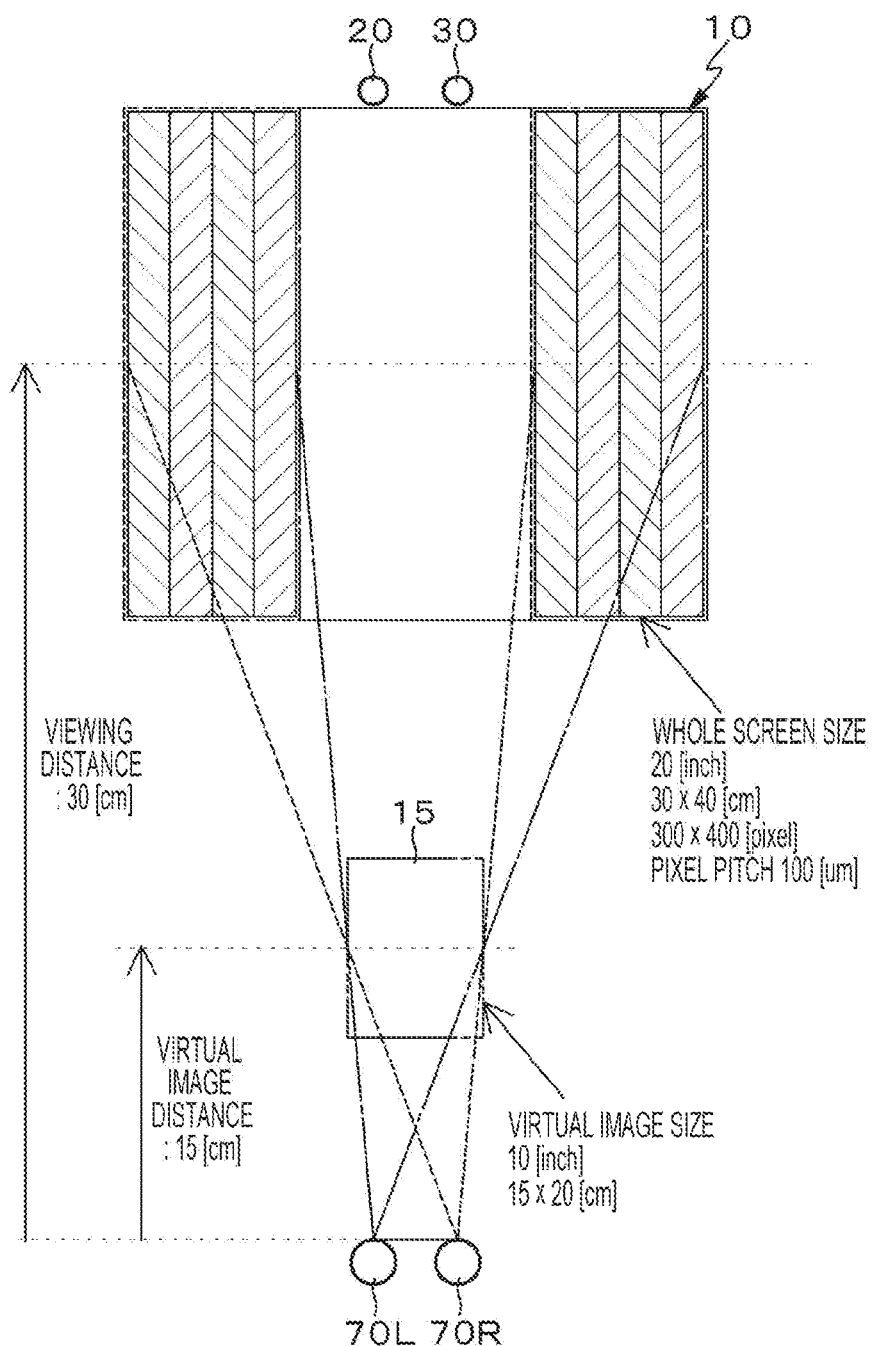
FIG. 23 is a diagram illustrating a virtual image presented by a display apparatus according to Example 11.

FIG. 23 is a diagram illustrating a virtual image presented by a display apparatus according to Example 11. In Example 11, an optical system (refer to FIG. 2) formed with the virtual image lenses 12 being arranged, in an array, for adjoining even-number pixels including the left-eye pixel and the right-eye pixel, as a unit, is used as an optical system that presents the virtual image 15 at a position less distant from the observer side than the display surface of the display unit 10.

In FIG. 23, the imaging unit 20 and the ranging unit 30 are provided integrally with the display unit 10 in the vicinity of the display unit 10, for example, above the display unit 10. Note that while the present Example assumes one imaging unit 20 is arranged above the display unit 10, the configuration is not limited to this. For example, in a case where the face of the observer cannot be photographed on the display unit 10 as a confronting image on the display unit 10 by the imaging unit 20 arranged above the display unit 10, it would be possible to generate an image confronting the display unit 10 and display it by arranging the imaging unit 20 around (up/down/left/right side of) the display unit 10 and performing image processing on those photographed images.

In Example 11, the display unit 10 can be a display having, for example, the screen size of 20 [inch] (whole screen size), with 30 [cm] in height and 40 [cm] in width, with the number of pixels being 3000 in height, 4000 [pixel] in width, and 100 [um] in pixel pitch. The distance between the observer and the display unit 10, namely, the viewing distance is set to 30 [cm]. With this setting, a virtual image is presented at a presentation position having the virtual image distance of 15 [cm], that is, half of the viewing distance 30 [cm]. In addition, the virtual image size would be 10 [inch], with 15 [cm] in height and 20 [cm] in width. The screen size of the virtual image at this time corresponds to a projection range for one eye.

With a display apparatus according to the above-described Example 11, by using a technology according to the present disclosure, of displaying a virtual image, that enables an observer to view the virtual image with both eyes with one screen of the display unit 10, it is possible to present the virtual image at a position more frontward than the display unit 10 that has a function as a mirror. With this, it is possible for the person who needs eyesight correction to check one's own face without wearing eye glasses or contact lens. Accordingly, it is possible to perform skin care with naked eyes, for example, after wake-up or before going to sleep.

Example 12

Example 11 enables implementation of an electronic mirror by using a technology of displaying a virtual image that enables viewing of the virtual image with both eyes of the observer by one screen of the display unit 10 with the virtual image optical system according to the first and second embodiments. In contrast, Example 12 uses a virtual image optical system configured on the basis of the light reproduction method in order to implement the electronic mirror.

Figure 24:
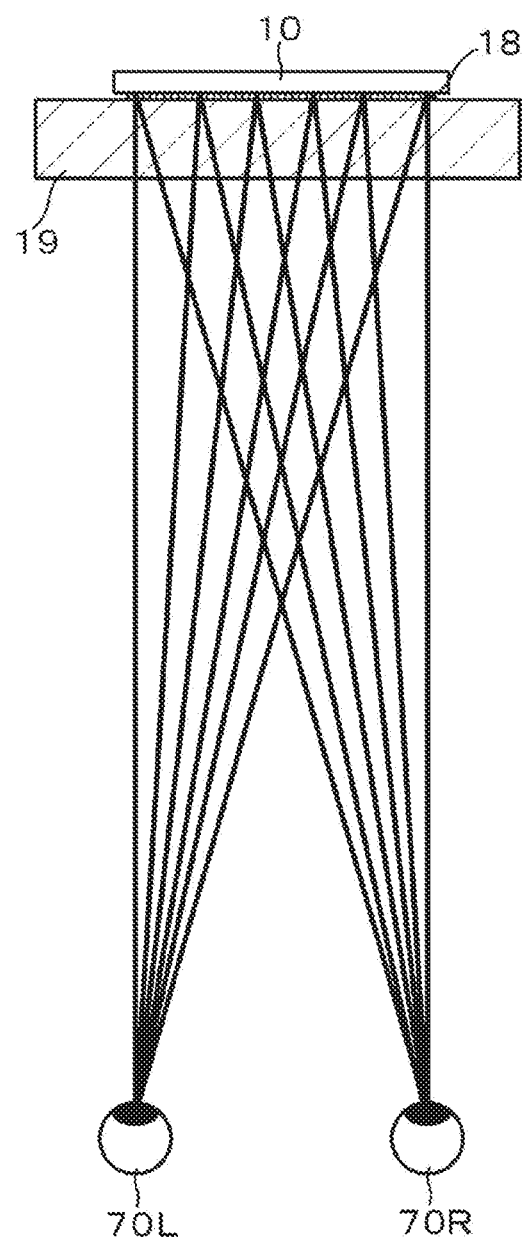
FIG. 24 is a diagram illustrating a configuration of an optical system of a display apparatus according to Example 12.

FIG. 24 is a diagram illustrating a configuration of an optical system of a display apparatus according to Example 12. The display apparatus according to Example 12 differs from the display apparatus illustrated in FIGS. 1 and 2 in the optical system configuration including the display unit 10. Other configurations are fundamentally the same.

Figure 25A:
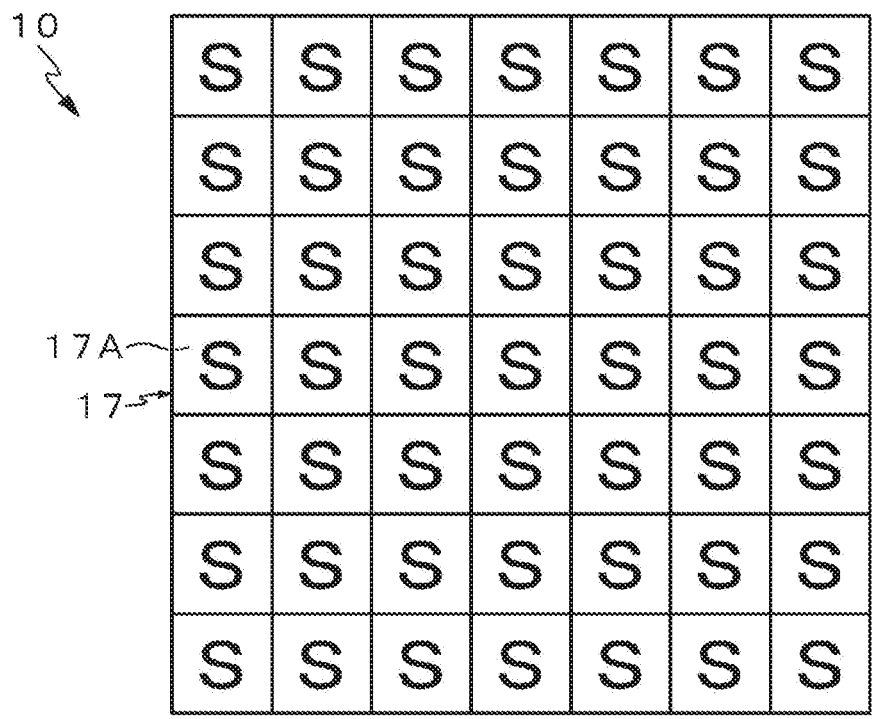
FIGS. 25A and 25B are diagrams each illustrating an exemplary configuration of a display unit in the display apparatus according to Example 12.

As illustrated in FIG. 25A, for example, the display unit 10 is formed with a display element array in which a plurality of display elements 17 is arranged in a matrix, with a lens array unit 18 being provided on a display surface side, in the vicinity of and in parallel with the display surface. Note that "parallel" includes substantially parallel in addition to strictly parallel, allowing presence of various types of variation generated in design and production. In an exemplary case of FIG. 25A, the total number of 49 (7×7) display elements 17 are arranged along a single flat surface.

The plurality of display elements 17 each has a display region 17A having a rectangular shape, for example, each configured to be able to display an independent image. That is, the plurality of display elements 17 is each configured with a plurality of pixels, and thus, can display on its own an image recognizable by a human. In an exemplary case of FIG. 25A, the plurality of display elements 17 each displays an image of a letter "S".

Figure 25B:
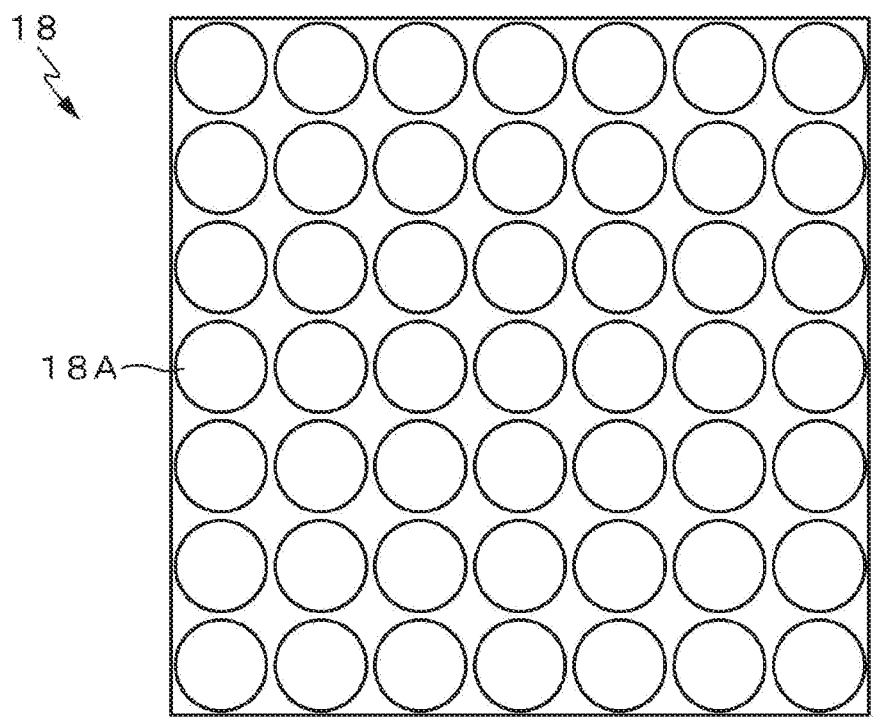

As illustrated in FIG. 25B, for example, the lens array unit 18 is formed with a plurality of lenses 18A, one lens 18A corresponding to one display element (display region) 17, the lenses being arranged in the proximity of the element.

Accordingly, the lens 18A is also arranged in a matrix along a single flat surface (surface parallel with the plane along with the display element 17 is arranged). In an exemplary case of FIG. 25B, the number of the lenses 18A is 49 (7×7) in total.

Note that the surface on which the display element 17 and the lens 18A are arranged may be a soft curved surface other than a flat surface. Moreover, the display element 17 and the lens 18A are arranged with fixed pitch spacing in a degree enabling a person to recognize an image as a whole (that is, in a degree that has no locally missing image). A cover slip 19 is arranged on a front surface of the lens array unit 18. The display unit 10, the lens array unit 18, and the cover slip 19 are integrated with each other.

Light of the image displayed by each of the plurality of display elements 17 of the display unit 10 is formed into substantially parallel light by the lens 18A and incident onto the observer's (user's) the left eye 70L and the right eye 70R via the cover slip 19.

Figure 26:
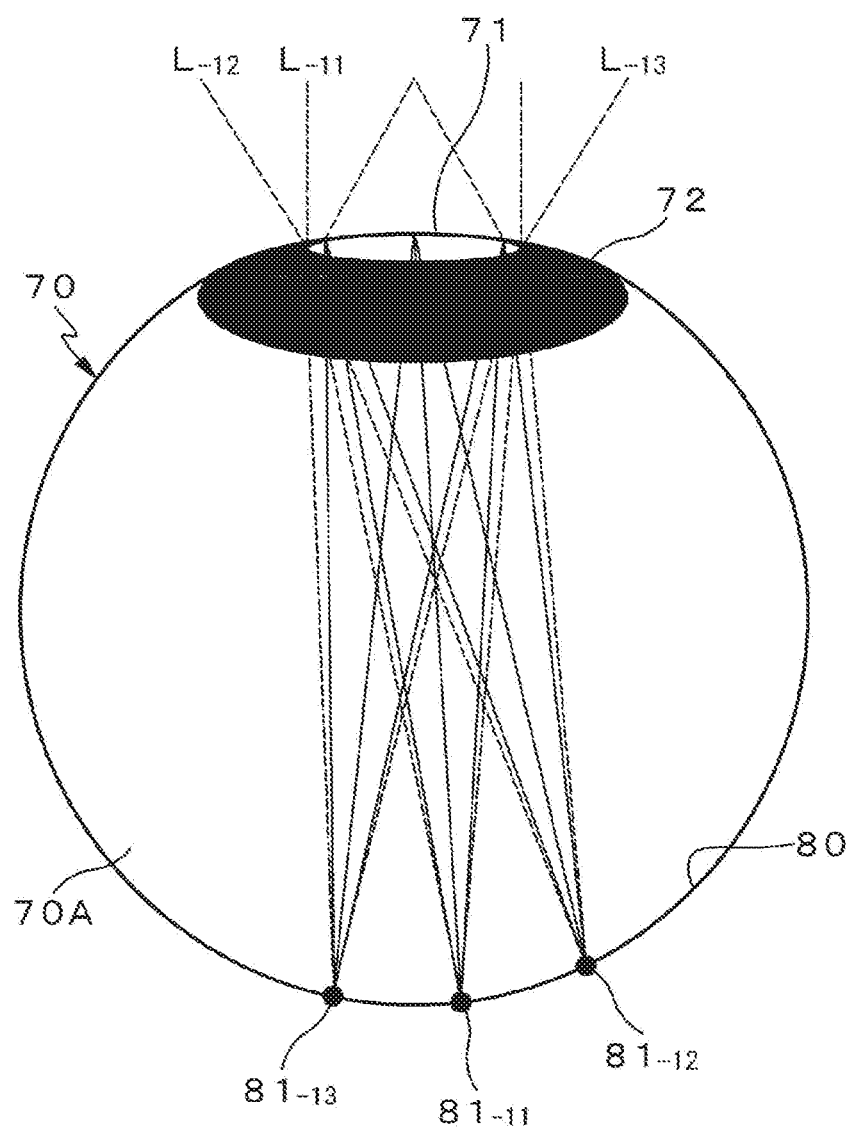
FIG. 26 is a diagram illustrating focusing on the retina.

FIG. 26 is a diagram illustrating focusing on the retina. FIG. 26 illustrates a state in which the light beams that become incident onto the eye 70 (each of the left eye 70L and the right eye 70R is simply referred to as the eye 70 in a case where they need not be treated independently) with individual angles are focused on the retina.

As illustrated in FIG. 26, an iris 72 is arranged around a pupil 71 of an eyeball 70A. The substantially parallel light emitted from the lens 18A becomes incident onto the eyeball 70A via the pupil 71 and is focused on a points $81_{-11}$ to $81_{-13}$ on a retina 80. Among the light beams incident onto the eyeball 70A via the pupil 71, an image of a light beam $L_{-11}$, substantially on the center, is focused on the point $81_{-11}$ on the retina 80. Moreover, an image formed by a light beam $L_{-12}$ incident from the left side of the light beam $L_{-11}$ onto the pupil 71 in the diagram is focused on a point $81_{-12}$ that is positioned on the right side of the point $81_{-11}$ in the diagram. Conversely, an image formed by a light beam $L_{-13}$ incident from the right side of the light beam $L_{-11}$ in the diagram is focused on a point $81_{-13}$ that is positioned on the left side of the point $81_{-11}$ in the diagram.

Figure 27:
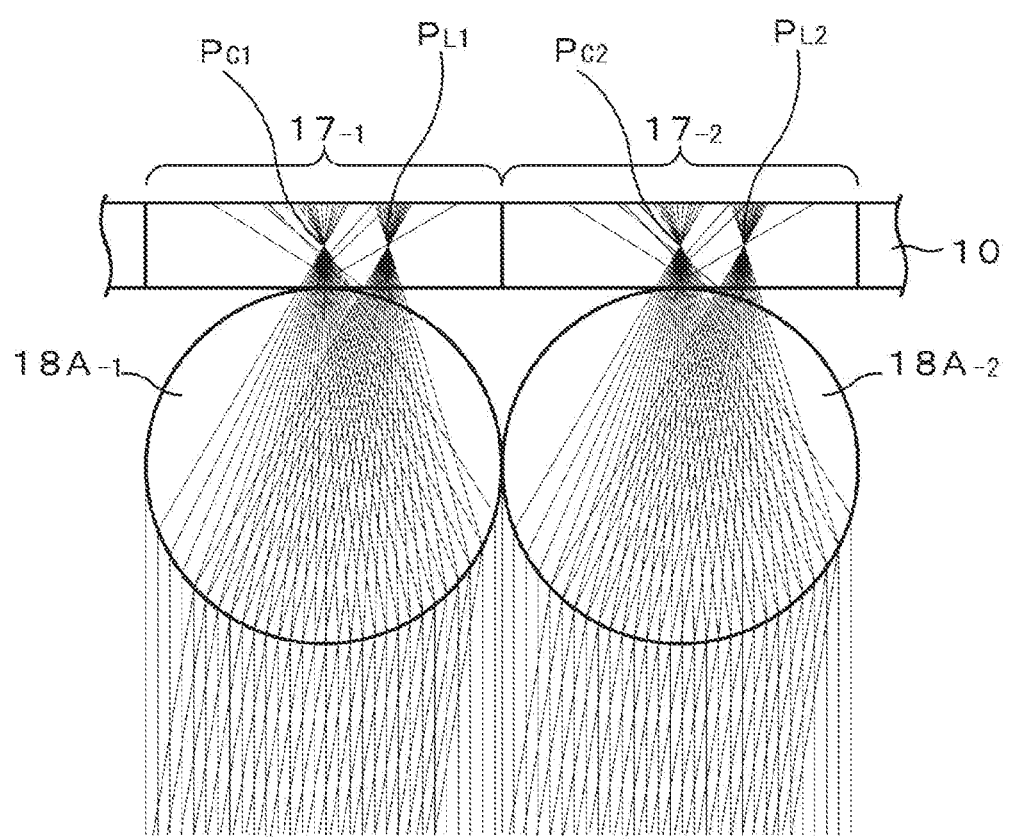
FIG. 27 is a cross-sectional view illustrating a relationship between the light emitted from a display element, and a lens.

FIG. 27 illustrates a relationship between the light emitted from the display element 17 and the lens 18A. As illustrated in FIG. 27, in the present Example, the lens 18A is formed with a lens having substantially a spherical shape. The lens $18A_{-1}$ corresponding to the display element 17-1 and the lens $18A_{-2}$ corresponding to the display element $17_{-2}$ are arranged adjoining (in contact) with each other. Although not illustrated, lenses are arranged at the left side of the lens $18A_{-1}$ in the diagram, and front side/depth side in the direction perpendicular to the sheet. Similarly, lenses are arranged at the right side of the lens $18A_{-2}$ in the diagram, and front side/depth side in the direction perpendicular to the sheet.

The display unit 10 is configured such that its display surface is arranged in the vicinity of a focal point (focal length) obtained when the substantially parallel light beam is incident onto the lens $18A_{-1}$, and $18A_{-2}$. In other words, the light of image emitted from the display element $17_{-1}$ is emitted from the lens $18A_{-1}$ as substantially parallel light. Similarly, the light of image emitted from the display element $17_{-2}$ is emitted from the lens $18A_{-2}$ as substantially parallel light.

The light emitted from a point $P_{L1}$ a slightly right side of substantially the center of the display element $17_{-1}$ is assumed to become substantially parallel light by the lens $18A_{-1}$, and to be focused on the point $81_{-13}$ on the retina 80.

The light emitted from a point $P_{C1}$ a slightly left side of the point $P_{L1}$ (substantially the center of the display element $17_{-1}$) is assumed to become substantially parallel light by the lens $18A_{-1}$, and to be focused on the point $81_{-11}$ on the retina 80.

Similarly, light emitted from a point $P_{L2}$ (corresponding to the point $P_{L1}$ of the display element $17_{-1}$) on the slightly right side from the substantially center of the display element $17_{-2}$ positioned on the right side from the display element $17_{-1}$ in the diagram becomes substantially parallel light by the lens $18A_{-2}$ and is focused on the point $81_{-13}$ on the retina 80. Additionally, light emitted from a point $P_{C2}$ (corresponding to the point $P_{L1}$ of the display element $17_{-1}$) positioned on a more left side of $P_{L2}$ in the diagram (substantially center of the display element $17_{-1}$) becomes substantially parallel light by the lens $18A_{-2}$ and is focused on the point $81_{-11}$ on the retina 80.

In this manner, the light emitted from points $P_{L1}$ and $P_{L2}$ as corresponding pixels individually is focused on a same point on the retina 80. Similarly, the light emitted from points $P_{C1}$ and $P_{C2}$ as corresponding pixels individually is focused on a same point on the retina 80.

Figure 28:
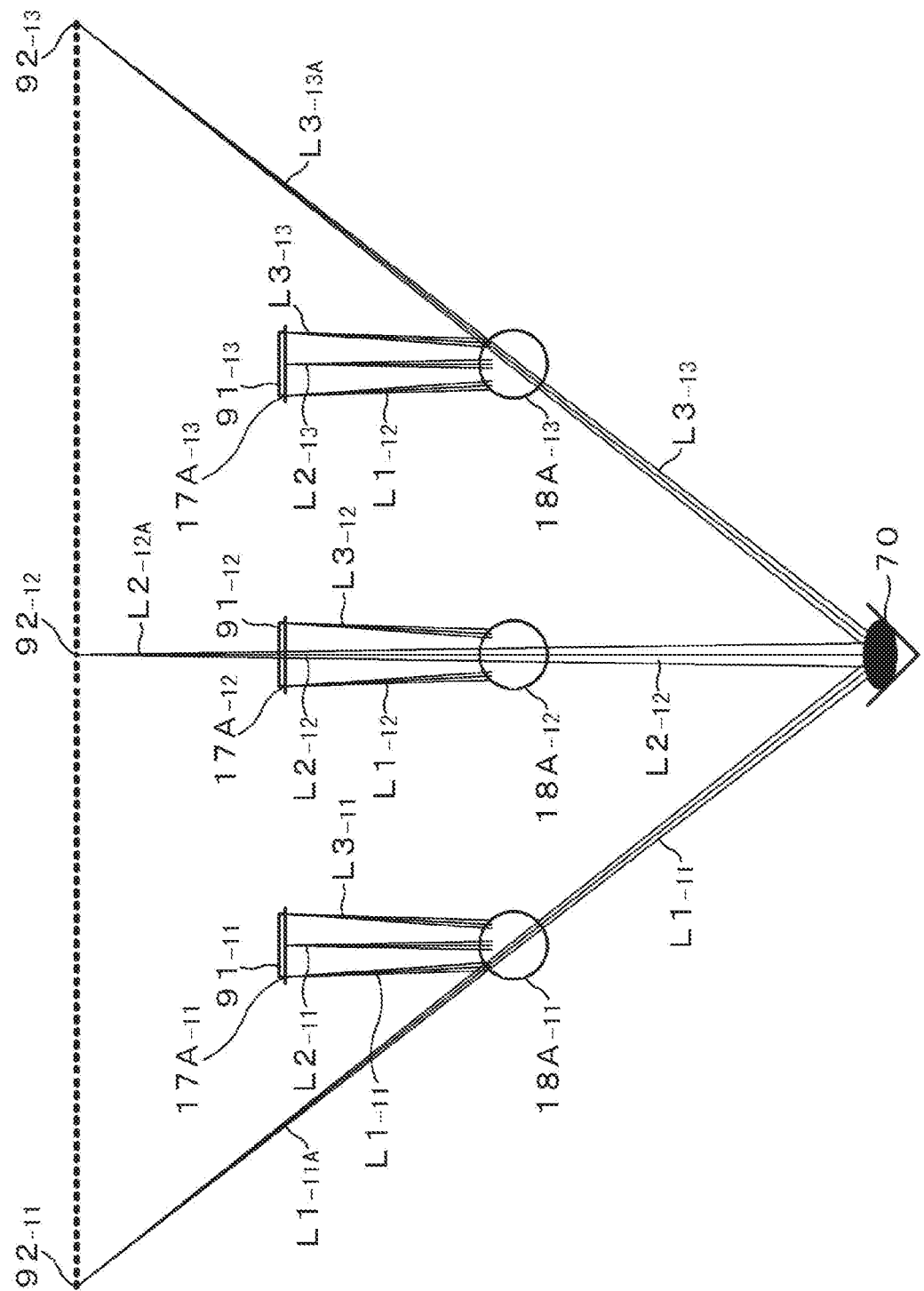
FIG. 28 is a diagram illustrating a virtual image optical system of the display apparatus according to Example 12.

Description above will be further described in detail with reference to FIG. 28. That is, as illustrated in FIG. 28, it is assumed that a display region $17A_{-11}$ of the display element $17_{-1}$ is positioned on a leftmost side of the diagram, a display region $17A_{-12}$ of the display element $17_{-2}$ is positioned on the right side (substantially center) thereof, and a display region $17A_{-13}$ the display element $17_{-3}$ is positioned on a further right side thereof. A real image $91_{-11}$ is displayed in the display region $17A_{-11}$, a real image $91_{-12}$ is displayed in the display region $17A_{-12}$ and a real image $91_{-13}$ is displayed in the display region $17A_{-13}$, respectively. The real images $91_{-11}$ to $91_{-13}$ have no parallax and are substantially same images. These would lead to visual recognition of a two-dimensional image. In a case where a stereoscopic image (three-dimensional image) is to be visually recognized, the image would be an image with parallax.

Note that illustration of refraction of an optical path that occurs in practice at each of surfaces of the lens is omitted in FIG. 28, and in FIG. 29 to be described below.

The light beam $L1_{-11}$ emitted from a pixel positioned on the left side in the diagram among the real image $91_{-11}$ of the display region $17A_{-11}$ is formed into substantially parallel light by the lens $18A_{-1}$ and focused on the point $81_{-12}$ on the retina 80. However, the light beam $L2_{-11}$ emitted from a pixel positioned rightward away from the pixel that corresponds to the light beam $L1_{-11}$, among the real image $91_{-11}$, is not easily focused within a view range on the retina 80 via the lens $18A_{-1}$, compared with the case of the light beam $L1_{-11}$. In the case of the light beam $L3_{-11}$ emitted from a pixel positioned further rightward away from the pixel that corresponds to the light beam $L2_{-11}$, it would be even more difficult to focus the light beam within a view range on the retina 80 via the lens $18A_{-1}$, compared with the case of the light beam $L2_{-11}$. That is, on the light focused on the point the $81_{-11}$ within the view range on the retina 80, among the real image $91_{-11}$, the light from the pixel positioned on the leftmost side would be dominant.

On the real image $91_{-12}$ on the display region $17A_{-12}$ positioned substantially at the center of the diagram, a light beam $L2_{-12}$ emitted from the pixel positioned substantially at the center is dominant among the light focused on the point $81_{-11}$ within a view range on the retina 80, compared with a light beam $L1_{-12}$ emitted from the pixel most distant on the left side in the diagram and a light beam $L3_{-12}$ emitted from the pixel most distant on the right side in the diagram.

In contrast, among the light beams emitted from the real image $91_{-13}$ of the display region $17A_{-13}$ positioned rightmost in the diagram, formed into substantially parallel light by the lens $18A_{-3}$, and focused on the point $81_{-13}$ within a view range on the retina 80, the light beam $L3_{-13}$ emitted from the pixel at the right most position in the diagram becomes dominant. Then, the light beam $L2_{-13}$ emitted from the pixel away in the left direction follows this in dominance, and the light beam $L1_{-13}$ is the most difficult beam to be focused on the point $81_{-13}$ within a view range on the retina 80

In this manner, the light beam having dominant component of the light beam emitted from the leftmost pixel among the pixel of the real image $91_{-11}$ displayed by the display region $17A_{-11}$ is focused on the point $81_{-12}$ within the view range on the retina 80. Moreover, the light beam having dominant component of the light beam emitted from the substantially central pixel, among the pixel of the real image $91_{-12}$ of the display region $17A_{-12}$ positioned at the center, is focused on the point $81_{-11}$ within the view range on the retina 80. Furthermore, the light beam having dominant component of the light beam emitted from the rightmost pixel, among the pixel of the real image $91_{-13}$ of the display region $17A_{-13}$, positioned rightmost, is focused on the point $81_{-13}$ within the view range on the retina 80.

The image on the point $81_{-12}$ is recognized as a virtual image $92_{-11}$ by a light beam $L1_{-11A}$ virtually obtained by tracing a light beam $L1_{-11}$ from the lens $18A_{-1}$ in the reverse direction. The image on the point $81_{-11}$ is recognized as a virtual image $92_{-12}$ by a light beam $L2_{-12A}$ virtually obtained by tracing a light beam $L2_{-12}$ from the lens $18A_{-2}$ in the reverse direction. The image on the point $81_{-13}$ is recognized as a virtual image $92_{-13}$ by a light beam $L3_{-13A}$ virtually obtained by tracing a light beam $L3_{-13}$ from the lens $18A_{-3}$ in the reverse direction.

In practice, similar phenomena occur in all other pixels, and thus, the observer (user) visually recognizes the whole of a plurality of real images displayed in the display region 17A including the real images $91_{-11}$ to $91_{-13}$, as a combined one virtual image, via the eye 70. That is, a virtual image optical system is configured such that the light emitted from the display unit 10 is focused on the retina 80 on the basis of the principle of the light reproduction method.

Figure 29:
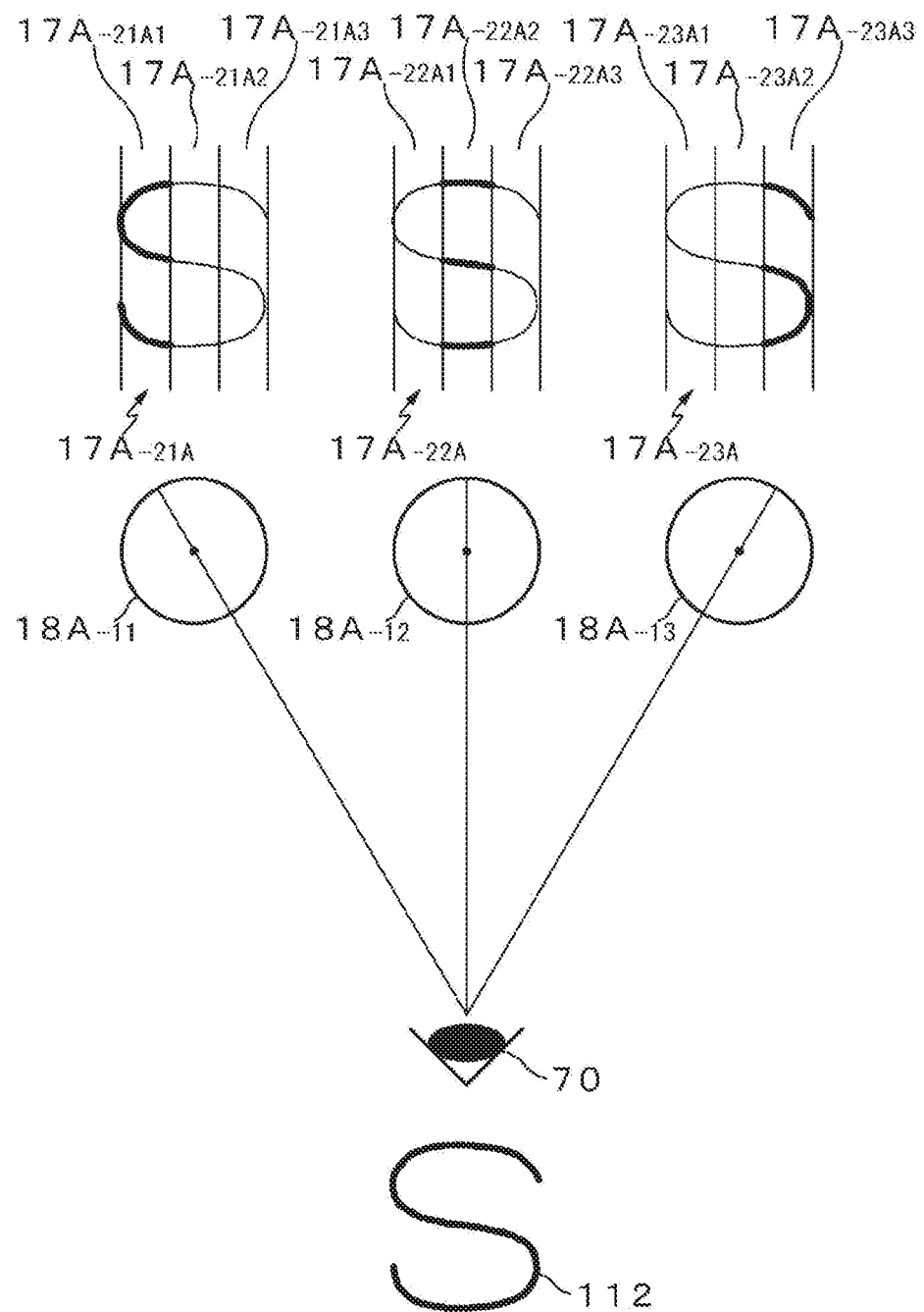
FIG. 29 is a diagram illustrating an image configuration on a virtual image optical system.

FIG. 29 schematically illustrates the above. As illustrated in the diagram, it is assumed that each of display regions $17A_{-21A}$ to $17A_{-23A}$ displays each of same images $111_{-21}$ to $111_{-23}$ (image of text S). The light including the image of a portion $17A_{-21A1}$ (left-side portion of text S) at a leftmost position as a main component, among the display region $17A_{-21A}$ at a leftmost position in the diagram is formed into substantially parallel light by the lens $18A_{-21}$, and focused on the point $81_{-12}$ within the view range on the retina 80. In contrast, the light from the images of a portion $17A_{-21A2}$ at a substantially center and of a portion $17A_{-21A3}$ on the right side thereof (images of central and right-side portions of the text S), among the display region $17A_{-21A}$, is not focused within the view range on the retina 80 via the lens $18A_{-21}$, or even if it is focused, the amount of energy is small.

The amount of energy of the light focused on the point $81_{-11}$ within the view range on the retina 80 via the lens $18A_{-22}$ among the pixel of the display region $17A_{-22A}$ positioned at the substantially center of the diagram is distributed such that components for the image of the portion $17A_{-22A1}$ positioned at the leftmost and the portion $17A_{-22A3}$ positioned at the rightmost (left side and right side portions of text S) are small. Moreover, the component of the image of the portion $17A_{-22A2}$ positioned at the substantially center (central portion of text S) is much.

The amount of energy of the light focused on the point $81_{-13}$ within the view range on the retina 80 via the lens $18A_{-23}$ among the pixel of the display region $17A_{-23A}$ positioned at the rightmost of the diagram is distributed such that components for the image of the portion $17A_{-23A3}$ positioned at the rightmost (right side portions of text S) is dominant. Then, the component of the image of the portion $17A_{-23A2}$ on the more left side of the portion $17A_{-23A3}$ and the image of the portion $17A_{-23A1}$ on the further left side thereof (central and left side portion of text S) is small.

In this manner, the same images $111_{-21}$ to $111_{-23}$ displayed on the display regions $17A_{-21A}$ to $17A_{-23A}$ are combined on the eye 70 and visually recognized by the observer (user) as a single image 112. That is, an image including a left-side portion of an image $111_{-21}$ (text S) as a main component, an image including a central portion of an image $111_{-22}$ (text S) as a main component, and an image (virtual image) including a right-side portion of an image $111_{-23}$ (text S) as a main component, are combined into a signal image 112 (text S). The above-described operation is performed not only in the left-right direction but also in the up-down direction.

The display apparatus according to Example 12 is a virtual image display apparatus configured to present a virtual image in a more frontward position than the display unit 10 functioning as a mirror by using the virtual image optical system configured on the basis of the principle of the above-described light reproduction method. Moreover, similar actions and effects achieved by the display apparatus according to Example 11 can also be obtained by the display apparatus according to Example 12. That is, it is possible for the person who needs eyesight correction to check one's own face without wearing eye glasses or contact lens by presenting a virtual image in a more frontward position than the display unit 10 functioning as a mirror. Accordingly, it is possible to perform skin care with naked eyes, for example, after wake-up or before going to sleep.

<Aspect Ratio of Virtual Image>

As described above, any of the display apparatus according to the first to third embodiments is a virtual image display apparatus whereby the observer can view a virtual image using a screen of the display unit 10 with one's naked eyes. Moreover, the apparatus differs from a stereoscopic image display apparatus configured to display a stereoscopic image (three-dimensional image) with an aspect ratio same as the aspect ratio of the display surface, on the display surface of the display unit 10, in that the display apparatus presents a virtual image with an aspect ratio different from the aspect ratio of the display surface, on the presentation position different from the display surface of the display unit 10. Note that the aspect ratio is the ratio (width/height) of the length (number of pixels), in the vertical length and the horizontal length of the display surface of the display unit 10 (screen) and of the virtual image.

Now, a change amount $\Delta_{aspect}$ of an aspect ratio at presentation of the virtual image in the display apparatus according to the first to third embodiments will be described. Herein, the change amount $\Delta_{aspect}$ of the aspect ratio is a result obtained by dividing the aspect ratio of a virtual image at display of the virtual image by the aspect ratio of the display surface of the display unit 10. Herein, the aspect ratio will be described using an example of the display apparatus according to the first embodiment.

Figure 30:
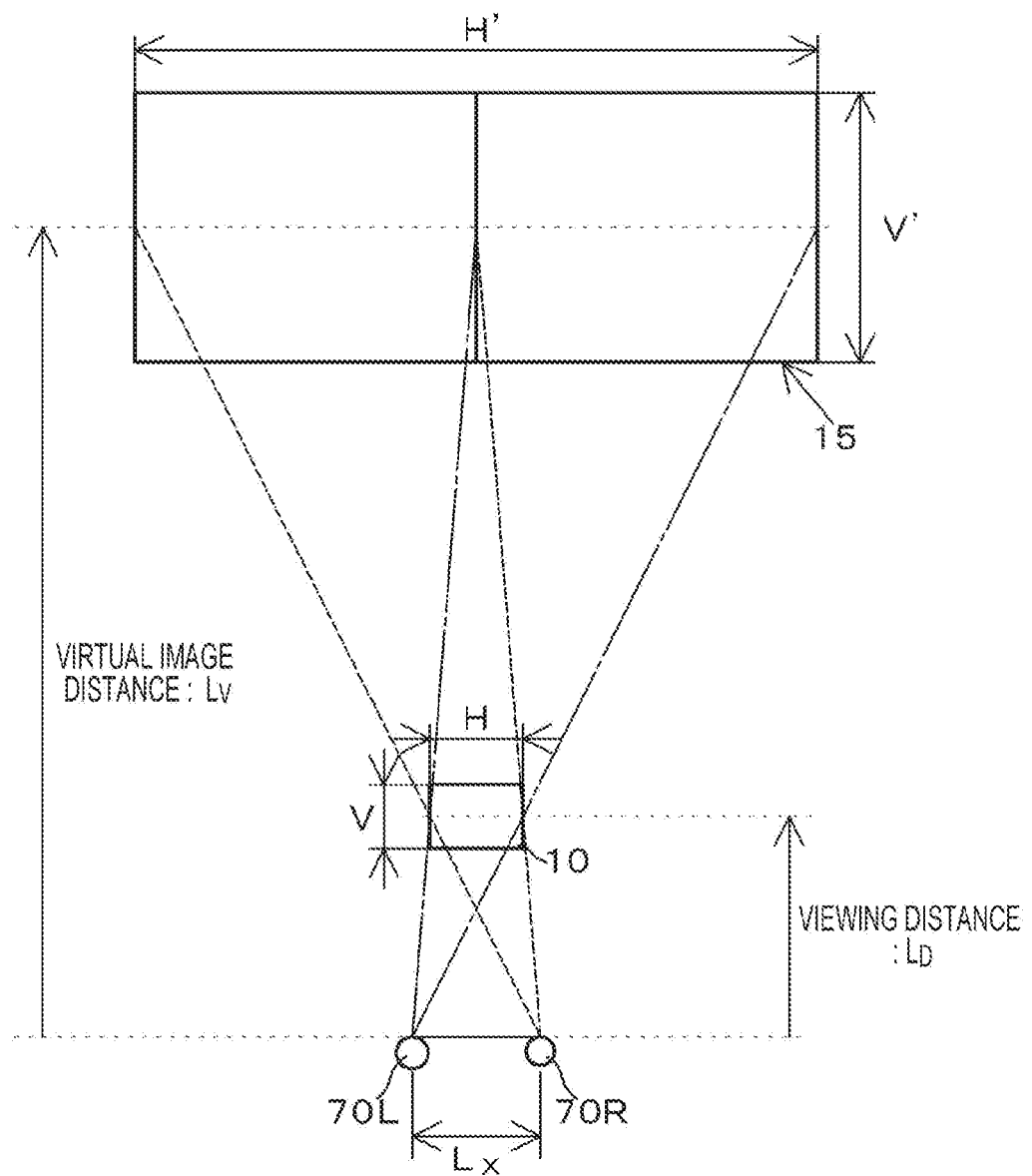
FIG. 30 is a diagram illustrating a change amount $\Delta_{aspect}$ of an aspect ratio when a virtual image is presented.

As illustrated in FIG. 30, an interval between observer's both eyes 70L and 70R is defined as $E_X$, a vertical length (height) of the display surface of the display unit 10 (screen) is defined as V, a horizontal length (horizontal width) of the display surface of the display unit 10 is defined as H. A vertical length (height) of the virtual image 15 is defined as V', and a horizontal length (horizontal width) of the virtual image 15 is defined as H'. This determines the aspect ratio of the display surface of the display unit 10 as H/V, with the aspect ratio of the virtual image being H'/V'. Moreover, the viewing distance that is the distance from the observer to the display unit 10 is defined as $L_D$, and the virtual image distance that is the distance from the observer to the virtual image 15 is defined as $L_V$.

At this time, the horizontal length H' of the virtual image 15 is obtained as $(E_X/2+H/2) \times L_V/L_D - E_X/2$, and the vertical length V' of the virtual image 15 is obtained as $V'=V/2 \times L_V/L_D$. Then, the change amount $\Delta_{aspect}$ of the aspect ratio when the virtual image 15 is displayed would be obtained by dividing the aspect ratio of the virtual image 15 by the aspect ratio of the display surface of the display unit 10 such that (H'/V')/(H/V), leading to $$\Delta_{aspect}=1+\{E_X(L_V-L_D)/L_V \times H\} \qquad (1).$$

On the display apparatus according to the first to third embodiments, the change amount $\Delta_{aspect}$ of the aspect ratio when the virtual image 15 is displayed satisfies above-described relationship in Formula (1). That is, the smaller the horizontal width H on the display surface of the display unit 10, the greater the aspect ratio of the virtual image 15 compared with the aspect ratio of the display surface. Then, the virtual image 15 is displayed in an expanded displayed in the lateral direction, that is, laterally elongated display. Moreover, the horizontal width of the virtual image 15 with respect to the horizontal length of the display surface of the display unit 10 is one or more and two or less. Note that when the virtual image 15 is displayed in a two separate screens, the horizontal width of the virtual image as a whole exceeds two, but the horizontal width of the two screens is two.

The above-described Formula (1) exceeds one, the presentation position of the virtual image 15 with respect to the observer would be at a position more distant than the display unit 10 ($L_V>L_D$), that is, the virtual image 15 is presented (displayed) at a deeper position than the display unit 10. That is, when Formula (1) exceeds one, this corresponds to the case of the display apparatus according to the first embodiment. Moreover, when Formula (1) is below one, the presentation position of the virtual image 15 with respect to the observer would be at a position more frontward than the display unit 10 ($L_V<L_D$). That is, when Formula (1) is below one, this corresponds to the case of the display apparatus according to the second and third embodiments.

Figure 31:
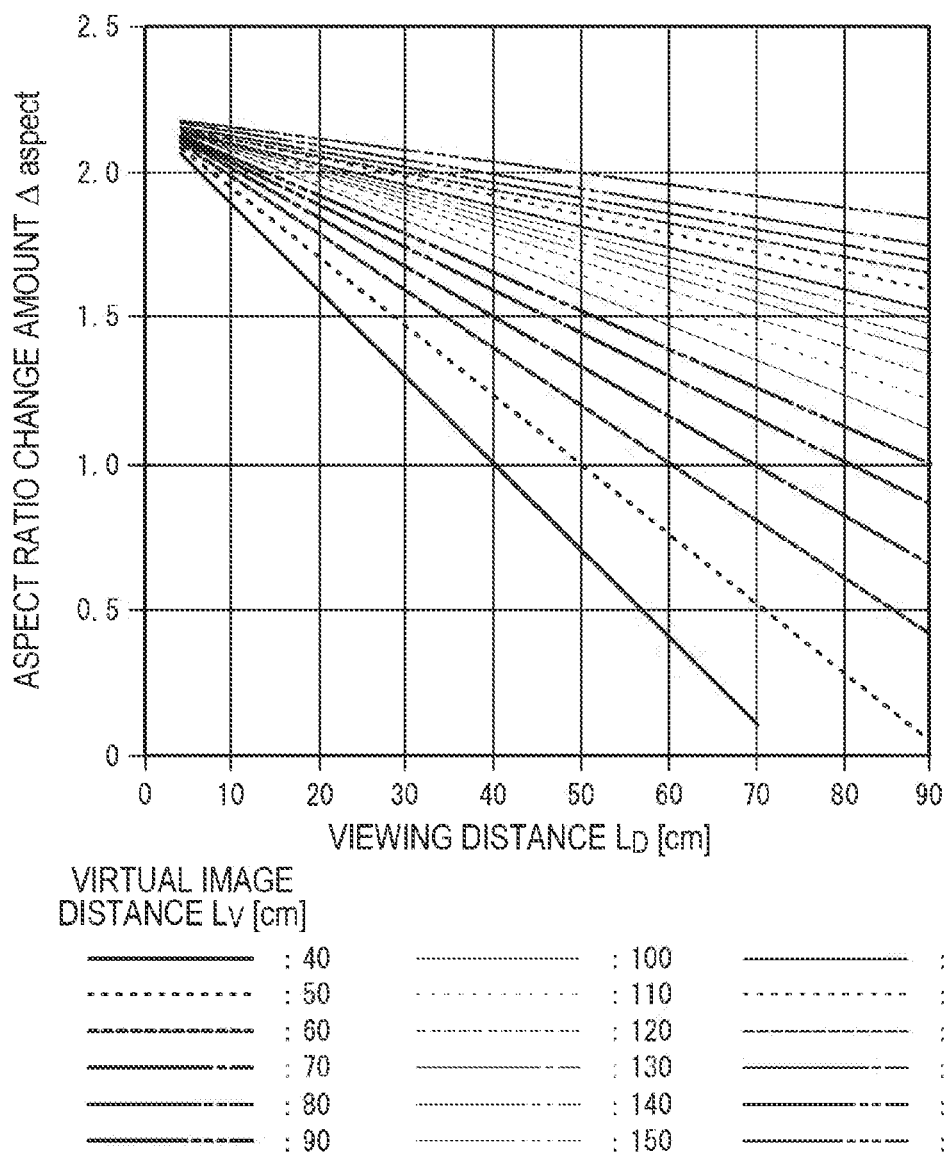
FIG. 31 is a diagram illustrating an exemplary relationship between the viewing distance $L_D$ and the change amount $\Delta_{aspect}$ of the aspect ratio, for each of virtual image distances $L_V$.

FIG. 31 illustrates an exemplary relationship between the viewing distance $L_D$ and the change amount $\Delta_{aspect}$ of the aspect ratio, for each of virtual image distances $L_V$. With the fixed focus lens in which the virtual image distance $L_V$ is fixed, the shorter the viewing distance $L_D$, the greater the change amount $\Delta_{aspect}$ of the aspect ratio of the screen. In other words, the shorter the viewing distance $L_D$, the more the wide display is expanded, and the more the display as a whole is expanded. With the variable focus lens in which the virtual image distance $L_V$ is adjustable, the longer the virtual image distance $L_V$, the greater the change amount $\Delta_{aspect}$ of the aspect ratio of the screen, in a case where the viewing distance $L_d$ is the same. In other words, the longer the virtual image distance $L_V$, the more expanded the wide display. Moreover, in order to fix the virtual image distance $L_V$, the closer the viewing distance $L_D$, the more expanded the wide display and the more the display as a whole is also expanded, similarly to the case of the fixed focus lens.

Moreover, in cases where the virtual image distance $L_V$ is about 200 [cm], that is, the case where the distance is long, and where it is about 60 [cm], that is, where the distance is short, the change in the change amount $\Delta_{aspect}$ of the aspect ratio differs about twice when the viewing distance $L_D$ is changed from 10 [cm] to 60 [cm], for example. In other words, in a case where the virtual image distance $L_V$ is short, it is possible to greatly convert the wide display by changing the viewing distance $L_D$. For example, on a wristwatch-type display apparatus with a small screen size, or the like, it is possible to obtain information without moving the apparatus close to one's face in a case where not so much information is needed other than checking the time, and to view the apparatus by expanding the display range widely by moving the apparatus close to one's face in case of having a desire to check much information such as a map.

Modification Example

Hereinabove, while the technology of the present disclosure has been described with use of the embodiments, the technical scope of the present disclosure is not limited to the scope of the above-described embodiments. Specifically, various modifications or enhancement may be added to the above-described embodiments without departing from the scope of the technology of the present disclosure, and the embodiments with such modifications or enhancement are also included in the technical scope of the present disclosure.

For example, the above-described embodiments assume the use of microlenses arranged in an array for a plurality of adjoining pixels including a left-eye pixel and right-eye pixel, as a unit, as the virtual image lens 12 to determine the presentation position of the virtual image. The configuration, however, is not limited to this. That is, it is possible to use a cylindrical lens arranged in a stripe-shape for a plurality of adjoining pixels including the left-eye pixel and the right-eye pixel, as a unit, as the virtual image lens 12.

Furthermore, the above-described embodiments present an exemplary case where each of the left-eye pixel and the right-eye pixel is formed as a unit of one pixel that becomes a unit in forming a color image. Alternatively, however, it is also possible to form each of the left-eye pixel and the right-eye pixel using a sub pixel (subpixel) as a unit. In this case, it would be sufficient to apply "sub pixel" in place of "pixel".

<Configuration Available in Present Disclosure>

Note that the present disclosure may be configured as follows.

[1] A display apparatus including:

a display unit formed with a lens being arranged for a plurality of adjoining pixels including a left-eye pixel and a right-eye pixel, as a unit, a detection unit configured to detect a left eye and a right eye of an observer, a signal processing unit configured to generate image information for each of the left-eye pixel and the right-eye pixel so as to present a virtual image in an aspect ratio different from the aspect ratio of a display surface of the display unit on the basis of a result of detection obtained by the detection unit, and a display control unit configured to drive the left-eye pixel and the right-eye pixel on the basis of the image information generated by the signal processing unit.

[2] The display apparatus according to the above-described [1], in which the detection unit is attached to the display unit and detects positional information and orientation information of the eye of the observer with respect to a display surface of the display unit.

[3] The display apparatus according to the above-described [2], in which the detection unit includes an imaging unit configured to photograph an observer, and the signal processing unit is configured to form the detection unit together with the imaging unit and configured to calculate positional information and orientation information of the eye of the observer with respect to the display surface of the display unit on the basis of an image of the observer captured by the imaging unit.

[4] The display apparatus according to the above-described [3], in which the detection unit includes a ranging unit configured to measure a distance between the display surface of the display unit and the eye of the observer and the signal processing unit uses a result of measurement obtained by the ranging unit in calculation of the positional information of the eye of the observer with respect to the display surface of the display unit.

[5] The display apparatus according to any of the above-described [1] to [4], in which the lens arranged for a plurality of pixels as a unit is a fixed focus lens with a fixed focal length.

[6] The display apparatus according to any of the above-described [1] to [4], in which the lens arranged for a plurality of pixels as a unit is a variable focus lens with a variable focal length and the display control unit controls the focal length of the variable focus lens.

[7] The display apparatus according to the above-described [6], in which the variable focus lens is formed with a microlens arranged in an array.

[8] The display apparatus according to the above-described [7], in which the display control unit switches between virtual image display and real image display by uniformly controlling the focal length of the microlens within the display unit.

[9] The display apparatus according to the above-described [7], in which the display control unit presents a virtual image at a different distance for each of locations within the display screen by individually controlling the focal length of the microlens within the display unit.

[10] The display apparatus according to any of the above-described [1] to [9], in which, in a case where the presentation position of the virtual image with respect to the observer is more distant than the display unit, the signal processing unit generates virtual image information such that the left side of the left-eye image and the right side of the right-eye image adjoin or overlap with each other at a presentation position of the virtual image.

[11] The display apparatus according to the above-described [10], in which, in a case where the presentation position of the virtual image with respect to the observer is more distant than the display unit, a change amount of an aspect ratio of the virtual image with respect to the display surface of the display unit is more than one.

[12] The display apparatus according to any of the above-described [1] to [9], in which, in a case where the presentation position of a virtual image with respect to the observer is less distant than the display unit, the signal processing unit generates virtual image information such that the right side of the left-eye image and the left side of the right-eye image adjoin or overlap with each other at a presentation position of the virtual image.

[13] The display apparatus according to the above-described [12], in which, in a case where the presentation position of the virtual image with respect to the observer is less distant than the display unit, a change amount of an aspect ratio of the virtual image with respect to the display surface of the display unit is less than one.

[14] The display apparatus according to any of the above-described [1] to [9], in which the left-eye pixel and the right-eye pixel are arranged left-right alternately in pixel arrangement of the display unit, and the signal processing unit generates virtual image information such that independent images different from each other are presented as a left-eye image and a right-eye image at a presentation position of the virtual image.

[15] The display apparatus according to the above-described [14], in which the signal processing unit generates virtual image information such that the number of pixels of the virtual image in the horizontal direction is half the number of pixels of the display unit and that the number of pixels in the vertical direction is equal to the number of pixels of the display unit, for each of left and right eyes.

[16] The display apparatus according to any of the above-described [1] to [15], in which a pixel pitch of the display unit is smaller than eyesight resolution.

[17] The display apparatus according to the above-described [16], in which the pixel pitch of the display unit is half the eyesight resolution, or less.

[18] The display apparatus according to the above-described [17], in which the pixel pitch of the display unit is 101.8 [um] or less.

[19] A display apparatus driving method including, in driving a display apparatus including a display unit formed with a lens being arranged for a plurality of adjoining pixels including a left-eye pixel and a right-eye pixel, as a unit, detecting positional information and orientation information on an eye of an observer with respect to a display surface of a display unit, generating virtual image information for each of the left-eye pixel and the right-eye pixel so as to present a virtual image in an aspect ratio different from the aspect ratio of a display surface of the display unit on the basis of a result of detection, and driving the left-eye pixel and the right-eye pixel on the basis of the generated image information.

[20] An electronic instrument including a display apparatus including:
a display unit formed with a lens being arranged for a plurality of adjoining pixels including a left-eye pixel and a right-eye pixel, as a unit;
a detection unit configured to detect positional information and orientation information of an eye of an observer with respect to a display surface of the display unit;
a signal processing unit configured to generate virtual image information for each of the left-eye pixel and the right-eye pixel so as to present a virtual image in an aspect ratio different from the aspect ratio of a display surface of the display unit on the basis of a result of detection obtained by the detection unit; and
a control unit configured to drive the left-eye pixel and the right-eye pixel on the basis of the virtual image information generated by the signal processing unit.

[A01] The display apparatus according to the above-described [10], in which the size of the virtual image formed by the left-eye image and the right-eye image overlapping with each other changes in accordance with a viewing distance from the observer to the display unit.

[A02] The display apparatus according to the above-described [10], in which the size of the virtual image formed by the left-eye image and the right-eye image overlapping each other is a same size regardless of a viewing distance from the observer to the display unit.

[A03] The display apparatus according to the above-described [A02], in which a predetermined range from one end of an effective pixel region on the display unit is used as an image display region for the left-eye image, and a predetermined range from the other end of the effective pixel region on the display unit is used for an image display region for the right-eye image.

[A04] The display apparatus according to the above-described [1], in which the number of pixels of the virtual image in the horizontal direction is half the number of pixels of the display unit in the horizontal direction and the number of pixels in the vertical direction is equal to the number of pixels of the display unit in the vertical direction.

[A05] The display apparatus according to the above-described [A04], in which the virtual image is formed in every other pixel arrangement in the horizontal direction.

[B01] A display apparatus including:
a display unit formed with a lens being arranged for a plurality of pixels as a unit;
a detection unit configured to detect a left eye and a right eye of an observer;
an imaging unit configured to photograph the observer;
a signal processing unit configured to generate image information for displaying the face of the observer photographed by the imaging unit onto the display unit as a real image and configured to generate image information so as to present a virtual image in an aspect ratio different from the aspect ratio of a display surface of the display unit on the basis of a result of detection obtained by the detection unit; and
a display control unit configured to drive the display unit on the basis of the image information on the real image generated by the signal processing unit and to drive a virtual image optical system on the basis of the image information on the virtual image.

[B02] The display apparatus according to the above-described [B01], in which the virtual image is presented at a less distant position from the observer than the display unit in a case where the observer is near-sighted.

[B03] The display apparatus according to the above-described [B01], in which the virtual image is presented at a more distant position from the observer than the display unit in a case where the observer is far-sighted.

[B04] The display apparatus according to any of the above-described [B01] to [B03], in which the virtual image optical system includes, on the display unit, a lens array unit formed with a lens being arranged for a plurality of adjoining pixels including a left-eye pixel and a right-eye pixel, as a unit,
the signal processing unit generates virtual image information for each of the left-eye pixel and the right-eye pixel so as to present a virtual image in an aspect ratio different from the aspect ratio of a display surface of the display unit on the basis of a result of detection obtained by the detection unit, and
a drive control unit drives the left-eye pixel and the right-eye pixel on the basis of the virtual image information generated by the signal processing unit.

[B05] The display apparatus according to any of the above-described [B01] to [B03], in which the virtual image optical system is configured to include a lens array unit that includes a lens that emits light from each of a plurality of pixels as substantially parallel light, being arranged in proximity corresponding to a display region including the plurality of pixels on the display unit and that emits, with the lens, light of an image from the plurality of pixels on the corresponding display region, and each of the lenses of the lens array unit emits the light of the image from each of the plurality of pixels on the corresponding display region, as substantially parallel light in a direction corresponding to the position within the display region so as to be focused on the retina of the observer and visually recognized as one virtual image by the observer.

[B06] The display apparatus according to any of the above-described [B01] to [B05], in which the signal processing unit calculates a viewing distance from the observer to the display unit on the basis of an interval between the left and right eyes of the observer of an image photographed by the imaging unit, and calculates a virtual image distance to the presentation position of the virtual image appropriate for eyesight of the observer on the basis of the calculated viewing distance.

[B07] The display apparatus according to the above-described [B06], in which the display control unit adjusts the presentation position of the virtual image in accordance with the virtual image distance calculated by the signal processing unit.

[B08] The display apparatus according to the above-described [B06], in which the signal processing unit presents the calculated virtual image distance to the observer and the observer adjusts the presentation position of the virtual image via the display control unit, in accordance with the presented virtual image distance.

REFERENCE SIGNS LIST 1 display apparatus (virtual image display apparatus)
10, 10A, 10B, 10C display unit
11 pixel
11R, 11G, 11B sub pixel (subpixel)
12 virtual image lens
13L left-eye pixel
13R right-eye pixel
14 diffusion layer
15 virtual image
16L left-eye screen
16R right-eye screen
17 display element
18 lens array unit
19 cover slip
20 imaging unit
30 ranging unit
40 signal processing unit
50 display control unit
60 input unit
70 eye of observer
70L left eye
70R right eye
80 retina
100 wristwatch-type terminal
200 mobile terminal
300 camera apparatus

The invention claimed is:
1. A display apparatus, comprising:
a display unit that includes:
a lens for a plurality of adjoining pixels including a left-eye pixel and a right-eye pixel; and
an effective pixel region; and
at least one processor configured to:
detect a left eye of an observer and a right eye of the observer;
generate virtual image information for each of the left-eye pixel and the right-eye pixel based on the detection of the left eye of the observer and the right eye of the observer, wherein the virtual image information is generated to present a virtual image in a first aspect ratio different from a second aspect ratio of a display surface of the display unit, and for each of the left eye of the observer and the right eye of the observer, a first number of pixels of the virtual image in a horizontal direction is half a second number of pixels of the display unit and a third number of pixels of the virtual image in a vertical direction is equal to the second number of pixels of the display unit; and drive the left-eye pixel and the right-eye pixel based on the generated virtual image information such that the virtual image is presented at a presentation position different from a position of the display surface of the display unit, wherein the virtual image is presented in a same viewing direction as the display surface with respect to a position of the observer;

the virtual image corresponds to a left-eye image and a right-eye image, the left-eye image corresponds to the left-eye pixel, the right-eye image corresponds to the right-eye pixel, a first image display range of the effective pixel region and a first non-image display region of the effective pixel region correspond to the left-eye image, a second image display range of the effective pixel region and a second non-image display region of the effective pixel region correspond to the right-eye image, the first non-image display region is at a right end side portion of the effective pixel region, the second non-image display region is at a left end side portion of the effective pixel region, and the first image display range and the second image display range are adjustable based on a viewing distance of the observer from the display unit.

2. The display apparatus according to claim 1, wherein the at least one processor is further configured to detect positional information and orientation information of each of the left eye of the observer and the right eye of the observer with respect to the display surface of the display unit.

3. The display apparatus according to claim 2, wherein the at least one processor is further configured to:

control a camera to photograph the observer; and calculate the positional information and the orientation information with respect to the display surface of the display unit based on the photograph of the observer.

4. The display apparatus according to claim 3, wherein the at least one processor is further configured to:

measure distances between the display surface of the display unit and each of the left eye of the observer and the right eye of the observer; and calculate the positional information of each of the left eye of the observer and the right eye of the observer with respect to the display surface of the display unit based on the measured distances.

5. The display apparatus according to claim 1, wherein the lens is a fixed focus lens with a fixed focal length.

6. The display apparatus according to claim 1, wherein the lens is a variable focus lens with a variable focal length, and the at least one processor is further configured to control the variable focal length of the variable focus lens.

7. The display apparatus according to claim 6, wherein the variable focus lens includes a microlens which is in an array.

8. The display apparatus according to claim 7, wherein the at least one processor is further configured to switch between virtual image display and real image display based on uniform control of a focal length of the microlens within the display unit.

9. The display apparatus according to claim 7, wherein the at least one processor is further configured to present the virtual image at a different distance for each of locations within the display unit based on individual control of a focal length of the microlens within the display unit.

10. The display apparatus according to claim 1, wherein, based on the presentation position of the virtual image with respect to the observer that is more distant than the display unit, the at least one processor is further configured to generate the virtual image information such that a left side of the left-eye image, corresponding to the left-eye pixel, and a right side of the right-eye image, corresponding to the right-eye pixel, one of adjoin or overlap at the presentation position of the virtual image.

11. The display apparatus according to claim 10, wherein, based on the presentation position of the virtual image with respect to the observer that is more distant than the display unit, a change amount of the first aspect ratio of the virtual image with respect to the display surface of the display unit is more than one.

12. The display apparatus according to claim 1, wherein, based on the presentation position of the virtual image with respect to the observer that is less distant than the display unit, the at least one processor is further configured to generate the virtual image information such that a right side of the left-eye image, corresponding to the left-eye pixel, and a left side of the right-eye image, corresponding to the right-eye pixel, one of adjoin or overlap at the presentation position of the virtual image.

13. The display apparatus according to claim 12, wherein, based on the presentation position of the virtual image with respect to the observer that is less distant than the display unit, a change amount of the first aspect ratio of the virtual image with respect to the display surface of the display unit is less than one.

14. The display apparatus according to claim 1, wherein the left-eye pixel and the right-eye pixel are arranged left-right alternately in a pixel arrangement of the display unit, and the at least one processor is further configured to generate the virtual image information such that different independent images are presented as the left-eye image and the right-eye image at the presentation position of the virtual image.

15. The display apparatus according to claim 1, wherein a pixel pitch of the display unit is smaller than an eyesight resolution.

16. The display apparatus according to claim 15, wherein the pixel pitch of the display unit is one of half the eyesight resolution or less.

17. The display apparatus according to claim 16, wherein the pixel pitch of the display unit is one of 101.8 [um] or less.

18. A display apparatus driving method, comprising:
detecting a left eye of an observer and a right eye of the observer;
generating virtual image information for each of a left-eye pixel and a right-eye pixel based on the detection of the left eye of the observer and the right eye of the observer, wherein
  the virtual image information is generated to present a virtual image in a first aspect ratio different from a second aspect ratio of a display surface of a display unit,
  for each of the left eye of the observer and the right eye of the observer, a first number of pixels of the virtual image in a horizontal direction is half a second number of pixels of the display unit and a third number of pixels of the virtual image in a vertical direction is equal to the second number of pixels of the display unit, and
  the display unit includes:
    a lens for a plurality of adjoining pixels including the left-eye pixel and the right-eye pixel; and
    an effective pixel region; and
driving the left-eye pixel and the right-eye pixel based on the generated virtual image information such that the virtual image is presented at a presentation position different from a position of the display surface of the display unit, wherein
  the virtual image is presented in a same viewing direction as the display surface with respect to a position of the observer,
  the virtual image corresponds to a left-eye image and a right-eye image,
  the left-eye image corresponds to the left-eye pixel,
  the right-eye image corresponds to the right-eye pixel,
  a first image display range of the effective pixel region and a first non-image display region of the effective pixel region correspond to the left-eye image,
  a second image display range of the effective pixel region and a second non-image display region of the effective pixel region correspond to the right-eye image,
  the first non-image display region is at a right end side portion of the effective pixel region,
  the second non-image display region is at a left end side portion of the effective pixel region, and
  the first image display range and the second image display range are adjustable based on a viewing distance of the observer from the display unit.

19. An electronic instrument, comprising:
a display apparatus that includes:
  a display unit including:
    a lens for a plurality of adjoining pixels including a left-eye pixel and a right-eye pixel; and
    an effective pixel region; and
  at least one processor configured to:
    detect a left eye of an observer and a right eye of the observer;
    generate virtual image information for each of the left-eye pixel and the right-eye pixel based on the detection of the left eye of the observer and the right eye of the observer, wherein
      the virtual image information is generated to present a virtual image in a first aspect ratio different from a second aspect ratio of a display surface of the display unit, and
      for each of the left eye of the observer and the right eye of the observer, a first number of pixels of the virtual image in a horizontal direction is half a second number of pixels of the display unit and a third number of pixels of the virtual image in a vertical direction is equal to the second number of pixels of the display unit; and
    drive the left-eye pixel and the right-eye pixel based on the generated virtual image information such that the virtual image is presented at a presentation position different from a position of the display surface of the display unit, wherein
      the virtual image is presented in a same viewing direction as the display surface with respect to a position of the observer,
      the virtual image corresponds to a left-eye image and a right-eye image,
      the left-eye image corresponds to the left-eye pixel,
      the right-eye image corresponds to the right-eye pixel,
      a first image display range of the effective pixel region and a first non-image display region of the effective pixel region correspond to the left-eye image,
      a second image display range of the effective pixel region and a second non-image display region of the effective pixel region correspond to the right-eye image,
      the first non-image display region is at a right end side portion of the effective pixel region,
      the second non-image display region is at a left end side portion of the effective pixel region, and
      the first image display range and the second image display range are adjustable based on a viewing distance of the observer from the display unit.

* * * * *